(12) United States Patent
Maus

(10) Patent No.: US 12,473,343 B2
(45) Date of Patent: Nov. 18, 2025

(54) TARGETED T CELLS WITH CYTOTOXICITY TOWARD IMMUNOSUPPRESSIVE CELLS

(71) Applicant: THE GENERAL HOSPITAL CORPORATION, Boston, MA (US)

(72) Inventor: Marcela Maus, Lexington, MA (US)

(73) Assignee: The General Hospital Corporation, Boston, MA (US)

( * ) Notice: Subject to any disclaimer, the term of this patent is extended or adjusted under 35 U.S.C. 154(b) by 983 days.

(21) Appl. No.: 16/475,717

(22) PCT Filed: Jan. 10, 2018

(86) PCT No.: PCT/US2018/013095
§ 371 (c)(1),
(2) Date: Jul. 3, 2019

(87) PCT Pub. No.: WO2018/132427
PCT Pub. Date: Jul. 19, 2018

(65) Prior Publication Data
US 2019/0345218 A1   Nov. 14, 2019

Related U.S. Application Data

(60) Provisional application No. 62/444,595, filed on Jan. 10, 2017.

(51) Int. Cl.
*C07K 14/725* (2006.01)
*A61K 40/11* (2025.01)
*A61K 40/22* (2025.01)
*A61K 40/31* (2025.01)
*A61K 40/42* (2025.01)
*A61K 45/06* (2006.01)
*C07K 14/705* (2006.01)
*C07K 16/18* (2006.01)
*C07K 16/28* (2006.01)

(52) U.S. Cl.
CPC .......... *C07K 14/7051* (2013.01); *A61K 40/11* (2025.01); *A61K 40/22* (2025.01); *A61K 40/31* (2025.01); *A61K 40/42* (2025.01); *A61K 45/06* (2013.01); *C07K 14/70517* (2013.01); *C07K 14/70578* (2013.01); *C07K 16/18* (2013.01); *C07K 16/2863* (2013.01); *C07K 2317/622* (2013.01); *C07K 2317/73* (2013.01); *C07K 2319/02* (2013.01); *C07K 2319/03* (2013.01)

(58) Field of Classification Search
None
See application file for complete search history.

(56) References Cited

U.S. PATENT DOCUMENTS

| 8,822,647 | B2 | 9/2014 | Jensen |
| 9,394,368 | B2 | 7/2016 | Brogdon et al. |
| 9,567,399 | B1 | 2/2017 | Campbell et al. |
| 9,765,156 | B2 | 9/2017 | June et al. |
| 10,000,572 | B2 | 6/2018 | Lucas et al. |
| 10,308,717 | B2 | 6/2019 | Brogdon et al. |
| 10,696,749 | B2 | 6/2020 | June et al. |
| 11,046,782 | B2 * | 6/2021 | Li ............... A61K 31/675 |
| 11,795,240 | B2 | 10/2023 | June et al. |
| 11,865,167 | B2 | 1/2024 | Brogdon et al. |
| 11,890,301 | B2 | 2/2024 | June et al. |
| 2009/0270485 | A1 | 10/2009 | Ko et al. |
| 2012/0148552 | A1 | 6/2012 | Jensen |
| 2013/0280220 | A1 | 10/2013 | Ahmed et al. |
| 2014/0322183 | A1 | 10/2014 | Milone et al. |
| 2014/0322275 | A1 | 10/2014 | Brogdon et al. |
| 2016/0151491 | A1 | 6/2016 | Rabinovich et al. |
| 2016/0200819 | A1 | 7/2016 | Morgan et al. |
| 2016/0251438 | A1 | 9/2016 | Lucas et al. |
| 2016/0272717 | A1 | 9/2016 | Lucas et al. |
| 2017/0002076 | A1 | 1/2017 | Kim et al. |
| 2017/0008963 | A1 | 1/2017 | Brogdon et al. |
| 2018/0022815 | A1 | 1/2018 | Chang |
| 2018/0162939 | A1 | 6/2018 | Ma et al. |
| 2019/0112380 | A1 | 4/2019 | Chaudhary |
| 2019/0307799 | A1 | 10/2019 | Bonifant et al. |
| 2019/0338015 | A1 | 11/2019 | Juillerat et al. |
| 2019/0375815 | A1 | 12/2019 | Engels et al. |

(Continued)

FOREIGN PATENT DOCUMENTS

| CN | 105283201 A | 1/2016 |
| CN | 105358576 A | 2/2016 |

(Continued)

OTHER PUBLICATIONS

Rudikoff et al. (Proc Natl Acad Sci USA 1982 vol. 79 p. 1979.*
MacCallum et al. (J. Mol. Biol. 1996 262, 732-745).*
Pascalis et al. (The Journal of Immunology (2002) 169, 3076-3084).*
Casset et al. (BBRC 2003, 307:198-205).*
Vajdos et al. (J. Mol. Biol. (2002) 320, 415-428).*
Chen et al. (J. Mol. Bio. (1999) 293, 865-881).*
Padlan et al. (PNAS 1989, 86:5938-5942).*
Lamminmaki et al. (JBC 2001, 276:36687-36694).*
Piche-Nicholas et al. MABS 2018, 10:81-94.*
Wu et al. (J. Mol. Biol. (1999).*
Sun et al. (Oncotarget. 2016;7(27):42826-42836).*

(Continued)

*Primary Examiner* — Sharon X Wen
(74) *Attorney, Agent, or Firm* — Wolf, Greenfield & Sacks, P.C.

(57) ABSTRACT

Described herein are methods for producing and utilizing T cells comprising a chimeric antigen receptor (CAR) comprising an extracellular antigen binding domain specific for a target tumor antigen, and a polypeptide comprising an extracellular antigen binding domain specific for an extracellular polypeptide expressed on an immunosuppressive cell. The technology described herein is related to methods of treating cancer, specifically solid tumors, by targeting immunosuppressive cells found within the tumor microenvironment.

10 Claims, 5 Drawing Sheets

Specification includes a Sequence Listing.

(56) References Cited

U.S. PATENT DOCUMENTS

| | | | |
|---|---|---|---|
| 2020/0113940 | A1 | 4/2020 | Maus et al. |
| 2021/0038646 | A1 | 2/2021 | Maus et al. |
| 2023/0364139 | A1 | 11/2023 | Chen et al. |
| 2024/0075070 | A1 | 3/2024 | Maus et al. |

FOREIGN PATENT DOCUMENTS

| | | |
|---|---|---|
| CN | 105658666 A | 6/2016 |
| CN | 105796597 A | 7/2016 |
| CN | 107002045 A | 8/2017 |
| CN | 107002084 A | 8/2017 |
| CN | 107326014 A | 11/2017 |
| WO | WO 96/40210 A1 | 12/1996 |
| WO | WO 99/54440 A1 | 10/1999 |
| WO | WO 2014/011988 A2 | 1/2014 |
| WO | WO 2014/130657 A1 | 8/2014 |
| WO | WO 2014/138306 A1 | 9/2014 |
| WO | WO 2015/124715 A1 | 8/2015 |
| WO | WO 2016/016341 A1 | 2/2016 |
| WO | WO 2016/070061 A1 | 5/2016 |
| WO | WO 2016/102965 A1 | 6/2016 |
| WO | WO 2016/130598 A1 | 8/2016 |
| WO | WO 2016/187594 A1 | 11/2016 |
| WO | WO 2017/040324 A1 | 3/2017 |
| WO | WO 2017/049166 A1 | 3/2017 |
| WO | WO 2018/132427 A1 | 7/2018 |
| WO | WO 2018/191748 A1 | 10/2018 |
| WO | WO 2019/079034 A1 | 4/2019 |
| WO | WO 2019/157533 A1 | 8/2019 |
| WO | WO 2023/081808 A2 | 5/2023 |
| WO | WO 2023/201288 A1 | 10/2023 |

OTHER PUBLICATIONS

Bedquelle et al., Diversity and junction residues as hotspots of binding energy in an antibody neutralizing the dengue virus. FEBS J. Jan. 2006;273(1):34-46. doi: 10.1111/j.1742-4658.2005.05045.x.

Brown et al., Tolerance of single, but not multiple, amino acid replacements in antibody VH CDR 2: a means of minimizing B cell wastage from somatic hypermutation? J Immunol. May 1, 1996;156(9):3285-91.

Colman, Effects of amino acid sequence changes on antibody-antigen interactions. Res Immunol. Jan. 1994;145(1):33-6. doi: 10.1016/s0923-2494(94)80039-1.

Cuende et al., Monoclonal antibodies against GARP/TGF-β1 complexes inhibit the immunosuppressive activity of human regulatory T cells in vivo. Sci Transl Med. Apr. 22, 2015;7(284):284ra56. doi: 10.1126/scitranslmed.aaa1983.

Curran et al. Enhancing antitumor efficacy of chimeric antigen receptor T cells through constitutive CD40L expression. Mol Ther. Apr. 2015;23(4):769-78. doi: 10.1038/mt.2015.4. Epub Jan. 13, 2015. O'Rourke et al., A single dose of peripherally infused EGFRvIII-directed CAR T cells mediates antigen loss and induces adaptive resistance in patients with recurrent glioblastoma. Sci Transl Med. Jul. 1, 20179;9(399):eaaa0984. doi: 10.1126/scitranslmed.aaa0984.

Fan et al., EGFR phosphorylates tumor-derived EGFRvIII driving STAT3/5 and progression in glioblastoma. Cancer Cell. Oct. 14, 2013;24(4):438-49. doi: 10.1016/j.ccr.2013.09.004.

Hegde et al., A bispecific chimeric antigen receptor molecule enhances T cell activation through dual immunological synapse formation and offsets antigen escape in glioblastoma. J Immunother Cancer. 2015; 3(Suppl 2): O3.

Hegde et al., Tandem CAR T cells targeting HER2 and IL13R?2 mitigate tumor antigen escape. J Clin Invest. Aug. 1, 2016;126(8):3036-52.

Jaspers et al., Development of CAR T cells designed to improve antitumor efficacy and safety. Pharmacol Ther. Oct. 2017;178:83-91. doi: 10.1016/j.pharmthera.2017.03.012. Epub Mar. 22, 2017.

Konerua et al., IL-12 secreting tumor-targeted chimeric antigen receptor T cells eradicate ovarian tumors in vivo. Oncoimmunology. Jan. 23, 2015;4(3):e994446. doi: 10.4161/2162402X.2014.994446. eCollection Mar. 2015.

Lulli et al., Epidermal growth factor receptor inhibitors trigger a type I interferon response in human skin. Oncotarget. Jul. 26, 2016;7(30):47777-47793. doi: 10.18632/oncotarget.10013.

O'Rourke et al., A single dose of peripherally infused EGFRvIII-directed CAR T cells mediates antigen loss and induces adaptive resistance in patients with recurrent glioblastoma. Sci Transl Med. Jul. 19, 2017;9(399):eaaa0984. doi: 10.1126/scitranslmed.aaa0984.

Pegram et al., Tumor-targeted T cells modified to secrete IL-12 eradicate systemic tumors without need for prior conditioning. Blood. May 31, 2012;119(18):4133-41. doi: 10.1182/blood-2011-12-400044. Epub Feb. 21, 2012.

Pituch et al., Adoptive Transfer of IL13Rα2-Specific Chimeric Antigen Receptor T Cells Creates a Pro-inflammatory Environment in Glioblastoma. Mol Ther. Apr. 4, 2018;26(4):986-995.

Ross et al., Bispecific T cell engager (BiTE®) antibody constructs can mediate bystander tumor cell killing. PLoS One. Aug. 24, 2017;12(8):e0183390.

Rudikoff et al., Single amino acid substitution altering antigen-binding specificity. Proc Natl Acad Sci U S A. Mar. 1982;79(6):1979-83. doi: 10.1073/pnas.79.6.1979.

Sasaki et al., EGFRvIII mutation in lung cancer correlates with increased EGFR copy number. Oncol Rep. Feb. 2007;17(2):319-23.

Suarez et al., Chimeric antigen receptor T cells secreting anti-PD-L1 antibodies more effectively regress renal cell carcinoma in a humanized mouse model. Oncotarget. Jun. 7, 2016;7(23):34341-55. doi: 10.18632/oncotarget.9114.

Vajdos et al., Comprehensive functional maps of the antigen-binding site of an anti-ErbB2 antibody obtained with shotgun scanning mutagenesis. J Mol Biol. Jul. 5, 2002;320(2):415-28. doi: 10.1016/S0022-2836(02)00264-4.

Yeku et al., Armored CAR T-cells: utilizing cytokines and pro-inflammatory ligands to enhance CAR T-cell anti-tumour efficacy. Biochem Soc Trans. Apr. 15, 2016;44(2):412-8. doi: 10.1042/BST20150291.

Zah et al., T Cells Expressing CD19/CD20 Bispecific Chimeric Antigen Receptors Prevent Antigen Escape by Malignant B Cells. Cancer Immunol Res. Jun. 2016;4(6):498-508. doi: 10.1158/2326-6066.CIR-15-0231. Epub Apr. 8, 2016.

Frigault et al., "Chimeric antigen receptor-modified T cells strike back." International immunology 28(7):355-363 (2016).

Frigault et al., "Identification of chimeric antigen receptors that mediate constitutive or inducible proliferation of T cells." Cancer Immunology Research 3(4):356-367 (2015).

Maus et al., "Making better chimeric antigen receptors for adoptive T-cell therapy." Clin Cancer Res. 22(8):1875-1884 (2016).

Bonifant et al., CD123-Engager T Cells as a Novel Immunotherapeutic for Acute Myeloid Leukemia. Mol Ther. Sep. 29, 2016;24(9):1615-26. doi: 10.1038/mt.2016.116. Epub Jun. 6, 2016.

Hettich et al., Checkpoint Antibodies but not T Cell-Recruiting Diabodies Effectively Synergize with TIL-Inducing γ-Irradiation. Cancer Res. Aug. 15, 2016;76(16):4673-83. doi: 10.1158/0008-5472.CAN-15-3451. Epub Jun. 14, 2016.

Li et al., Selective targeting of GARP-LTGFβ axis in the tumor microenvironment augments PD-1 blockade via enhancing CD8+ T cell antitumor immunity. J Immunother Cancer. Sep. 2022;10(9):e005433. doi: 10.1136/jitc-2022-005433.

Lloyd et al., Modelling the human immune response: performance of a 1011 human antibody repertoire against a broad panel of therapeutically relevant antigens. Protein Eng Des Sel. Mar. 2009;22(3):159-68. doi: 10.1093/protein/gzn058. Epub Oct. 29, 2008.

Osada et al., CEA/CD3-bispecific T cell-engaging (BiTE) antibody-mediated T lymphocyte cytotoxicity maximized by inhibition of both PD1 and PD-L1. Cancer Immunol Immunother. Jun. 2015;64(6):677-88. doi: 10.1007/s00262-015-1671-y. Epub Mar. 6, 2015.

Schroeder, Jr. et al., Structure and function of immunoglobulins. J Allergy Clin Immunol. Feb. 2010;125(2 Suppl 2):S41-52. doi: 10.1016/j.jaci.2009.09.046.

Seidel et al., Anti-PD-1 and Anti-CTLA-4 Therapies in Cancer: Mechanisms of Action, Efficacy, and Limitations. Front Oncol. Mar. 28, 2018;8:86. doi: 10.3389/fonc.2018.00086. eCollection 2018.

(56) References Cited

OTHER PUBLICATIONS

Slaney et al., CARs versus BiTEs: A Comparison between T Cell-Redirection Strategies for Cancer Treatment. Cancer Discov. Aug. 2018;8(8):924-934. doi: 10.1158/2159-8290.CD-18-0297. Epub Jul. 16, 2018.
Torikai et al., A foundation for universal T-cell based immunotherapy: T cells engineered to express a CD19-specific chimeric-antigen-receptor and eliminate expression of endogenous TCR. Blood. 2012;119(24):5697-705.
Wu et al., T cell engaging bispecific antibody (T-BsAb): From technology to therapeutics. Pharmacol Ther. Feb. 2018;182:161-175. doi: 10.1016/j.pharmthera.2017.08.005. Epub Aug. 20, 2017. Author manuscript, 37 pages.
Cherkassky et al., Human CAR T cells with cell-intrinsic PD-1 checkpoint blockade resist tumor-mediated inhibition. J Clin Invest. Aug. 1, 2016;126(8):3130-44. doi: 10.1172/JCI83092. Epub Jul. 25, 2016.
Feucht et al., T-cell responses against CD19+ pediatric acute lymphoblastic leukemia mediated by bispecific T-cell engager (BiTE) are regulated contrarily by PD-L1 and CD80/CD86 on leukemic blasts. Oncotarget. Nov. 22, 2016;7(47):76902-76919. doi: 10.18632/oncotarget.12357.
Gall et al., T cells armed with anti-CD3 x anti-CD20 bispecific antibody enhance killing of CD20+ malignant B cells and bypass complement-mediated rituximab resistance in vitro. Exp Hematol. Apr. 2005;33(4):452-9. doi: 10.1016/j.exphem.2005.01.007.
Riccione et al., Generation of CAR T cells for adoptive therapy in the context of glioblastoma standard of care. J Vis Exp. Feb. 16, 2015;(96):52397. doi: 10.3791/52397.

\* cited by examiner

| Transduction Efficiencies | | | | | |
|---|---|---|---|---|---|
| CAR construct | ND38 | ND45 | ND47 | ND48 |
| pMGH 97 (GARP) | 45.1% | 46.8% | 68.0% | 81% |
| pMGH 99 (LAP H-L) | 43.6% | 57.2% | 57.1% | 79.5% |
| pMGH 100 (LAP L-H) | 5.09% | 11.2% | 72.2% | 88.2% |
| pMGH 105 (EGFR secreting GARP) | N/A | N/A | N/A | N/A |

*FIG. 2*

TARGETED T CELLS WITH CYTOTOXICITY TOWARD IMMUNOSUPPRESSIVE CELLS

CROSS-REFERENCE TO RELATED APPLICATIONS

This application is a 35 U.S.C. § 371 National Phase Entry Application of International Application No. PCT/US2018/013095 filed Jan. 10, 2018, which designates the U.S. and claims benefit under 35 U.S.C. § 119 (e) of U.S. Provisional Application No. 62/444,595 filed Jan. 10, 2017, the contents of which are incorporated herein by reference in their entireties.

GOVERNMENT LICENSE RIGHTS

This invention was made with government support under CA166039 awarded by the National Institutes of Health. The government has certain rights in the invention.

SEQUENCE LISTING

The instant application contains a Sequence Listing which has been submitted electronically in ASCII format and is hereby incorporated by reference in its entirety. Said ASCII copy, created on Jan. 30, 2018, is named 030258-089581-PCT SL.txt and is 21,857 bytes in size.

TECHNICAL FIELD

The present disclosure relates to immunotherapy.

BACKGROUND

Chimeric antigen receptors (CARs) provide a way to direct a cytotoxic T cell response to target cells expressing a selected target antigen (e.g., a tumor antigen or tumor-associated antigen) or polypeptide on the surface of a target cell. CARs are an adaptation of the T cell receptor, in which the antigen binding domain is replaced with the antigen binding domain of an antibody that specifically binds the desired target antigen or polypeptide. Engagement of the target antigen on the surface of a target cell by a CAR expressed on a T cell ("CAR T cell") stimulates activation of the T cell and promotes killing of the target cell. Described herein are methods to improve the efficacy of a CAR T cell, specifically for the treatment of solid tumors.

SUMMARY

Described herein are compositions and methods that improve upon methods of treating cancer, and particularly solid tumors, with CAR-T cells. Recognizing that tumors have an immunosuppressive microenvironment, including the presence of immunosuppressive cells including so-called regulatory T cells (Tregs) and immunosuppressive macrophages that can inhibit the anti-tumor effects of a CAR-T, the inventors have modified CAR-T cell design to not only target the tumor cells, but to also specifically target and inactivate such tumor-associated immunosuppressive cells. The CAR-T designs disclosed herein include, generally, a T cell comprising a first CAR that binds to a tumor cell surface antigen, and one or more additional constructs encoding any of several different polypeptides that target or inhibit the function of tumor-associated immunosuppressive cells, such as Tregs and/or immunosuppressive macrophages. In various embodiments, the additional construct (which can be encoded on the same construct or vector as the CAR) encodes a secreted polypeptide that inhibits tumor-associated immunosuppressive cell function, a bispecific antibody construct that binds both a cell-surface polypeptide on the CAR-T cell and a cell-surface polypeptide on a tumor-associated immunosuppressive cell, and/or a second CAR that binds to a cell surface protein expressed on a tumor-associated immunosuppressive cell. In one aspect, the expression from the additional construct or constructs is regulated by a T cell-activation-regulated promoter, such that when the first CAR binds its target tumor antigen and becomes activated, the expression from the additional construct is turned on, resulting in targeting of nearby immunosuppressive cells. This approach can enhance the efficacy of CAR-Ts for solid tumors.

Another aspect of the technology described herein provides a human cell comprising: (a) a first heterologous construct encoding a first chimeric T cell antigen receptor, the chimeric T cell antigen receptor comprising an extracellular antigen binding domain that specifically binds a target tumor antigen; and (b) a second heterologous construct encoding a polypeptide comprising an antigen-binding domain of a first antibody that specifically binds an extracellular polypeptide expressed on an immunosuppressive cell in a tumor environment.

In one embodiment of any aspect, the human cell is a T cell.

In one embodiment of any aspect, the polypeptide encoded by the second heterologous construct includes a signal sequence peptide.

In one embodiment of any aspect, the polypeptide encoded by the second heterologous construct further includes an antigen-binding domain of a second antibody, that specifically binds a polypeptide expressed on the extracellular surface of the human cell.

In one embodiment of any aspect, the polypeptide encoded by the second heterologous construct comprises a linker between the first and second antigen-binding domains.

In one embodiment of any aspect, the antigen-binding domain or domains encoded by the first or second heterologous construct comprises an scFv fragment of an antibody.

In one embodiment of any aspect, expression from the second heterologous construct is constitutive. In one embodiment of any aspect, expression from the second heterologous construct is under the control of a promoter which is induced upon activation of a T cell. In one embodiment of any aspect, the promoter is responsive to Nuclear Factor of Activated T cells (NFAT) or Notch Intracellular Domain (NICD).

In one embodiment of any aspect, the first and second heterologous constructs are encoded on a single nucleic acid.

In one embodiment of any aspect, the immunosuppressive cell is a Treg cell or an immunosuppressive macrophage.

In one embodiment of any aspect, the polypeptide expressed on the extracellular surface of an immunosuppressive cell is an immune checkpoint polypeptide. In one embodiment of any aspect, the polypeptide expressed on the extracellular surface of an immunosuppressive cell is CTLA4, PD-L1, GARP or LAP.

One aspect of the technology described herein provides a human cell comprising: (a) a heterologous construct encoding a first chimeric T cell antigen receptor, the chimeric T cell antigen receptor comprising an extracellular antigen binding domain that specifically binds a target tumor antigen; and (b) a heterologous construct encoding a second chimeric T cell antigen receptor, the chimeric T cell antigen receptor comprising an extracellular antigen binding domain that specifically binds a polypeptide expressed on the surface of an immunosuppressive cell in a tumor environment.

In one embodiment of any aspect, the human cell is a T cell.

In one embodiment of any aspect, the second chimeric T cell antigen receptor is constitutively expressed.

In one embodiment of any aspect, the expression of the second chimeric T cell antigen receptor is under the control of a promoter which is induced upon activation of the T cell.

In one embodiment of any aspect, the promoter is responsive to Nuclear Factor of Activated T cells (NFAT) or Notch Intracellular Domain (NICD).

In one embodiment of any aspect, the immunosuppressive cell is a Treg cell or an immunosuppressive macrophage.

In one embodiment of any aspect, the polypeptide expressed on the surface of an immunosuppressive cell is an immune checkpoint polypeptide. In one embodiment of any aspect, the polypeptide expressed on the surface of an immunosuppressive cell is cytotoxic T-lymphocyte associated protein 4 (CTLA4), programmed death ligand 1 (PD-L1), glycoprotein A repetitions predominant (GARP), or latency associated peptide (LAP).

In one embodiment of any aspect, the extracellular antigen binding domain of the first or second chimeric T cell antigen receptors comprises an scFV fragment of an antibody.

In one embodiment of any aspect, the first or second chimeric T cell antigen receptor comprises a hinge and/or transmembrane domain from CD8 or 4-1BB.

In one embodiment of any aspect, the first and second chimeric T cell antigen receptors each comprise an intracellular signaling domain selected from the group consisting of CD3ζ, CD3ε, or CD3θ.

In one embodiment of any aspect, the first and second chimeric T cell antigen receptors each comprise an intracellular signaling domain comprising a co-stimulatory domain. In one embodiment of any aspect, the co-stimulatory domain on either chimeric T cell antigen receptor is selected from the group consisting of 4-1BB, CD28, CD27, ICOS, and OX40.

In one embodiment of any aspect, the first and second chimeric T cell antigen receptors are encoded on one nucleic acid construct.

In one embodiment of any aspect, any of the cells described herein kills an activated Treg or inhibitory macrophage in a tumor environment through contact.

Another aspect of the technology described herein provides a nucleic acid construct encoding (a) a first chimeric T cell antigen receptor, the chimeric T cell antigen receptor comprising an extracellular antigen binding domain that specifically binds a target tumor antigen; and (b) a construct encoding a polypeptide comprising an antigen-binding domain of a first antibody that specifically binds an extracellular polypeptide expressed on an immunosuppressive cell in a tumor environment.

In one embodiment of any aspect described herein, the polypeptide encoded by the construct of (b) comprises a signal peptide fused to a polypeptide comprising the first antibody or antigen-binding domain thereof that specifically binds an extracellular polypeptide expressed on an immunosuppressive cell in a tumor environment.

In one embodiment of any aspect described herein, the polypeptide encoded by the construct of (b) further comprises a second antibody or antigen-binding domain thereof that specifically binds a polypeptide expressed on the surface of an effector T cell. In one embodiment of any aspect described herein, the polypeptide encoded by the construct of (b) further comprises a linker peptide between the first and second antibodies or antigen-binding domains thereof.

In one embodiment of any aspect described herein, the polypeptide encoded by the construct of (b) comprises a second chimeric T cell antigen receptor, the second T cell antigen receptor comprising an antigen-binding domain that specifically binds an extracellular polypeptide expressed on an immunosuppressive cell in a tumor environment.

In one embodiment of any aspect described herein, expression from the construct of (b) is under the control of a promoter which is induced upon activation of a T cell. In one embodiment of any aspect described herein, the promoter is responsive to Nuclear Factor of Activated T cells (NFAT) or Notch Intracellular Domain (NICD).

In one embodiment of any aspect described herein, the antigen-binding domains of (a) and/or (b) comprise an scFV fragment of an antibody.

Another aspect of the technology described herein provides a vector comprising any of the nucleic acid constructs described herein.

Another aspect of the technology described herein provides a viral vector comprising any of the nucleic acid constructs described herein. In one embodiment of any aspect described herein, the viral vector is a lentiviral vector.

Another aspect of the technology described herein provides a chimeric antigen receptor T cell (CAR-T) made by introducing any of the nucleic acid constructs or any of the vectors described herein to a T cell.

Another aspect of the technology described herein provides a method of treating cancer in an individual in need thereof, comprising administering any of the genetically-modified cells described herein to the individual. The genetically-modified cells can be autologous to the individual.

In one embodiment of any aspect described herein, the cancer is a solid tumor. Exemplary solid tumors include glioblastoma, melanoma, breast cancer and ovarian cancer.

Another aspect of the technology described herein provides a method of reducing the number of immunosuppressive cells in or associated with a solid tumor comprising administering any of the cells described herein to an individual having such a tumor. In one embodiment of any aspect described herein, the cell is autologous to the individual having cancer or a solid tumor.

In one embodiment of any aspect described herein, the method further comprise administering an anti-cancer therapeutic. Exemplary anti-cancer therapeutics include an immune checkpoint inhibitor or a chemotherapeutic agent.

Definitions

For convenience, the meaning of some terms and phrases used in the specification, examples, and appended claims, are provided below. Unless stated otherwise, or implicit from context, the following terms and phrases include the meanings provided below. The definitions are provided to aid in describing particular embodiments, and are not intended to limit the claimed technology, because the scope of the technology is limited only by the claims. Unless otherwise defined, all technical and scientific terms used herein have the same meaning as commonly understood by one of ordinary skill in the art to which this technology belongs. If there is an apparent discrepancy between the usage of a term in the art and its definition provided herein, the definition provided within the specification shall prevail.

Definitions of common terms in immunology and molecular biology can be found in The Merck Manual of Diagnosis and Therapy, 19th Edition, published by Merck Sharp & Dohme Corp., 2011 (ISBN 978-0-911910-19-3); Robert S. Porter et al. (eds.), The Encyclopedia of Molecular Cell Biology and Molecular Medicine, published by Blackwell Science Ltd., 1999-2012 (ISBN 9783527600908); and Robert A. Meyers (ed.), Molecular Biology and Biotechnology: a Comprehensive Desk Reference, published by VCH Publishers, Inc., 1995 (ISBN 1-56081-569-8); Immunology by Werner Luttmann, published by Elsevier, 2006; Janeway's Immunobiology, Kenneth Murphy, Allan Mowat, Casey Weaver (eds.), Taylor & Francis Limited, 2014 (ISBN 0815345305, 9780815345305); Lewin's Genes XI, published by Jones & Bartlett Publishers, 2014 (ISBN-1449659055); Michael Richard Green and Joseph Sambrook, Molecular Cloning: A Laboratory Manual, 4th ed., Cold Spring Harbor Laboratory Press, Cold Spring Harbor, N.Y., USA (2012) (ISBN 1936113414); Davis et al., Basic Methods in Molecular Biology, Elsevier Science Publishing, Inc., New York, USA (2012) (ISBN 044460149X); Laboratory Methods in Enzymology: DNA, Jon Lorsch (ed.) Elsevier, 2013 (ISBN 0124199542); Current Protocols in Molecular Biology (CPMB), Frederick M. Ausubel (ed.), John Wiley and Sons, 2014 (ISBN 047150338X, 9780471503385), Current Protocols in Protein Science (CPPS), John E. Coligan (ed.), John Wiley and Sons, Inc., 2005; and Current Protocols in Immunology (CPI) (John E. Coligan, ADA M Kruisbeek, David H Margulies, Ethan M Shevach, Warren Strobe, (eds.) John Wiley and Sons, Inc., 2003 (ISBN 0471142735, 9780471142737), the contents of which are all incorporated by reference herein in their entireties.

The terms "decrease", "reduced", "reduction", or "inhibit" are all used herein to mean a decrease by a statistically significant amount. In some embodiments, "reduce," "reduction" or "decrease" or "inhibit" typically means a decrease by at least 10% as compared to a reference level (e.g. the absence of a given treatment or agent) and can include, for example, a decrease by at least about 10%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 95%, at least about 98%, at least about 99%, or more. As used herein, "reduction" or "inhibition" does not encompass a complete inhibition or reduction as compared to a reference level. "Complete inhibition" is a 100% inhibition as compared to a reference level. Where applicable, a decrease can be preferably down to a level accepted as within the range of normal for an individual without a given disorder.

The terms "increased", "increase", "enhance", or "activate" are all used herein to mean an increase by a statically significant amount. In some embodiments, the terms "increased", "increase", "enhance", or "activate" can mean an increase of at least 10% as compared to a reference level, for example an increase of at least about 20%, or at least about 30%, or at least about 40%, or at least about 50%, or at least about 60%, or at least about 70%, or at least about 80%, or at least about 90% or up to and including a 100% increase or any increase between 10-100% as compared to a reference level, or at least about a 2-fold, or at least about a 3-fold, or at least about a 4-fold, or at least about a 5-fold or at least about a 10-fold increase, or any increase between 2-fold and 10-fold or greater as compared to a reference level. In the context of a marker or symptom, an "increase" is a statistically significant increase in such level.

As used herein, a "subject" means a human or animal. Usually the animal is a vertebrate such as a primate, rodent, domestic animal or game animal. Primates include, for example, chimpanzees, cynomologous monkeys, spider monkeys, and macaques, e.g., Rhesus. Rodents include, for example, mice, rats, woodchucks, ferrets, rabbits and hamsters. Domestic and game animals include, for example, cows, horses, pigs, deer, bison, buffalo, feline species, e.g., domestic cat, canine species, e.g., dog, fox, wolf, avian species, e.g., chicken, emu, ostrich, and fish, e.g., trout, catfish and salmon. In some embodiments, the subject is a mammal, e.g., a primate, e.g., a human. The terms, "individual," "patient" and "subject" are used interchangeably herein.

Preferably, the subject is a mammal. The mammal can be a human, non-human primate, mouse, rat, dog, cat, horse, or cow, but is not limited to these examples. Mammals other than humans can be advantageously used as subjects that represent animal models of disease e.g., cancer. A subject can be male or female.

A subject can be one who has been previously diagnosed with or identified as suffering from or having a condition in need of treatment (e.g. solid tumors or another type of cancer, among others) or one or more complications related to such a condition, and optionally, have already undergone treatment for the condition or the one or more complications related to the condition. Alternatively, a subject can also be one who has not been previously diagnosed as having such condition or related complications. For example, a subject can be one who exhibits one or more risk factors for the condition or one or more complications related to the condition or a subject who does not exhibit risk factors.

A "subject in need" of treatment for a particular condition can be a subject having that condition, diagnosed as having that condition, or at risk of developing that condition.

As used herein, the term "immunosuppressive cell" refers to a cell that contributes to or promotes an immunosuppressive tumor microenvironment. The presence of a population of immunosuppressive cells in a tumor microenvironment, also referred to herein as "tumor-associated immunosuppressive cells" increases the tumor's resistance to an immune response, resulting in tumor protection, tumor escape, and/or tumor metastasis. Unless countered in some manner, tumor-associated immunosuppressive cells can decrease the efficacy of immune-mediated anti-cancer treatments (e.g., CART cell therapy).

Exemplary immunosuppressive cells include cancer-associated fibroblasts, myeloid-derived suppressor cells, regulatory T cells (Tregs), and immunosuppressive macrophages. These cell types can be identified by one skill in the art using, e.g., flow cytometry to identify cell surface markers of Tregs (e.g, CD4, FoxP3, CD45RA, and CD25), macrophages (e.g., CSF-1R, CD163, IL-10, TGFbeta, and arginase1), cancer associated fibroblasts (e.g., alpha smooth muscle actin, fibroblast activation protein, tenascin-C, periostin, NG2, vmentin, desmin, PDGFR alpha and beta, FSP-1, ASPN, and STC1), and myeloid-derived suppressor cells (e.g., CD33, CD14, and low levels of HLA DR).

As used herein, the terms "tumor antigen" and "cancer antigen" are used interchangeably to refer to antigens which are differentially expressed by cancer cells and can thereby be exploited in order to target cancer cells. Cancer antigens are antigens which can potentially stimulate apparently tumor-specific immune responses. Some of these antigens are encoded, although not necessarily expressed, by normal cells. These antigens can be characterized as those which are normally silent (i.e., not expressed) in normal cells, those that are expressed only at certain stages of differentiation and those that are temporally expressed such as embryonic and fetal antigens. Other cancer antigens are encoded by mutant cellular genes, such as oncogenes (e.g., activated ras oncogene), suppressor genes (e.g., mutant p53), and fusion proteins resulting from internal deletions or chromosomal translocations. Still other cancer antigens can be encoded by viral genes such as those carried on RNA and DNA tumor viruses. Tumor antigens have been identified for a variety of solid tumors, including, but not limited to: MAGE 1, 2, & 3, defined by immunity; MART-1/Melan-A, gp100, carcinoembryonic antigen (CEA), HER2, mucins (i.e., MUC-1), prostate-specific antigen (PSA), and prostatic acid phosphatase (PAP), to name a few. In addition, viral proteins such as some encoded by hepatitis B (HBV), Epstein-Barr (EBV), and human papilloma (HPV) have been shown to be important in the development of hepatocellular carcinoma, lymphoma, and cervical cancer, respectively.

As used herein, the term "chimeric" refers to the product of the fusion of portions of at least two or more different polynucleotide molecules. In one embodiment, the term "chimeric" refers to a gene expression element produced through the manipulation of known elements or other polynucleotide molecules.

As used herein, the term "extracellular target-binding domain" refers to a polypeptide found on the outside of the cell which is sufficient to facilitate binding to a target. The extracellular target binding domain will specifically bind to its binding partner, i.e. the target. As non-limiting examples, the extracellular target-binding domain can include an antigen-binding domain of an antibody, or a ligand, which recognizes and binds with a cognate binding partner (for example, EGFR, or GARP) protein. In this context, a ligand is a molecule which binds specifically to a portion of a protein and/or receptor. The cognate binding partner of a ligand useful in the methods and compositions described herein can generally be found on the surface of a cell. Ligand:cognate partner binding can result in the alteration of the ligand-bearing receptor, or activate a physiological response, for example, the activation of a signaling pathway. In one embodiment, the ligand can be non-native to the genome. Optionally, the ligand has a conserved function across at least two species. In one embodiment, the extracellular target binding domain comprises a non-antibody ligand (e.g., A PRoliferation-Inducing Ligand (APRIL)).

As used herein, a "CAR T cell" or "CAR-T" refers to a T cell which expresses a CAR. When expressed in a T cell, CARs have the ability to redirect T-cell specificity and reactivity toward a selected target in a non-MHC-restricted manner, exploiting the antigen-binding properties of monoclonal antibodies. The non-MHC-restricted antigen recognition gives T-cells expressing CARS the ability to recognize an antigen independent of antigen processing, thus bypassing a major mechanism of tumor escape.

In some embodiments, "activation" can refer to the state of a T cell that has been sufficiently stimulated to induce detectable cellular proliferation. In some embodiments activation can refer to induced cytokine production. In other embodiments, activation can refer to detectable effector functions. At a minimum, an "activated T cell" as used herein is a proliferative T cell.

As used herein, the terms "specific binding" and "specifically binds" refer to a physical interaction between two molecules, compounds, cells and/or particles wherein the first entity binds to the second, target, entity with greater specificity and affinity than it binds to a third entity which is a non-target. In some embodiments, specific binding can refer to an affinity of the first entity for the second, target, entity, which is at least 10 times, at least 50 times, at least 100 times, at least 500 times, at least 1000 times or more greater than the affinity for the third non-target entity under the same conditions. A reagent specific for a given target is one that exhibits specific binding for that target under the conditions of the assay being utilized. A non-limiting example includes an antibody, or a ligand, which recognizes and binds with a cognate binding partner (for example, a stimulatory and/or costimulatory molecule present on a T cell) protein.

As used herein, "dissociation constant ($K_d$)" refers to the likelihood of a larger object to dissociate into small objects (e.g., the likelihood of a bound antigen-binding protein to separate). Typically, antigen-binding proteins (such as an antibody or portion of an antibody as described herein) will bind to their cognate or specific antigen with a dissociation constant (KD of $10^{-5}$ to $10^{-12}$ moles/liter or less, such as $10^{-7}$ to $10^{-12}$ moles/liter or less, or $10^{-8}$ to $10^{-12}$ moles/liter (i.e., with an association constant (KA) of $10^5$ to $10^{12}$ liter/moles or more, such as $10^7$ to $10^{12}$ liter/moles or $10^8$ to $10^{12}$ liter/moles). Any KD value greater than $10^{-4}$ mol/liter (or any KA value lower than $10^4 M^{-1}$) is generally considered to indicate non-specific binding. The KD for biological interactions which are considered meaningful (e.g., specific) are typically in the range of $10^{-10}$ M (0.1 nM) to $10^{-5}$M (10000 nM). The stronger an interaction, the lower is its KD. For example, a binding site on an antibody or portion thereof described herein will bind to the desired antigen with an affinity less than 500 nM, such as less than 200 nM, or less than 10 nM, such as less than 500 pM. Specific binding of an antigen-binding protein to an antigen or antigenic determinant can be determined in any suitable manner known per se, including, for example, Scatchard analysis and/or competitive binding assays, such as radioimmunoassays (RIA), enzyme immunoassays (EIA) and sandwich competition assays, and the different variants thereof known per se in the art; as well as other techniques as mentioned herein.

A "stimulatory ligand," as used herein, refers to a ligand that when present on an antigen presenting cell (APC e.g., a macrophage, a dendritic cell, a B-cell, an artificial APC, and the like) can specifically bind with a cognate binding partner (referred to herein as a "stimulatory molecule" or "co-stimulatory molecule") on a T cell, thereby mediating a primary response by the T cell, including, but not limited to, proliferation, activation, initiation of an immune response, and the like. Stimulatory ligands are well-known in the art and encompass, inter alia, an MHC Class I molecule loaded with a peptide, an anti-CD3 antibody, a superagonist anti-CD28 antibody, and a superagonist anti-CD2 antibody.

A "stimulatory molecule," as the term is used herein, means a molecule on a T cell that specifically binds with a cognate stimulatory ligand present on an antigen presenting cell.

"Co-stimulatory ligand," as the term is used herein, includes a molecule on an APC that specifically binds a cognate co-stimulatory molecule on a T cell, thereby providing a signal which, in addition to the primary signal provided by, for instance, binding of a TCR/CD3 complex with an MHC molecule loaded with peptide, mediates a T cell response, including, but not limited to, proliferation, activation, differentiation, and the like. A co-stimulatory ligand can include, but is not limited to, 4-1BBL, OX40L, CD7, B7-1 (CD80), B7-2 (CD86), PD-L1, PD-L2, inducible COStimulatory ligand (ICOS-L), intercellular adhesion molecule (ICAM), CD30L, CD40, CD70, CD83, HLA-G, MICA, MICB, HVEM, lymphotoxin beta receptor, 3/TR6, ILT3, ILT4, HVEM, an agonist or antibody that binds Toll-like receptor and a ligand that specifically binds with B7-H3. A co-stimulatory ligand also can include, but is not limited to, an antibody that specifically binds with a co-stimulatory molecule present on a T cell, such as, but not limited to, CD27, CD28, 4-1BB, OX40, CD30, CD40, PD-1, ICOS, lymphocyte function-associated antigen-1 (LFA-1), CD2, CD7, LIGHT, NKG2C, B7-H3, and a ligand that specifically binds with CD83.

A "co-stimulatory molecule" refers to the cognate binding partner on a T cell that specifically binds with a co-stimulatory ligand, thereby mediating a co-stimulatory response by the T cell, such as, but not limited to, proliferation. Co-stimulatory molecules include, but are not limited to an MHC class I molecule, BTLA, a Toll-like receptor, CD27, CD28, 4-1BB, OX40, CD30, CD40, PD-1, ICOS, lymphocyte function-associated antigen-1 (LFA-1), CD2, CD7, LIGHT, NKG2C, B7-H3, and CD83.

In one embodiment, the term "engineered" and its grammatical equivalents as used herein can refer to one or more human-designed alterations of a nucleic acid, e.g., the nucleic acid within an organism's genome. In another embodiment, engineered can refer to alterations, additions, and/or deletion of genes. An "engineered cell" can refer to a cell with an added, deleted and/or altered gene. The term "cell" or "engineered cell" and their grammatical equivalents as used herein can refer to a cell of human or non-human animal origin.

As used herein, the term "operably linked" refers to a first polynucleotide molecule, such as a promoter, connected with a second transcribable polynucleotide molecule, such as a gene of interest, where the polynucleotide molecules are so arranged that the first polynucleotide molecule affects the function of the second polynucleotide molecule. The two polynucleotide molecules may or may not be part of a single contiguous polynucleotide molecule and may or may not be adjacent. For example, a promoter is operably linked to a gene of interest if the promoter regulates or mediates transcription of the gene of interest in a cell.

In the various embodiments described herein, it is further contemplated that variants (naturally occurring or otherwise), alleles, homologs, conservatively modified variants, and/or conservative substitution variants of any of the particular polypeptides described are encompassed. As to amino acid sequences, one of ordinary skill will recognize that individual substitutions, deletions or additions to a nucleic acid, peptide, polypeptide, or protein sequence which alters a single amino acid or a small percentage of amino acids in the encoded sequence is a "conservatively modified variant" where the alteration results in the substitution of an amino acid with a chemically similar amino acid and retains the desired activity of the polypeptide. Such conservatively modified variants are in addition to and do not exclude polymorphic variants, interspecies homologs, and alleles consistent with the disclosure.

A given amino acid can be replaced by a residue having similar physicochemical characteristics, e.g., substituting one aliphatic residue for another (such as Ile, Val, Leu, or Ala for one another), or substitution of one polar residue for another (such as between Lys and Arg; Glu and Asp; or Gln and Asn). Other such conservative substitutions, e.g., substitutions of entire regions having similar hydrophobicity characteristics, are well known. Polypeptides comprising conservative amino acid substitutions can be tested in any one of the assays described herein to confirm that a desired activity, e.g. ligan-mediated receptor activity and specificity of a native or reference polypeptide is retained.

Amino acids can be grouped according to similarities in the properties of their side chains (in A. L. Lehninger, in Biochemistry, second ed., pp. 73-75, Worth Publishers, New York (1975)): (1) non-polar: Ala (A), Val (V), Leu (L), Ile (I), Pro (P), Phe (F), Trp (W), Met (M); (2) uncharged polar: Gly (G), Ser (S), Thr (T), Cys (C), Tyr (Y), Asn (N), Gln (Q); (3) acidic: Asp (D), Glu (E); (4) basic: Lys (K), Arg (R), His (H). Alternatively, naturally occurring residues can be divided into groups based on common side-chain properties: (1) hydrophobic: Norleucine, Met, Ala, Val, Leu, Ile; (2) neutral hydrophilic: Cys, Ser, Thr, Asn, Gln; (3) acidic: Asp, Glu; (4) basic: His, Lys, Arg; (5) residues that influence chain orientation: Gly, Pro; (6) aromatic: Trp, Tyr, Phe. Non-conservative substitutions will entail exchanging a member of one of these classes for another class. Particular conservative substitutions include, for example; Ala into Gly or into Ser; Arg into Lys; Asn into Gln or into His; Asp into Glu; Cys into Ser; Gln into Asn; Glu into Asp; Gly into Ala or into Pro; His into Asn or into Gln; Ile into Leu or into Val; Leu into Ile or into Val; Lys into Arg, into Gln or into Glu; Met into Leu, into Tyr or into Ile; Phe into Met, into Leu or into Tyr; Ser into Thr; Thr into Ser; Trp into Tyr; Tyr into Trp; and/or Phe into Val, into Ile or into Leu.

In some embodiments, a polypeptide described herein (or a nucleic acid encoding such a polypeptide) can be a functional fragment of one of the amino acid sequences described herein. As used herein, a "functional fragment" is a fragment or segment of a peptide which retains at least 50% of the wildtype reference polypeptide's activity according to an assay known in the art or described below herein. A functional fragment can comprise conservative substitutions of the sequences disclosed herein.

In some embodiments, a polypeptide described herein can be a variant of a polypeptide or molecule as described herein. In some embodiments, the variant is a conservatively modified variant. Conservative substitution variants can be obtained by mutations of native nucleotide sequences, for example. A "variant," as referred to herein, is a polypeptide substantially homologous to a native or reference polypeptide, but which has an amino acid sequence different from that of the native or reference polypeptide because of one or a plurality of deletions, insertions or substitutions. Variant polypeptide-encoding DNA sequences encompass sequences that comprise one or more additions, deletions, or substitutions of nucleotides when compared to a native or reference DNA sequence, but that encode a variant protein or fragment thereof that retains activity of the non-variant polypeptide. A wide variety of PCR-based site-specific mutagenesis approaches are known in the art and can be applied by the ordinarily skilled artisan.

A variant amino acid or DNA sequence can be at least 90%, at least 91%, at least 92%, at least 93%, at least 94%, at least 95%, at least 96%, at least 97%, at least 98%, at least 99%, or more, identical to a native or reference sequence. The degree of homology (percent identity) between a native and a mutant sequence can be determined, for example, by comparing the two sequences using freely available computer programs commonly employed for this purpose on the world wide web (e.g. BLASTp or BLASTn with default settings).

Alterations of the native amino acid sequence can be accomplished by any of a number of techniques known to one of skill in the art. Mutations can be introduced, for example, at particular loci by synthesizing oligonucleotides containing a mutant sequence, flanked by restriction sites permitting ligation to fragments of the native sequence. Following ligation, the resulting reconstructed sequence encodes an analog having the desired amino acid insertion, substitution, or deletion. Alternatively, oligonucleotide-directed site-specific mutagenesis procedures can be employed to provide an altered nucleotide sequence having particular codons altered according to the substitution, deletion, or insertion required. Techniques for making such alterations are well established and include, for example, those disclosed by Walder et al. (Gene 42:133, 1986); Bauer et al. (Gene 37:73, 1985); Craik (BioTechniques, January 1985, 12-19); Smith et al. (Genetic Engineering: Principles and Methods, Plenum Press, 1981); and U.S. Pat. Nos. 4,518,584 and 4,737,462, which are herein incorporated by reference in their entireties. Any cysteine residue not involved in maintaining the proper conformation of a polypeptide also can be substituted, generally with serine, to improve the oxidative stability of the molecule and prevent aberrant crosslinking. Conversely, cysteine bond(s) can be added to a polypeptide to improve its stability or facilitate oligomerization.

As used herein, the term "DNA" is defined as deoxyribonucleic acid. The term "polynucleotide" is used herein interchangeably with "nucleic acid" to indicate a polymer of nucleosides. Typically a polynucleotide is composed of nucleosides that are naturally found in DNA or RNA (e.g., adenosine, thymidine, guanosine, cytidine, uridine, deoxyadenosine, deoxythymidine, deoxyguanosine, and deoxycytidine) joined by phosphodiester bonds. However the term encompasses molecules comprising nucleosides or nucleoside analogs containing chemically or biologically modified bases, modified backbones, etc., whether or not found in naturally occurring nucleic acids, and such molecules may be preferred for certain applications. Where this application refers to a polynucleotide it is understood that both DNA, RNA, and in each case both single- and double-stranded forms (and complements of each single-stranded molecule) are provided. "Polynucleotide sequence" as used herein can refer to the polynucleotide material itself and/or to the sequence information (i.e. the succession of letters used as abbreviations for bases) that biochemically characterizes a specific nucleic acid. A polynucleotide sequence presented herein is presented in a 5' to 3' direction unless otherwise indicated.

The term "polypeptide" as used herein refers to a polymer of amino acids. The terms "protein" and "polypeptide" are used interchangeably herein. A peptide is a relatively short polypeptide, typically between about 2 and 60 amino acids in length. Polypeptides used herein typically contain amino acids such as the 20 L-amino acids that are most commonly found in proteins. However, other amino acids and/or amino acid analogs known in the art can be used. One or more of the amino acids in a polypeptide may be modified, for example, by the addition of a chemical entity such as a carbohydrate group, a phosphate group, a fatty acid group, a linker for conjugation, functionalization, etc. A polypeptide that has a nonpolypeptide moiety covalently or noncovalently associated therewith is still considered a "polypeptide." Exemplary modifications include glycosylation and palmitoylation. Polypeptides can be purified from natural sources, produced using recombinant DNA technology or synthesized through chemical means such as conventional solid phase peptide synthesis, etc. The term "polypeptide sequence" or "amino acid sequence" as used herein can refer to the polypeptide material itself and/or to the sequence information (i.e., the succession of letters or three letter codes used as abbreviations for amino acid names) that biochemically characterizes a polypeptide. A polypeptide sequence presented herein is presented in an N-terminal to C-terminal direction unless otherwise indicated.

As used herein, the terms "treat," "treatment," "treating," or "amelioration" refer to therapeutic treatments, wherein the object is to reverse, alleviate, ameliorate, inhibit, slow down or stop the progression or severity of a condition, disease, or disorder, e.g. solid tumor or other cancer. The term "treating" includes reducing or alleviating at least one adverse effect or symptom of a condition, disease or disorder. Treatment is generally "effective" if one or more symptoms or clinical markers are reduced. Alternatively, treatment is "effective" if the progression of a disease is reduced or halted. That is, "treatment" includes not just the improvement of symptoms or markers, but also a cessation of, or at least slowing of, progress or worsening of symptoms compared to what would be expected in the absence of treatment. Beneficial or desired clinical results include, but are not limited to, alleviation of one or more symptom(s), diminishment of extent of disease, stabilized (i.e., not worsening) state of disease, delay or slowing of disease progression, amelioration or palliation of the disease state, remission (whether partial or total), and/or decreased mortality, whether detectable or undetectable. The term "treatment" of a disease also includes providing relief from the symptoms or side-effects of the disease (including palliative treatment).

As used herein, "vector" refers to a nucleic acid construct designed for delivery to a host cell or for transfer between different host cells. As used herein, a vector can be viral or non-viral. The term "vector" encompasses any genetic element that is capable of replication when associated with the proper control elements and that can transfer gene sequences to cells. A vector can include, but is not limited to, a cloning vector, an expression vector, a plasmid, phage, transposon, cosmid, artificial chromosome, virus, virion, etc.

As used herein, the term "viral vector" refers to a nucleic acid vector construct that includes at least one element of viral origin and has the capacity to be packaged into a viral particle. The viral vector can contain a nucleic acid encoding a polypeptide as described herein in place of non-essential viral genes. The vector and/or particle may be utilized for the purpose of transferring nucleic acids into cells either in vitro or in vivo. Numerous forms of viral vectors are known in the art.

The term "expression" refers to the cellular processes involved in producing RNA and proteins and as appropriate, secreting proteins, including where applicable, but not limited to, for example, transcription, transcript processing, translation and protein folding, modification and processing. "Expression products" include RNA transcribed from a gene, and polypeptides obtained by translation of mRNA transcribed from a gene. The term "gene" means the nucleic acid sequence which is transcribed (DNA) to RNA in vitro or in vivo when operably linked to appropriate regulatory sequences. The gene may or may not include regions preceding and following the coding region, e.g. 5' untranslated (5'UTR) or "leader" sequences and 3' UTR or "trailer" sequences, as well as intervening sequences (introns) between individual coding segments (exons).

As used herein, the term "pharmaceutical composition" refers to the active agent in combination with a pharmaceutically acceptable carrier e.g. a carrier commonly used in the pharmaceutical industry. The phrase "pharmaceutically acceptable" is employed herein to refer to those compounds, materials, compositions, and/or dosage forms which are, within the scope of sound medical judgment, suitable for use in contact with the tissues of human beings and animals without excessive toxicity, irritation, allergic response, or other problem or complication, commensurate with a reasonable benefit/risk ratio. In some embodiments of any of the aspects, a pharmaceutically acceptable carrier can be a carrier other than water. In some embodiments of any of the aspects, a pharmaceutically acceptable carrier can be a cream, emulsion, gel, liposome, nanoparticle, and/or ointment. In some embodiments of any of the aspects, a pharmaceutically acceptable carrier can be an artificial or engineered carrier, e.g., a carrier in which the active ingredient would not be found to occur in nature.

As used herein, the term "administering," refers to the placement of a therapeutic or pharmaceutical composition as disclosed herein into a subject by a method or route which results in at least partial delivery of the agent at a desired site. Pharmaceutical compositions comprising agents as disclosed herein can be administered by any appropriate route which results in an effective treatment in the subject.

The term "statistically significant" or "significantly" refers to statistical significance and generally means a two standard deviation (2SD) or greater difference.

Other than in the operating examples, or where otherwise indicated, all numbers expressing quantities of ingredients or reaction conditions used herein should be understood as modified in all instances by the term "about." The term "about" when used in connection with percentages can mean±1%.

As used herein, the term "comprising" means that other elements can also be present in addition to the defined elements presented. The use of "comprising" indicates inclusion rather than limitation.

The term "consisting of" refers to compositions, methods, and respective components thereof as described herein, which are exclusive of any element not recited in that description of the embodiment.

As used herein the term "consisting essentially of" refers to those elements required for a given embodiment. The term permits the presence of additional elements that do not materially affect the basic and novel or functional characteristic(s) of that embodiment of the technology.

The singular terms "a," "an," and "the" include plural referents unless context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The abbreviation, "e.g." is derived from the Latin exempli gratia, and is used herein to indicate a non-limiting example. Thus, the abbreviation "e.g." is synonymous with the term "for example."

In some embodiments of any of the aspects, the disclosure described herein does not concern a process for cloning human beings, processes for modifying the germ line genetic identity of human beings, uses of human embryos for industrial or commercial purposes or processes for modifying the genetic identity of animals which are likely to cause them suffering without any substantial medical benefit to man or animal, and also animals resulting from such processes.

Other terms are defined within the description of the various aspects and embodiments of the technology of the following.

BRIEF DESCRIPTION OF THE DRAWINGS

FIG. 2 presents exemplary experimental data showing the transduction efficiency for exemplary CAR constructs.

DETAILED DESCRIPTION

Figure 1:
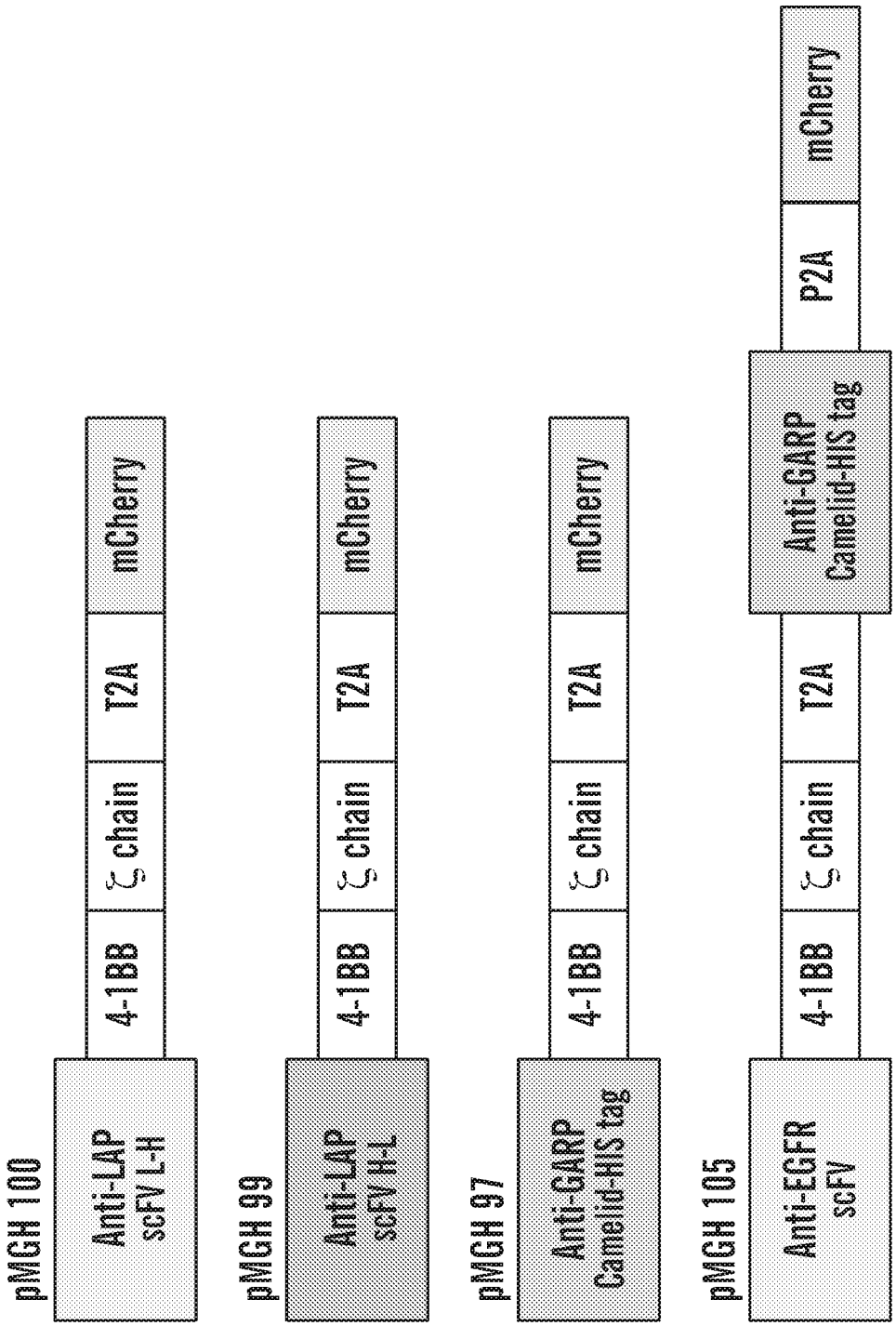
FIG. 1 presents schematics of exemplary CAR constructs that target, e.g., Tregs.

Described herein are compositions and methods that improve upon methods of treating cancer, and particularly solid tumors, with CAR-T cells. In order to counter the inhibitory effects of tumor-associated immunosuppressive cells on CAR-T cells administered to attack a tumor, the CAR-T cell designs described herein include, in addition to a construct encoding a CAR that targets a tumor antigen, one or more additional constructs encoding any of several different polypeptides that target or inhibit the function of tumor-associated immunosuppressive cells, such as Tregs and/or immunosuppressive macrophages. In various embodiments, the additional construct (which can be encoded on the same construct or vector as the CAR) encodes a secreted polypeptide that inhibits tumor-associated immunosuppressive cell function, a bispecific antibody construct that binds both a cell-surface polypeptide on the CAR-T cell and a cell-surface polypeptide on a tumor-associated immunosuppressive cell, and/or a second CAR that binds to a cell surface protein expressed on a tumor-associated immunosuppressive cell. The following discusses the materials and considerations involved in generating and using the subject modified CAR-T cells for the treatment of cancer, and in particular, solid tumors.

Immunosuppressive Cells

The compositions and methods described herein target immunosuppressive cells in the tumor microenvironment in order to promote the efficacy of immunotherapies including CAR-T immunotherapy. An immunosuppressive cell is a tumor-associated cell that can contribute to the protection of a tumor or a cell thereof from an immune response.

In one embodiment, the immunosuppressive cell targeted by a cell or construct as described herein is a Treg or an immunosuppressive macrophage. In an alternative embodiment, the immunosuppressive cell is cancer-associated fibroblast or myeloid-derived suppressor cell.

Regulatory T cells (Tregs) are a subpopulation of T cells that regulate the immune system to maintain tolerance of self-antigens, and prevent an auto-immune response (e.g., an auto-immune disease). Tregs secrete cytokines that inhibit an immune response, such as TGFbeta, Interleukin (IL)-35, and IL-10. Tregs comprise an immunosuppressive function and can inhibit induction and proliferation, or induce apoptosis, of effector T cells. Tregs can be identified by analyzing cells for Treg-specific marker profiles. The definitive marker for Tregs is expression of the transcription factor FOXP3. However, FOXP3 is an intracellular protein and does not lend itself well to use in cell sorting. Tregs express CD4 and CD25, as do several other T cells. CD127 is down-regulated on Tregs. Thus, cells expressing CD4 and CD25, but expressing low amounts of CD127 can be identified as Tregs. Other functional Treg markers include CD39 and CD73, which are cell surface ecto-nucleotidase enzymes that contribute to the immunosuppressive capacity of Tregs. CD45RA is a marker of Tregs that are not actively secreting cytokines, or so-called resting Tregs; activation of Tregs to secrete suppressive cytokines results in the down-regulation of CD45RA. Further, activated Tregs exhibit cell-surface expression of LAP(TGF-□1) and GARP, with down-regulation of CD45RA. LAP (TGF-β1) and GARP, while down-regulating expression of CD45RA. As used herein, "tumor infiltrating Tregs" refer to Tregs found within the boundaries of a tumor, and can be in the tumor parenchyma itself. One skilled in the art can identify tumor-infiltrating Tregs by, e.g., histological staining of a tumor sample obtained from a patient.

Macrophages are an innate immune cell that elicits an innate and adaptive immune response in response to, e.g., a pathogen. There are generally two categories of macrophages: including classically activated M1 macrophages, and alternatively activated M2 macrophages. M2 macrophages are immunosuppressive, and when found within a tumor (so-called tumor-infiltrating M2 macrophages), can promote tumor angiogenesis, growth, metastasis, and immunosuppression via secretion of cytokines, chemokines, and proteases. One skilled in the art can identify tumor infiltrating M2 macrophages by detecting the presence of M2-specific markers on or in cells of a tumor sample. M2 macrophage markers include, but are not limited to, CSF-1R+, CD163+, IL-10, and TGFβ expressed on a cell bearing macrophage markers such as EMR1 and/or CD68.

Cancer associated fibroblasts are a fibroblast subpopulation found within the tumor microenvironment that promote tumor growth, angiogenesis, inflammation, and metastasis. Cancer associated fibroblasts are described in, e.g., Madar, S. et al. Trends in Molecular Medicine. August 2013; 19(8): 447-453, which is incorporated herein by reference in its entirety. Cancer associated fibroblasts can be identified by one skilled in the art by identifying cancer associated fibroblast-specific markers, e.g., via histology on a tumor sample. While there is no single marker that is specific only for cancer associated fibroblasts, α-smooth muscle actin (α-SMA), which also occurs in myofibroblasts, is a widely used marker for cancer-associated fibroblasts. Other markers include tenascin-C, periostin, neuron glial antigen-2 (NG2), vimentin, desmin, PDGFR alpha and beta, FSP-1, ASPN, and STC1. Cytokeratin and CD31 are considered to be negative markers, as cancer-associated fibroblasts do not express these factors.

Myeloid-derived suppressor cells are a subpopulation of immune suppressor cells derived from the myeloid linage (e.g., originate from bone marrow stem cells). Myeloid-derived suppressor cells can infiltrate a tumor and inhibit T cell and natural killer cell proliferation and activation, as well as promoting angiogenesis, tumor growth, and metastasis. Myeloid-derived suppressor cells expression cytokines, e.g., TGFbeta. Myeloid-derived suppressor cells can be identified by one skilled in the art by identifying markers, e.g., via histology. Such markers include, but are not limited to, CD33, CD14, and low levels of HLA DR.

Myeloid-derived suppressor cells are a subpopulation of immune suppressor cells derived from myeloid linage (e.g., originate from bone marrow stem cells). Myeloid-derived suppressor cells can infiltrate a tumor where it functions to inhibit T cell and natural killer cell proliferation and activation, and promotes angiogenesis, tumor growth, and metastasis. Myeloid-derived suppressor cells expression cytokines, e.g., TGFbeta. Myeloid-derived suppressor cells can be identified by one skilled in the art by identifying cancer associated fibroblast-specific markers, e.g., via flow cytometry. Such markers include, but are not limited to, CD33, CD14, and low levels of HLA DR.

Chimeric Antigen Receptors

The compositions and methods described herein use chimeric antigen receptors as mediators of immunotherapy.

A chimeric antigen receptor or CAR, as the term is used herein is an engineered T cell receptor in which the native antigen-binding domain is replaced with an antigen-binding domain, e.g., from an antibody, that binds a known target antigen, thereby redirecting the T cell to that known target antigen. When the known target antigen is a tumor antigen, a T cell expressing the chimeric receptor becomes activated when the chimeric receptor binds the tumor antigen on a tumor cell, promoting the killing of the tumor cell. CARs are also known as artificial T-cell receptors, chimeric T-cell receptors or chimeric immunoreceptors.

A CAR places a chimeric extracellular target-binding domain that specifically binds a target, e.g., a polypeptide, expressed on the surface of a cell to be targeted for a T cell response onto a construct including a transmembrane domain and intracellular domain(s) of a T cell receptor molecule. As noted, in one embodiment, the chimeric extracellular target-binding domain comprises the antigen-binding domain(s) of an antibody that specifically binds an antigen expressed on a cell to be targeted for a T cell response. The antigen-binding domain of an antibody used in a CAR generally has high affinity or avidity for the target/antigen, and indeed, will generally have higher affinity and/or avidity for the target antigen than would a naturally-occurring T cell receptor. This property, combined with the high specificity one can select for an antibody provides highly specific T cell targeting by CAR T cells. While antibody domains are most often used, in one embodiment, the chimeric extracellular target-binding domain comprises a ligand or ligand-binding domain that is not an antigen-binding domain of an antibody; such a ligand will preferably bind to a moiety primarily expressed or overexpressed on a tumor cell; an example would be a CAR that comprises a ligand such as APRIL (A PRoliferation-Inducing Ligand). The properties of the intracellular signaling domain(s) of the CAR can vary as known in the art and as disclosed herein, but the chimeric target/antigen-binding domains(s) render the receptor sensitive to signaling activation when the chimeric target/antigen binding domain binds the target/antigen on the surface of a targeted cell.

Where the improvements in CAR-mediated tumor therapy described herein revolve primarily around constructs in addition to a tumor-antigen-targeting CAR, the particulars of the tumor-antigen-targeting CAR are not critical to the improvements. That is, any of the many tumor- or cancer-targeting CAR designs known in the art can be used with the improvements described herein. In this regard, there are three so-called generations of CAR, and any of them can be used in the methods and compositions described herein. While differences in the transmembrane domains can be useful, the different generations differ primarily in the specifics of their intracellular signaling domains. With respect to intracellular signaling domains, so-called "first-generation" CARS include those that solely provide CD3zeta (CD3ζ) signals upon antigen binding. So-called "second-generation" CARs include those that provide both co-stimulation (e.g., CD28 or CD 137) and activation (CD3) domains, and so-called "third-generation" CARs include those that provide multiple costimulatory (e.g., CD28 and CD 137) domains and activation domains (e.g., CD3). In embodiments in which a T cell expresses a second CAR, e.g., one that targets an immunosuppressive cell, the second CAR can include design elements from any generation of CAR technology; in this instance, an important consideration will be the target antigen expressed by the immunosuppressive cell—any factor or antigen primarily expressed on an immunosuppressive cell and, preferably not expressed on a cytotoxic T cell, can be used.

Antigen/Extracellular Polypeptide

Any cell-surface moiety can be targeted by a CAR. Most often, the target will be a cell-surface polypeptide differentially or preferentially expressed on a cell one wishes to target for a T cell response. In this regard, tumor antigens or tumor-associated antigens provide attractive targets, providing a means to target tumor cells while avoiding or at least limiting collateral damage to non-tumor cells or tissues.

Tumor Antigens

Non-limiting examples of tumor antigens or tumor-associated antigens include carcinoembryonic antigen (CEA), Immature laminin receptor, TAG-72, HPV E6 and E7, BING-4, Calcium-activated chloride channel 2, Cyclin B1, 9D7, Ep-CAM, EphA3, Her2/neu, Telomerase, Mesotheliun, SAP-1, Survivin, BAGE family members, CAGE family members, GAGE family members, MAGE family members, SAGE family members, XAGE family members, NY-ESO-1/LAGE-1, PRAME, SSX-2, Melan-A/MART-1, Gp100/pme117, Tyrosinase, TRP-1/-2, MC1R, BRCA1/2, CDK4, MART-2, p53, Ras, MUC1, and TGF-βRII. Tumor antigens specific to solid tumors include, but are not limited to, EGFR (Epidermal growth factor receptor) on, e.g., non-small cell lung cancer, epithelial carcinoma and glioma; EGFRvIII (Variant III of the epidermal growth factor receptor) on e.g., glioblastoma; HER2 (Human epidermal growth factor receptor 2) on, e.g., ovarian cancer, breast cancer, glioblastoma, colon cancer, osteosarcoma and medulloblastoma; MSLN (Mesothelin) on, e.g., mesothelioma, ovarian cancer and pancreatic adenocarcinoma; PSMA (Prostate-specific membrane antigen) on, e.g., prostate cancer; CEA on, e.g., pancreatic adenocarcinoma, breast cancer, and colorectal carcinoma; GD2 (Disialoganglioside 2) on, e.g., neuroblastoma and melanoma; IL13Rα2 (Interleukin-13Ra2) on, e.g., glioma; GPC3 (Glypican-3) on, e.g., hepatocellular carcinoma; CAIX (Carbonic anhydrase IX) on, e.g., renal cell carcinoma (RCC); L1-CAM (L1 cell adhesion molecule) on, e.g., neuroblastoma, melanoma, and ovarian adenocarcinoma; CA125 (Cancer antigen 125, also known as MUC16) on, e.g., epithelial ovarian cancers; CD133 (Cluster of differentiation 133, also known as prominin-1) on, e.g., glioblastoma, and cholangiocarcinoma (CCA); FAP (Fibroblast activation protein) on, e.g., malignant pleural mesothelioma (MPM); CTAG1B (Cancer/testis antigen 1B, also known as NY-ESO-1) on, e.g., melanoma and ovarian cancer; MUC1 (Mucin 1) on, e.g., seminal vesicle cancer; FR-α (Folate receptor-α) on, e.g., ovarian cancer, CSPG4, EphA2, EpCAM, GD3, HLA-A1+MAGE1, IL-11Rα, Lewis-Y, NKG2D ligands, ROR1, TAG72, and VEGFR2. In one embodiment, the target tumor antigen is EGFR.

Antigens/Markers on Immunosuppressive Cells

In one embodiment, a chimeric T cell antigen receptor comprises an extracellular antigen binding domain that specifically binds an extracellular polypeptide expressed on an immunosuppressive cell in a tumor microenvironment. In one embodiment, the polypeptide expressed on the surface of the immunosuppressive cell is an immune checkpoint polypeptide. Exemplary immune checkpoints include PD-L1, PD-L2, PD-1, CTLA-4, TIM-3, LAG-3, VISTA, and TIGIT. In one embodiment, the polypeptide expressed on the surface of the immunosuppressive cell is Cytotoxic T-lymphocyte associated protein 4 (CTLA-4), Programmed Death Ligand 1 (PD-L1), glycoprotein A repetitions predominant (GARP), or latency associated peptide (LAP).

Cytotoxic T-lymphocyte associated protein 4 (CTLA-4), also known as cluster of differentiation 152 (CD152), is an immune checkpoint polypeptide expressed on T cells that functions to downregulate a response by activated T cells. CTLA4 is constitutively expressed by Tregs, but only upregulated in effector T cells after activation, making it a target suitable for inhibition of tumor-associated immunosuppressive cells. CTLA-4 binds ligands, B7-1 (CD80) and B7-2 (CD86). CTLA-4 sequences are known for a number of species, e.g., human CTLA-4 (NCBI Gene ID: 1493) polypeptide (e.g., NCBI Ref Seq NP_001032720.1) and mRNA (e.g., NCBI Ref Seq NM_001037631.2). CTLA-4 can refer to human CTLA-4, including naturally occurring variants, molecules, and alleles thereof. In some embodiments of any of the aspects, e.g., in veterinary applications, CTLA-4 can refer to the CTLA-4 of, e.g., dog, cat, cow, horse, pig, and the like. Homologs and/or orthologs of human CTLA-4 are readily identified for such species by one of skill in the art, e.g., using the NCBI ortholog search function or searching available sequence data for a given species for sequence similar to a reference CTLA-4 sequence. Antibodies that specifically bind and inhibit the function of CTLA-4 are known in the art.

Programmed Death Ligand 1 (PD-L1), also known as cluster of differentiation 274 (CD274) or B7 homolog 1 (B7-H1), is a transmembrane protein that functions to suppress the immune system in particular events such as pregnancy, tissue allografts, autoimmune disease, and hepatitis. Binding of PD-L1 to its receptor programmed death-1 (PD-1) transmits an inhibitory signal that reduces the proliferation of T cells and can induce apoptosis. Aberrant PD-L1 and/or PD-1 expression has been shown to promote cancer cell immune evasion in various tumors. In particular, expression of PD-L1 by tumors can promote evasion of the natural anti-tumor immune response. PD-L1/PD-1 blockade can be accomplished by a variety of mechanisms including antibodies that bind PD-1 or its ligand, PD-L1. PD-L1 sequences are known for a number of species, e.g., human PD-L1 (NCBI Gene ID: 29126) polypeptide (e.g., NCBI Ref Seq NP_001254635.1) and mRNA (e.g., NCBI Ref Seq NM_001267706.1). PD-L1 can refer to human PD-L1, including naturally occurring variants, molecules, and alleles thereof. In some embodiments of any of the aspects, e.g., in veterinary applications, PD-L1 can refer to the PD-L1 of, e.g., dog, cat, cow, horse, pig, and the like. Homologs and/or orthologs of human PD-L1 are readily identified for such species by one of skill in the art, e.g., using the NCBI ortholog search function or searching available sequence data for a given species for sequence similar to a reference PD-L1 sequence. Antibodies that specifically bind and inhibit the function of PD-L1 are known in the art.

Glycoprotein A repetitions predominant (GARP), also known as leucine rich repeat containing 32 (LRRC32), is a type 1 membrane protein that contains 20 leucine-rich repeats, expressed on the surface of cells, and is expressed highly on Tregs, and is also expressed on some macrophages and mesenchymal stromal cells. GARP has been shown to regulate the function of CD4+ T cells resulting in their differentiation into induced peripheral T regulatory cells, and suppresses the effector function of CD8+ cytotoxic T cells. Its expression on immunosuppressive cells makes GARP an attractive target for reducing the effects of tumor-associated immunosuppressive cells. GARP sequences are known for a number of species, e.g., human GARP (NCBI Gene ID: 2615) polypeptide (e.g., NCBI Ref Seq NP_001122394.1) and mRNA (e.g., NCBI Ref Seq NM_001128922.1). GARP can refer to human GARP, including naturally occurring variants, molecules, and alleles thereof. In some embodiments of any of the aspects, e.g., in veterinary applications, GARP can refer to the GARP of, e.g., dog, cat, cow, horse, pig, and the like. Homologs and/or orthologs of human GARP are readily identified for such species by one of skill in the art, e.g., using the NCBI ortholog search function or searching available sequence data for a given species for sequence similar to a reference GARP sequence. Antibodies that specifically bind and inhibit the function of GARP are known in the art.

Latency associated peptide (LAP), is the C-terminal part of the transforming growth factor β (TGFβ) proprotein that is cleaved in the process of generating active TGFβ. LAP is a marker of activated Treg cells. LAP sequences are known for a number of species, e.g., human LAP (NCBI Gene ID: 7040) polypeptide (e.g., NCBI Ref Seq NP_000651.3) and mRNA (e.g., NCBI Ref Seq NM_000660.6). LAP can refer to human LAP, including naturally occurring variants, molecules, and alleles thereof. In some embodiments of any of the aspects, e.g., in veterinary applications, LAP can refer to the LAP of, e.g., dog, cat, cow, horse, pig, and the like. Homologs and/or orthologs of human LAP are readily identified for such species by one of skill in the art, e.g., using the NCBI ortholog search function or searching available sequence data for a given species for sequence similar to a reference LAP sequence. Antibodies that specifically bind and inhibit the function of LAP are known in the art.

Antibody Reagents

In various embodiments, CARs as described herein comprise an antibody reagent or an antigen-binding domain thereof as an extracellular target-binding domain.

As used herein, an "antibody reagent" is a polypeptide that includes at least one immunoglobulin variable domain or immunoglobulin variable domain sequence and which specifically binds a given antigen. An antibody reagent can comprise an antibody or a polypeptide comprising an antigen-binding domain of an antibody. In some embodiments, an antibody reagent can comprise a monoclonal antibody or a polypeptide comprising an antigen-binding domain of a monoclonal antibody. An antibody reagent can include a heavy (H) chain variable region (abbreviated herein as $V_H$), and a light (L) chain variable region (abbreviated herein as $V_L$), although naturally-occurring variants, such as camelid antibodies have two heavy chains (so-called VHH antibodies). Antibody reagents include antigen-binding fragments of antibodies (e.g., single chain antibodies, Fab and sFab fragments, F(ab')2, Fd fragments, Fv fragments, scFv, CDRs, and single domain antibody (dAb) fragments (see, e.g. de Wildt et al., Eur J. Immunol. 1996; 26(3):629-39; which is incorporated by reference herein in its entirety)) as well as complete antibodies. An antibody can have the structural features of IgA, IgG, IgE, IgD, or IgM (as well as subtypes and combinations thereof). Antibodies can be from any source, including mouse, rabbit, pig, rat, and primate (human and non-human primate) and primatized antibodies. Antibodies also include midibodies, humanized antibodies, chimeric antibodies, and the like. Fully human antibody binding domains can be selected, for example, from phage display libraries using methods known to those of ordinary skill in the art.

The $V_H$ and $V_L$ regions can be further subdivided into regions of hypervariability, termed "complementarity determining regions" ("CDR"), interspersed with regions that are more conserved, termed "framework regions" ("FR"). The extent of the framework regions and CDRs has been precisely defined (see, Kabat, E. A., et al. (1991) Sequences of Proteins of Immunological Interest, Fifth Edition, U.S. Department of Health and Human Services, NIH Publication No. 91-3242, and Chothia, C. et al. (1987) J. Mol. Biol. 196:901-917; which are incorporated by reference herein in their entireties). Each $V_H$ and $V_L$ is typically composed of three CDRs and four FRs, arranged from amino-terminus to carboxy-terminus in the following order: FR1, CDR1, FR2, CDR2, FR3, CDR3, FR4.

In one embodiment, the antibody or antibody reagent is not a human antibody or antibody reagent, (i.e., the antibody or antibody reagent is mouse), but has been humanized. A "humanized antibody or antibody reagent" refers to a non-human antibody or antibody reagent that has been modified at the protein sequence level to increase its similarity to antibody or antibody reagent variants produced naturally in humans. One approach to humanizing antibodies employs the grafting of murine or other non-human CDRs onto human antibody frameworks.

Antibody binding domains and ways to select and clone them are well known to those of ordinary skill in the art. Protocols for raising an antibody are further reviewed in, e.g., Greenfield, E. A. "Generating Monoclonal Antibodies." *Antibodies: A Laboratory Manual, Second Edition*. Ed. Edward A. Greenfield. Cold Spring Harbor: Cold Spring Harbor Laboratory Press, 2014. 201-302. Print, which is incorporated herein by reference in its entirety.

In one embodiment, a CAR's extracellular target binding domain comprises or consists essentially of a single-chain Fv (scFv) fragment created by fusing the $V_H$ and $V_L$ domains of an antibody, generally a monoclonal antibody, via a flexible linker peptide. In various embodiments, the scFv is fused to a transmembrane domain and to a T cell receptor intracellular signaling domain, e.g., an engineered intracellular signaling domain as described herein, to form a CAR. Protocols for generating a scFV are further reviewed in, e.g., Wu, S., et al. J Immunol Methods. August 2010; 318(1-2): 95-101, which is incorporated herein by reference in its entirety.

Antibody reagents useful in the technology described herein are known in the art. For instance, anti-CTLA4 antibodies include, but are not limited to Ipilimumab™ (Bristol Meyers Squibb), and Tremelimumab™ (Medimmune). Anti-PD-L1 antibodies include, but are not limited to, Durvalumab™ (Medimmune), Avelumab™ (Merck), Atezolizumab™ (Genentech). Anti-GARP antibodies include, but are not limited to, anti-GARP clone 7B11 (BioLegend), and anti-GARP clone G14D9 (ThermoFisher).

Anti-LAP antibodies include, but are not limited to, anti-LAP clone FNLAP (ThermoFisher), and anti-LAP clone AF-269 (R&D Systems)

In one embodiment, the antibody reagent is an anti-GARP VHH antibody reagent and has the sequence of SEQ ID NO: 1.

Anti-GARP VHH antibody reagent (SEQ ID NO: 1)
(SEQ ID NO: 1)
GACATCCAGATGACCCAGAGCCCCAGCAGCCTGAGCGCCAGCCTGGGCGA

CAGGGTGACCATCACCTGCCAGGCCAGCCAGAGCATCAGCAGCTACCTGG

CCTGGTACCAGCAGAAGCCCGGCCAGGCCCCCAACATCCTGATCTACGGC

GCCAGCAGGCTGAAGACCGGCGTGCCCAGCAGGTTCAGCGGCAGCGGCAG

CGGCACCAGCTTCACCCTGACCATCAGCGGCCTGGAGGCCGAGGACGCCG

GCACCTACTACTGCCAGCAGTACGCCAGCGTGCCCGTGACCTTCGGCCAG

GGCACCAAGGTGGAGCTGAAG

In another embodiment, the anti-GARP VHH antibody reagent corresponds to the sequence of SEQ ID NO: 1; or comprises the sequence of SEQ ID NO: 1; or comprises a sequence with at least 80%, at least 85%, at least 90%, at least 95%, at least 96%, at least 97%, at least 98%, at least 99% or greater sequence identity to the sequence of SEQ ID NO: 1.

In one embodiment, the antibody reagent is an anti-LAP scFV, Heavy-Light antibody reagent and has the sequence of SEQ ID NO: 2.

Anti-LAP scFV, Heavy-Light antibody reagent
(SEQ ID NO: 2)
(SEQ ID NO: 2)
ATGAAGTTGTGGCTGAACTGGATTTTCCTTGTAACACTTTTAAATGATAT

CCAGTGTGAGGTGAAGCTGGTGGAGTCTGGAGGAGGCTTGGTACAGCCTG

GGGGTTCTCTGAGTCTCTCCTGTGCAGCTTCTGGATTCACCTTCACTGAT

TACTACATGAGCTGGGTCCGCCAGCCTCCAGGGAAGGCACTTGAGTGGTT

GGGTTTTATTAGAAACAAACCTAATGGTTACACAACAGAGTACAGTGCAT

CTGTGAAGGGTCGGTTCACCATCTCCAGAGATAATTCCCAAAGCATCCTC

TATCTTCAAATGAATGTCCTGAGAGCTGAGGACAGTGCCACTTATTACTG

TGCAAGATATACGGGGGGGGTTACTTTGACTACTGGGGCCAAGGCACCA

CTCTCACAGTCTCCTCA

In another embodiment, the anti-LAP scFV, Heavy-Light antibody reagent corresponds to the sequence of SEQ ID NO: 2; or comprises the sequence of SEQ ID NO: 2; or comprises a sequence with at least 80%, at least 85%, at least 90%, at least 95%, at least 96%, at least 97%, at least 98%, at least 99% or greater sequence identity to the sequence of SEQ ID NO: 2.

In one embodiment, the antibody reagent is an anti-LAP antibody reagent and has the sequence of SEQ ID NO: 3.

Anti-LAP scFV, Light-Heavy antibody reagent
(SEQ ID NO: 3)
(SEQ ID NO: 3)
ATGATGTCCTCTGCTCAGTTCCTTGGTCTCCTGTTGCTCTGTTTTCAAGG

TACCAGATGTGATATCCAGATGACACAGACTACATCCTCCCTGTCTGCCT

CTCTGGGAGACAGACTCACCATCAGTTGCAGGGCAAGTCAGGACATTAGC

AATTATTTAAACTGGTATCAGCAGAAACCAGATGGAACTGTTAAACTCCT

GATCTACTACACATCAAGATTACACTCAGGAGTCCCATCAAGGTTCAGTG

GCAGTGGGTCTGGAACAGATTATTCTCTCACCATTAGCAACCTGGAGCAA

GCAGATATTGCCACTTACTTTTGCCAACAGGGTGATACACTTCCGTGGAC

GTTCGGTGGAGGCACCAAGCTGGAAATCAAA

In another embodiment, the anti-LAP scFV, Light-Heavy antibody reagent corresponds to the sequence of SEQ ID NO: 3; or comprises the sequence of SEQ ID NO: 3; or comprises a sequence with at least 80%, at least 85%, at least 90%, at least 95%, at least 96%, at least 97%, at least 98%, at least 99% or greater sequence identity to the sequence of SEQ ID NO: 3.

Variants of an antibody, e.g., comprising a limited number of amino acid sequence variations in the antigen-binding domains relative to a given antibody that still bind a desired target, or even that bind a desired target with greater specificity or a lower $K_d$ are specifically contemplated for use in the constructs described herein.

Transmembrane Domain

Each CAR as described herein necessarily includes a transmembrane domain that joins the extracellular target-binding domain to the intracellular signaling domain. In one embodiment, each CAR contains a hinge/transmembrane domain. As used herein, "transmembrane domain" (TM domain) or "hinge transmembrane domain" refers to the generally hydrophobic region of the CAR which crosses the plasma membrane of a cell. The TM domain can be the transmembrane region or fragment thereof of a transmembrane protein (for example a Type I transmembrane protein or other transmembrane protein), an artificial hydrophobic sequence, or a combination thereof. While specific examples are provided herein and used in the Examples, other transmembrane domains will be apparent to those of skill in the art and can be used in connection with alternate embodiments of the technology. A selected transmembrane region or fragment thereof would preferably not interfere with the intended function of the CAR. As used in relation to a transmembrane domain of a protein or polypeptide, "fragment thereof" refers to a portion of a transmembrane domain that is sufficient to anchor or attach a protein to a cell surface.

In one embodiment, a CAR's transmembrane domain is derived from or comprises the transmembrane domain of CD8. In one embodiment, a CAR's transmembrane domain is derived from or comprises the transmembrane domain of CD28. In an alternate embodiment, the transmembrane domain of a CAR described herein comprises a transmembrane domain selected an alpha, beta or zeta chain of a T-cell receptor, CD28, CD3 epsilon, CD45, CD4, CD5, CD8, CD9, CD16, CD22, CD33, CD37, CD64, CD80, CD86, CD134, CD137, CD154, KIRDS2, OX40, CD2, CD27, LFA-1 (CD11a, CD18), ICOS (CD278), 4-1BB (CD137), GITR, CD40, BAFFR, HVEM (LIGHTR), SLAMF7, NKp80 (KLRF1), CD160, CD19, IL2R beta, IL2R gamma, IL7R a, ITGA1, VLA1, CD49a, ITGA4, IA4, CD49D, ITGA6, VLA-6, CD49f, ITGAD, CD11d, ITGAE, CD103, ITGAL, CD11a, LFA-1, ITGAM, CD11b, ITGAX, CD11c, ITGB1, CD29, ITGB2, CD18, LFA-1, ITGB7, TNFR2, DNAM1 (CD226), SLAMF4 (CD244, 2B4), CD84, CD96 (Tactile), CEACAM1, CRT AM, Ly9 (CD229), CD160 (BY55), PSGL1, CD100 (SEMA4D), SLAMF6 (NTB-A, Ly108), SLAM (SLAMF1, CD150, IPO-3), BLAME (SLAMF8), SELPLG (CD162), LTBR, PAG/Cbp, NKp44, NKp30, NKp46, NKG2D, and/or NKG2C.

CD8 is an antigen preferentially found on the cell surface of cytotoxic T lymphocytes. CD8 mediates cell-cell iterations within the immune system, and acts as a T cell coreceptor. CD8 consists of an alpha (CD8α) and beta (CD8β) chain. CD8a sequences are known for a number of species, e.g., human CD8a, (NCBI Gene ID: 925) polypeptide (e.g., NCBI Ref Seq NP_001139345.1) and mRNA (e.g., NCBI Ref Seq NM_000002.12). CD8 can refer to human CD8, including naturally occurring variants, molecules, and alleles thereof. In some embodiments of any of the aspects, e.g., in veterinary applications, CD8 can refer to the CD8 of, e.g., dog, cat, cow, horse, pig, and the like. Homologs and/or orthologs of human CD8 are readily identified for such species by one of skill in the art, e.g., using the NCBI ortholog search function or searching available sequence data for a given species for sequence similar to a reference CD8 sequence.

CD28 (cluster of differentiation 28) is expressed on T cells and provides a co-stimulatory signal required for T cell activation and survival. Stimulation of CD28 results in the production of various interleukins, including, but not limited to, Interleukin-6. CD28 sequences are known for a number of species, e.g., human CD28 (NCBI Gene ID: 940) polypeptide (e.g., NCBI Ref Seq NP_001230006.1) and mRNA (e.g., NCBI Ref Seq NM_001243077.1). CD28 can refer to human CD28, including naturally occurring variants, molecules, and alleles thereof. In some embodiments of any of the aspects, e.g., in veterinary applications, CD28 can refer to the CD28 of, e.g., dog, cat, cow, horse, pig, and the like. Homologs and/or orthologs of human CD28 are readily identified for such species by one of skill in the art, e.g., using the NCBI ortholog search function or searching available sequence data for a given species for sequence similar to a reference CD28 sequence.

In one embodiment, when more than one CAR is expressed in a cell, the TM domain of each CAR is different from the TM domain(s) of the other CAR(s). While not wishing to be bound by theory, this can provide an advantage in avoiding heterocomplex formation between the different CARS.

Co-Stimulatory Domain

While first generation CARs lacked a co-stimulatory domain in the intracellular domain, later generations include one or more co-stimulatory domains. As noted above, the CARs as described herein can be first, second, third or even later generation CARS that benefit from the use of one or more additional constructs as described herein that inhibit tumor-associated immunosuppressive cells. As such, some CARs useful in the compositions and methods described herein can include one or more co-stimulatory domains. A co-stimulatory domain is an intracellular signaling domain of a co-stimulatory molecule. Co-stimulatory molecules are cell surface molecules other than antigen receptors or Fc receptors that provide a second signal required for efficient activation and function of T cells upon binding to antigen. Illustrative examples of such co-stimulatory molecules include CARD11, CD2, CD7, CD27, CD28, CD30, CD40, CD54 (ICAM), CD83, CD134 (OX40), CD137 (4-1BB), CD150 (SLAMF1), CD152 (CTLA4), CD223 (LAG3), CD270 (HVEM), CD273 (PD-L2), CD274 (PD-L1), CD278 (ICOS), DAP10, LAT, NKD2C SLP76, TRIM, and ZAP70. In one embodiment, the co-stimulatory domain is the intraceullar domain of 4-1BB. In another embodiment, the co-stimulatory domain is the intraceullar domain of ICOS. In one embodiment, when more than one CAR is expressed in a cell, the co-stimulatory domain of each CAR is different from the co-stimulatory domain(s) of the other CAR(s).

4-1BBL is a type 2 transmembrane glycoprotein belonging to the TNF superfamily. 4-1BBL is expressed on activated T lymphocytes. 4-1BBL sequences are known for a number of species, e.g., human 4-1BBL, also known as TNFSF9 (NCBI Gene ID: 8744) polypeptide (e.g., NCBI Ref Seq NP_003802.1) and mRNA (e.g., NCBI Ref Seq NM_003811.3). 4-1BBL can refer to human 4-1BBL, including naturally occurring variants, molecules, and alleles thereof. In some embodiments of any of the aspects, e.g., in veterinary applications, 4-1BBL can refer to the 4-1BBL of, e.g., dog, cat, cow, horse, pig, and the like. Homologs and/or orthologs of human 4-1BBL are readily identified for such species by one of skill in the art, e.g., using the NCBI ortholog search function or searching available sequence data for a given species for sequence similar to a reference 4-1BBL sequence.

ICOS (inducible T cell co-stimulator) is a CD28-superfamily co-stimulatory molecule expressed on activated T cells. ICOS functions to promotes cell-cell signaling, immune response, and regulation of cell proliferation. ICOS sequences are known for a number of species, e.g., human ICOS (NCBI Gene ID: 29851) polypeptide (e.g., NCBI Ref Seq NP_036224.1) and mRNA (e.g., NCBI Ref Seq NM_012092.3). ICOS can refer to human ICOS, including naturally occurring variants, molecules, and alleles thereof. In some embodiments of any of the aspects, e.g., in veterinary applications, ICOS can refer to the ICOS of, e.g., dog, cat, cow, horse, pig, and the like. Homologs and/or orthologs of human ICOS are readily identified for such species by one of skill in the art, e.g., using the NCBI ortholog search function or searching available sequence data for a given species for sequence similar to a reference ICOS sequence.

Intracellular Signaling Domain

CARS as described herein comprise an intracellular signaling domain. An intracellular signaling domain is the part of a CAR polypeptide that transduces the message of effective CAR binding to a target antigen into the interior of the immune effector cell to elicit effector cell function, e.g., activation, cytokine production, proliferation and cytotoxic activity, including the release of cytotoxic factors to the CAR-bound target cell, or other cellular responses elicited following antigen binding to the extracellular CAR domain.

CD3 is a T cell co-receptor that facilitates T lymphocytes activation when simultaneously engaged with the appropriate co-stimulation (e.g., binding of a co-stimulatory molecule). A CD3 complex consists of 4 distinct chains; mammalian CD3 includes a CD3γ chain, a CD3δ chain, and two CD3ε chains. These chains associate with the T cell receptor (TCR) and the CD3 to generate an activation signal in T lymphocytes. A complete TCR complex comprises a TCR, CD3, and the complete CD3 complex.

Immunoreceptor Tyrosine-based Activation MotifS (ITAMs) are signaling domains which regulate primary activation of the TCR complex either in a stimulatory way, or in an inhibitory way. In some embodiments, a CAR polypeptide described herein comprises an intracellular signaling domain that comprises an ITAM-containing intracellular signaling domain or domains. Non-limiting examples of ITAMs that are of use in the technology described herein include those derived from TCRζ, FcRγ, FcRβ, CD3γ, CD3θ, CD3δ, CD3ε, CD3ζ, CD22, CD79a, CD79b, and CD66d.

In some embodiments, a CAR polypeptide described herein comprises an intracellular signaling domain that comprises an Immunoreceptor Tyrosine-based Activation Motif, or ITAM, from CD3 zeta (CD3ζ). In one embodiment, the T-cell intracellular signaling domain comprises the ITAMs of CD3 eta (CD3ε), CD3 theta (CD3θ) or CD3ζ. In one embodiment, the T-cell intracellular signaling domain is the ITAM of CD3 eta (CD3ε), CD3 theta (CD3θ) or CD3ζ.

In one embodiment, the CARs described herein further comprise a linker domain. A linker domain is an oligo- or polypeptide region from about 2 to 100 amino acids in length, which links together any of the domains/regions of the CAR as described herein. In some embodiments, linkers can include or be composed of flexible residues such as glycine and serine so that the adjacent protein domains are free to move relative to one another. Longer linkers may be used when it is desirable to ensure that two adjacent domains do not sterically interfere with one another. Linkers may be cleavable or non-cleavable. Examples of cleavable linkers include 2A linkers (for example T2A), 2A-like linkers or functional equivalents thereof and combinations thereof. In one embodiment, the linker region is T2A derived from Thosea asigna virus. Non-limiting examples of linkers that can be used in this technology include P2A and F2A. In one embodiment, the CARS described herein comprise a T2A linker. In one embodiment, the CARs described herein comprise two identical linkers. In one embodiment, the CARs described herein comprise two different linkers (e.g., a T2A and a P2A linker). In one embodiment, the CARs described herein comprise a T2A and a P2A linker.

A more detailed description of CARs and CAR T cells can be found in Maus et al. Blood 2014 123:2624-35; Reardon et al. Neuro-Oncology 2014 16:1441-1458; Hoyos et al. Haematologica 2012 97:1622; Byrd et al. J Clin Oncol 2014 32:3039-47; Maher et al. Cancer Res 2009 69:4559-4562; and Tamada et al. Clin Cancer Res 2012 18:6436-6445; each of which is incorporated by reference herein in its entirety.

In one embodiment, the CAR is an anti-GARP CAR. In one embodiment, the anti-GARP CAR comprises a CD8 leader sequence, an anti-GARP antibody reagent, a CD8 hinge/transmembrane domain, a 4-1BB intracellular co-stimulatory domain, and a CD3ζ intracellular signaling domain.

In one embodiment, the anti-GARP CAR has the sequence of (SEQ ID NO: 9). In one embodiment, the CAR corresponds to the sequence of SEQ ID NO: 9; or comprises the sequence of SEQ ID NO: 9; or comprises a sequence with at least 80%, at least 85%, at least 90%, at least 95%, at least 96%, at least 97%, at least 98%, at least 99% or greater sequence identity to the sequence of SEQ ID NO: 9. Conservative amino acids substitutions that retain or improve binding to GARP or signaling effects are specifically contemplated.

In one embodiment, the CAR is an anti-LAP (H-L) CAR. In one embodiment, the anti-LAP (H-L) CAR comprises a CD8 leader sequence, an anti-LAP, H-L antibody reagent, a CD8 hinge/transmembrane domain, a 4-1BB intracellular co-stimulatory domain, and a CD3ζ intracellular signaling domain.

In one embodiment, the anti-LAP (H-L) CAR has the sequence of (SEQ ID NO: 10). In one embodiment, the CAR corresponds to the sequence of SEQ ID NO: 10; or comprises the sequence of SEQ ID NO: 10; or comprises a sequence with at least 80%, at least 85%, at least 90%, at least 95%, at least 96%, at least 97%, at least 98%, at least 99% or greater sequence identity to the sequence of SEQ ID NO: 10. Conservative amino acids substitutions that retain or improve binding to LAP or signaling effects are specifically contemplated.

In one embodiment, the CAR is an anti-LAP (L-H) CAR. In one embodiment, the anti-LAP (H-L) CAR comprises a CD8 leader sequence, an anti-LAP, L-H antibody reagent, a CD8 hinge/transmembrane domain, a 4-1BB intracellular co-stimulatory domain, and a CD3ζ intracellular signaling domain.

In one embodiment, the anti-LAP (H-L) CAR has the sequence of (SEQ ID NO: 11). In one embodiment, the CAR corresponds to the sequence of SEQ ID NO: 11; or comprises the sequence of SEQ ID NO: 11; or comprises a sequence with at least 80%, at least 85%, at least 90%, at least 95%, at least 96%, at least 97%, at least 98%, at least 99% or greater sequence identity to the sequence of SEQ ID NO: 11. Conservative amino acids substitutions that retain or improve binding to LAP or signaling effects are specifically contemplated.

In one embodiment, the CAR is an anti-EGFR CAR encoded as a polypeptide that also includes an anti-GARP camelid antibody reagent which is cleaved and secreted. In one embodiment, the polypeptide comprises a CD8 leader sequence, an anti-EGFR antibody reagent, a CD8 hinge/transmembrane domain, a 4-1BB intracellular co-stimulatory domain, a CD3ζ intracellular signaling domain, and anti-GARP secreted product. In one embodiment, such polypeptide has the sequence of (SEQ ID NO: 12). In one embodiment, such polypeptide corresponds to the sequence of SEQ ID NO: 12; or comprises the sequence of SEQ ID NO: 12; or comprises a sequence with at least 80%, at least 85%, at least 90%, at least 95%, at least 96%, at least 97%, at least 98%, at least 99% or greater sequence identity to the sequence of SEQ ID NO: 12. Conservative amino acid substitutions that retain or improve binding to EGFR or GARP, or that retain or improve signaling effects are specifically contemplated.

One aspect of the technology described herein provides a nucleic acid encoding the first and second CAR. They can be driven by the same promoters, or, as noted elsewhere herein, expression of the CAR that targets an immunosuppressive cell can be driven by a promoter activated upon, or inducible by activation of a T cell.

CAR-T Cells

One aspect of the technology described herein provides a human cell comprising a heterologous construct encoding a CAR, the CAR comprising an extracellular antigen binding domain that specifically binds a target tumor antigen; and heterologous construct encoding a polypeptide that inhibits an immunosuppressive cell in a tumor environment. In one embodiment, the heterologous construct encoding the CAR and heterologous construct encoding the polypeptide that inhibits an immunosuppressive cell are encoded on a single nucleic acid.

Another aspect of the technology described herein provides a nucleic acid encoding a CAR and a polypeptide that inhibits an immunosuppressive cell. Expression can be driven by the same promoters, or, as noted elsewhere herein, expression of the polypeptide that targets an immunosuppressive cell can be driven by a promoter activated upon, or inducible by activation of a T cell.

Another aspect of the technology described herein provides a human cell comprising a heterologous construct encoding a first CAR comprising an extracelluar antigen binding domain that specifically binds a target tumor antigen; and a heterologous construct encoding a second CAR comprising an extracellular antigen binding domain that specifically binds an extracellular polypeptide expressed on an immunosuppressive cell.

The cell expressing the CAR and the additional CAR or heterologous polypeptide that targets an immunosuppressive cell in a tumor microenvironment is generally an effector T cell, although other immune cells can potentially be adapted for similar use. The effector T cell is preferably a CD8+ T cell, although it is contemplated that CD4+ T cells could also be used. T cells useful in CART cell technology are reviewed in, e.g., Golubovskaya, V., and Wu, L. Cancers (Basal). March 2016; 8(3):36, which is incorporated herein by reference in its entirety.

While expression from the additional construct (e.g., encoding the polypeptide that targets an immunosuppressive cell in a tumor microenvironment or second CAR) can be constitutive, in one aspect as noted above, the expression from the additional construct or constructs is regulated by a T cell-activation-regulated promoter, such that when the first CAR binds its target tumor antigen and the T cell becomes activated, the expression from the additional construct is turned on, resulting in targeting of nearby immunosuppressive cells. This approach can enhance the efficacy of CAR-Ts for solid tumors.

Non-limiting examples of control elements that are responsive to T cell activation include an NFAT (nuclear factor of activated T cells)-responsive element and a Notch Intracellular Domain (NICD)-responsive element. NFAT is a family of proteins present in the cytosol that are dephosphorylated and translocated to the nucleus following T cell receptor stimulation. In the nucleus, NFAT family members bind and induce the transcription of target genes that have one or more NFAT-binding motifs. NFAT target genes include, but are not limited to, FoxP3, IL-2, IL-10, and IFNγ. Moreover, NFAT family members have been shown to be required for CTLA-4 and PD-L1 expression upon T cell activation. NFAT transcriptional activity and target genes are reviewed, e.g., in Oestreich K. J., et al. J Immunol. 2008 Oct. 1; 181(7): 4832-4839, Maguire, O., et al. Cytometry A. 2013 December; 83(12): 1096-1104, and Crabtree, G. R., and Olsen, E. N. Cell. 2002 April; 109(2): S67-S79, which are incorporated herein by reference in their entireties. Reporters sensitive to NFAT transcriptional activity are known in the art and are further reviewed in e.g., Rinne, A., and Blatter, L. A. J. Physiol. 2010 September; 588(Pt 17): 3211-3216, which is incorporated herein by reference in its entirety. See also Strait et al., J. Biol. Chem. 285: 28520-28528, incorporated herein by reference, which describes naturally-occurring NFAT-responsive elements.

Upon binding of the Notch receptor by its ligand, the Notch receptor undergoes proteolytic cleavages that releases the NICD from the membrane and permits its translocation to the nucleus, where it complexes with CSL, MAML, and CoA to activate the transcription of Notch target genes. In T cell development, NICD is required to activate expression of GATA3, an essential regulator of T cell development. Where NICD becomes active upon T cell activation, a promoter responsive to NICD activation can also be used to provide T cell activation-induced expression of a heterologous construct. The use of NICD-responsive elements to regulate gene expression is reviewed in, e.g., Ilagan, M. X. G., et al. Sci Signal. July 2012; 4(181): rs7., which is incorporated herein by reference in its entirety. Notch signaling during T cell development is further reviewed in, e.g., Deftos, M. L., and Bevan, M. J. Current Opinion in Immunology. 2000 April; 12(2): 166-172, and Borggrefe, T., and Oswald, F. Cell Mol Life Sci. 2009 May; 66(10): 1631-1646, which are incorporated herein by reference in their entireties.

In one embodiment, the first and second CAR comprise a hinge and/or transmembrane domain. In one embodiment, the first and second CAR comprise the same transmembrane domain. In one embodiment, the first and second CAR do not comprise the same transmembrane domain. In one embodiment, the first and second CAR comprise different transmembrane domains that do not heterodimerize, thus inhibiting heterodimerization between the first CAR and the second CAR. In one embodiment, the transmembrane domain is a mutated transmembrane domain that prevents heterodimerization its wild-type version.

In one embodiment, the first and second CAR comprise a scFV fragment of an antibody. In one embodiment, the scFV fragment of an antibody comprised on the first CAR targets a target tumor antigen. In one embodiment, the scFV fragment of an antibody comprised on the second CAR targets an extracellular polypeptide expressed on an immunosuppressive cell.

In one embodiment, the first and second CAR comprise an intracellular signaling domain. In one embodiment, the intracellular signaling domain comprised on the first and second CAR are the same. In one embodiment, the intracellular signaling domain comprised on the first and second CAR are different.

In one embodiment, the first and second CAR comprise an intracellular signaling domain comprising a co-stimulatory domain. In one embodiment, the co-stimulatory domain comprised on the first and second CAR are the same. In one embodiment, the co-stimulatory domain comprised on the first and second CAR are different.

It is contemplated that a CAR can be designed to be bispecific—i.e., capable of recognizing via one binding domain, a tumor antigen, and via another binding domain on the same CAR, a polypeptide expressed by an immunosuppressive cell in the tumor microenvironment.

In one embodiment, any of the cells described herein can kill (e.g., promote programmed cell death) an activated Treg or immunosuppressive macrophage in a tumor microenvironment upon contact, or upon coming into close proximity within a tumor, e.g., if the additional heterologous construct encoded by a CAR-T encodes a secreted polypeptide factor. In one embodiment, at least 10% of activated Tregs or immunosuppressive macrophages in the tumor microenvironment are killed by the introduction of modified CAR-T cells as described herein. In one embodiment, at least 20%, at least 25%, at least 30%, at least 35%, at least 40%, at least 45%, at least 50%, at least 55%, at least 60%, by at least 65%, at least 70%, at least 75%, at least 80%, at least 85%, at least 90%, at least 95%, at least 99%, or more of the activated Tregs or immunosuppressive macrophages in the tumor microenvironment are killed by the introduction of modified CAR-T cells as described herein. The number of Tregs or immunosuppressive macrophages in a tumor microenvironment can be determined, for example, by immunohistochemistry on a tumor sample after the initiation of treatment, using markers for Tregs or immunosuppressive macrophages as known in the art and/or described herein.

In one embodiment, any of the cells described herein can inhibit the activity or function of activated Tregs or immunosuppressive macrophages in the microenvironment. In one embodiment, the activity or function of activated Tregs or immunosuppressive macrophages in the microenvironment is reduced by at least 10% compared to the activity or function of an activated Treg or immunosuppressive macrophage prior to contact. In one embodiment, the activity or function of activated Tregs or immunosuppressive macrophages in the microenvironment were reduced by at least 20%, at least 25%, at least 30%, at least 35%, at least 40%, at least 45%, at least 50%, at least 55%, at least 60%, by at least 65%, at least 70%, at least 75%, at least 80%, at least 85%, at least 90%, at least 95%, at least 99%, or more compared to the activity or function of activated Tregs or immunosuppressive macrophages prior to contact.

Inhibitory Polypeptide

The methods and compositions described herein use one or more heterologous polypeptides to inhibit the function of immunosuppressive cells in a tumor microenvironment. In one aspect, the expression of an inhibitory polypeptide permits the cell that expresses such polypeptides to more efficiently target tumor cells. These heterologous polypeptides are referred to herein as "inhibitory polypeptides." In various embodiments, an inhibitory polypeptide comprises an antibody or an antigen-binding fragment thereof—antibodies and antigen-binding fragments thereof are described elsewhere herein.

In one embodiment, the inhibitory polypeptide comprises a first antibody or antigen-binding domain thereof that specifically binds an extracellular polypeptide expressed on an immunosuppressive cell in a tumor microenvironment. In one embodiment, the extracellular polypeptide expressed on an immunosuppressive cell is a checkpoint polypeptide. Exemplary checkpoint polypeptides include PD-L1, PD-L2, PD-1, CTLA-4, TIM-3, LAG-3, VISTA, and TIGIT. In one embodiment, the extracellular polypeptide expressed on an immunosuppressive cell is CTLA-4 or PD-L1. In one embodiment, the extracellular polypeptide expressed on an immunosuppressive cell is GARP or LAP. Antibodies or antigen-binding fragments thereof that bind an extracellular polypeptide expressed on an immunosuppressive cell, or bispecific agents (see below), can be secreted from the cell that expresses them, e.g., from a CAR-T cell, and inhibit the function of an immunosuppressive cell in the tumor microenvironment.

In one embodiment, the inhibitory polypeptide comprises a bi-specific antibody reagent. As used herein, a "bi-specific antibody reagent" refers to an antibody reagent comprising a first antibody or antigen-binding domain thereof that specifically binds an extracellular polypeptide expressed on an immunosuppressive cell in a tumor microenvironment (e.g., a Treg or immunosuppressive macrophage), and a second antibody or antigen-binding domain thereof that specifically binds a polypeptide expressed on the extracellular surface of a human cell (e.g., a non-immunosuppressive cell). In one embodiment, the human cell is the cell that expresses the bispecific antibody reagent, e.g., a tumor-antigen-targeting CAR-T cell that also carries a construct encoding the bispecific antibody reagent. In one embodiment, the first and/or second antigen-binding domains each comprise an scFV fragment of an antibody. In one embodiment, the first and second antibody or antigen-binding domains thereof are separated by a linker sequence. Without intending to be bound by theory, the bispecific antibody construct as described herein can tether the cell that expresses it, i.e., a CAR-T cell, to an immunosuppressive cell, and thereby mediate inactivation or even killing of the immunosuppressive cell.

In one embodiment, the linker has the sequence of (SEQ ID NO: 4). In one embodiment, the linker corresponds to the sequence of SEQ ID NO: 4; or comprises the sequence of SEQ ID NO: 4; or comprises a sequence with at least 80%, at least 85%, at least 90%, at least 95%, at least 96%, at least 97%, at least 98%, at least 99% or greater sequence identity to the sequence of SEQ ID NO: 4.
GGAGGCGGAGGATCTGGCGGCGGAG-
GAAGTGGCGGCGGAGGATCTGGCGGCGGAG-
GAAGC (SEQ ID NO: 4).

As noted above, in one embodiment, the inhibitory polypeptide is designed to be secreted by the cell that expresses it. Secretion can be accomplished by including a "secretion signal sequence peptide" or simply a "signal peptide" on the inhibitory polypeptide. A "secretion signal sequence peptide" is an N-terminal peptide that targets the protein to the secretory pathway. A number of secretion signal sequence peptides are known. They generally comprise a stretch (e.g., 5-16 amino acids long) of hydrophobic amino acids that prompt the formation of, e.g., a single alpha helix. A signal sequence can comprise a cleavage site which can be, e.g., cleaved by a signal peptidase in the secretory pathway. Non-limiting examples of signal peptide sequences include MATGSRTPWLQEGSAFPT (SEQ ID NO: 5, signal peptide comprised by human growth hormone); MALWMRGPDPAAAFVN (SEQ ID NO: 6, signal peptide comprised by human pro-insulin; MAAKSASAATASIF (SEQ ID NO: 7, signal peptide comprised by Zea Maize Protein); and MKAKGDQI (SEQ ID NO: 8, signal peptide comprised by human influenza virus).

In one embodiment, the inhibitory polypeptide is, itself, a CAR polypeptide, that targets not a tumor antigen, but an antigen on the surface of an immunosuppressive cell that occurs in a tumor microenvironment. In this embodiment, then the cell will express two CAR polypeptides, one that targets a tumor antigen, and one that targets an immunosuppressive cell in the tumor microenvironment. It should be understood that when the inhibitory polypeptide is a second CAR, the inhibitory polypeptide is not secreted.

It is also contemplated that more than one inhibitory polypeptide can be expressed from a CAR-T as described herein, e.g., two or more antibodies or antigen-biding domains thereof that target the same or different antigens on an immunosuppressive cell or that target different antigens on different immunosuppressive cells (e.g., Tregs and immunosuppressive macrophages), an antibody and a bispecific antibody construct, or any combination of an antibody or antigen-binding domain thereof, a bispecific and a second CAR.

One aspect of the technology described herein provides a nucleic acid encoding an inhibitory polypeptide as described herein.

Vectors

One aspect of the technology described herein provides a vector comprising any of the nucleic acid constructs described herein. The term "vector" encompasses any genetic element that is capable of replication when associated with the proper control elements and that can transfer gene sequences to cells. A vector can include, but is not limited to, a cloning vector, an expression vector, a plasmid, phage, transposon, cosmid, artificial chromosome, virus, virion, etc. In one embodiment, a nucleic acid sequence encoding a given polypeptide as described herein, or any module thereof, is operably linked to a vector, which can be viral or non-viral. Such vectors can permit the introduction of the constructs described herein to a cell, e.g., a T cell to generate a CAR-T as described herein.

Constructs as described herein, encoding, for example, a CAR, an inhibitory polypeptide, an antibody or antigen-binding fragment thereof, a bispecific antibody, or the like, can be separate constructs, encoding each element on a separate nucleic acid. In preferred embodiments, however, the various constructs can be combined and encoded on a single nucleic acid, in a single vector.

As used herein, the term "expression vector" refers to a vector that directs expression of an RNA or polypeptide from sequences linked to transcriptional regulatory sequences on the vector. The sequences expressed will often, but not necessarily, be heterologous to the cell. An expression vector may comprise additional elements, for example, the expression vector may have two replication systems, thus allowing it to be maintained in two organisms, for example in human cells for expression and in a prokaryotic host for cloning and amplification. The term "expression" refers to the cellular processes involved in producing RNA and proteins and as appropriate, secreting proteins, including where applicable, but not limited to, for example, transcription, transcript processing, translation and protein folding, modification and processing. "Expression products" include RNA transcribed from a gene, and polypeptides obtained by translation of mRNA transcribed from a gene. The term "gene" means the nucleic acid sequence which is transcribed (DNA) to RNA in vitro or in vivo when operably linked to appropriate regulatory sequences. The gene may or may not include regions preceding and following the coding region, e.g. 5' untranslated (5'UTR) or "leader" sequences and 3' UTR or "trailer" sequences, as well as intervening sequences (introns) between individual coding segments (exons).

Another aspect of the technology described herein provides a viral vector comprising any of the constructs described herein. As used herein, the term "viral vector" refers to a nucleic acid vector construct that includes at least one element of viral origin and has the capacity to be packaged into a viral vector particle. The viral vector can contain a nucleic acid encoding a polypeptide as described herein in place of non-essential viral genes. The vector and/or particle may be utilized for the purpose of transferring nucleic acids into cells either in vitro or in vivo. Numerous forms of viral vectors are known in the art.

In one embodiment, the viral vector is a retroviral vector. In another embodiment, the viral vector is a lentiviral vector. Retroviral vectors, such as lentiviral vectors, provide a convenient platform for delivery of nucleic acid sequences encoding a gene, or chimeric gene (e.g., a CAR described herein) of interest. A selected nucleic acid sequence can be inserted into a vector and packaged in retroviral particles using techniques known in the art. The recombinant virus can then be isolated and delivered to cells, e.g. in vitro or ex vivo. Retroviral systems are well known in the art and are described in, for example, U.S. Pat. No. 5,219,740; Kurth and Bannert (2010) "Retroviruses: Molecular Biology, Genomics and Pathogenesis" Calster Academic Press (ISBN:978-1-90455-55-4); and Hu and Pathak Pharmacological Reviews 2000 52:493-512; which are incorporated by reference herein in their entirety. Lentiviral system for efficient DNA delivery can be purchased from OriGene; Rockville, MD.

One aspect of the technology described herein provides a method of making a CAR-T cell comprising introducing any of the nucleic acid constructs or vectors described herein to a T cell. A nucleic acid construct or vector carrying a construct as described herein can be introduced into an appropriate host cell (e.g., a T cell) by any of a variety of suitable means, including but not limited to, such biochemical means as transformation, transfection, conjugation, protoplast fusion, calcium phosphate-precipitation, and application with polycations such as diethylaminoethyl (DEAE) dextran, and mechanical means such as electroporation, direct microinjection, and microprojectile bombardment, as known to one of ordinary skill in the art. Efficient expression of the contructs or vectors described herein can be assessed using standard assays that detect the mRNA, DNA, or gene product of the nucleic acid encoding the CAR. For example, RT-PCR, FACS, northern blotting, western blotting, ELISA, or immunohistochemistry.

In one embodiment, the method further comprises activating or stimulating the CAR-T prior to administering the cell to the subject. Methods for activating CAR T cells are known in the art.

Treatment of Cancer

One aspect of the technology described herein provides a method of treating cancer in an individual in need thereof comprising administering any of the T cells described herein to the individual. In one embodiment, the cancer is a solid tumor. Non-limiting examples of solid tumors include Glioblastoma, Breast cancer, Ovarian cancer, Adrenocortical Tumor, Alveolar Soft Part Sarcoma, Chondrosarcoma, Colorectal Carcinoma, Desmoid Tumors, Desmoplastic Small Round Cell Tumor, Endocrine Tumors, Endodermal Sinus Tumor, Epithelioid Hemangioendothelioma, Ewing Sarcoma, Germ Cell Tumors (Solid Tumor), Giant Cell Tumor of Bone and Soft Tissue, Hepatoblastoma, Hepatocellular Carcinoma, Melanoma, Nephroma, Neuroblastoma, Non-Rhabdomyosarcoma Soft Tissue Sarcoma (NRSTS), Osteosarcoma, Paraspinal Sarcoma, Renal Cell Carcinoma, Retinoblastoma, Rhabdomyosarcoma, Synovial Sarcoma, and Wilms Tumor. Solid tumors can be found in bones, muscles, or organs, and can be sarcomas or carinomas.

In one embodiment, the cancer is a carcinoma, a melanoma, a sarcoma, a myeloma, a leukemia, or a lymphoma.

A carcinoma is a cancer that originates in an epithelial tissue. Carcinomas account for approximately 80-90% of all cancers. Carcinomas can affect organs or glands capable of secretion (e.g., breasts, lung, prostate, colon, or bladder). There are two subtypes of carcinomas: adenocarcinoma, which develops in an organ or gland, and squamous cell carcinoma, which originates in the squamous epithelium. Adenocarcinomas generally occur in mucus membranes, and are observed as a thickened plaque-like white mucosa. They often spread easily through the soft tissue where they occur. Squamous cell carcinomas can originate from any region of the body. Examples of carcinomas include, but are not limited to, prostate cancer, colorectal cancer, microsatellite stable colon cancer, microsatellite instable colon cancer, hepatocellular carcinoma, breast cancer, lung cancer, small cell lung cancer, non-small cell lung cancer, lung adenocarcinoma, melanoma, basal cell carcinoma, squamous cell carcinoma, renal cell carcinoma, ductal carcinoma in situ, invasive ductal carcinoma.

Sarcomas are cancers that originate in supportive and connective tissues, for example bones, tendons, cartilage, muscle, and fat. Sarcoma tumors usually resemble the tissue in which they grow. Non-limiting examples of sarcomas include, Osteosarcoma or osteogenic sarcoma (originating from bone), Chondrosarcoma (originating from cartilage), Leiomyosarcoma (originating from smooth muscle), Rhabdomyosarcoma (originating from skeletal muscle), Mesothelial sarcoma or mesothelioma (originate from membranous lining of body cavities), Fibrosarcoma (originating from fibrous tissue), Angiosarcoma or hemangioendothelioma (originating from blood vessels), Liposarcoma (originating from adipose tissue), Glioma or astrocytoma (originating from neurogenic connective tissue found in the brain), Myxosarcoma (originating from primitive embryonic connective tissue), or Mesenchymous or mixed mesodermal tumor (originating from mixed connective tissue types).

Melanoma is a type of cancer forming from pigment-containing melanocytes. Melanoma typically develops in the skin, but can occur in the mouth, intestine, or eye.

Myelomas are cancers that originate in plasma cells of bone marrow. Non-limiting examples of myelomas include multiple myeloma, plasmacytoma and amyloidosis.

Leukemias (also known as "blood cancers") are cancers of the bone marrow, which is the site of blood cell production. Leukemia is often associated with the overproduction of immature white blood cells. Immature white blood cells do not function properly, rendering the patient prone to infection. Leukemia additionally affects red blood cells, and can cause poor blood clotting and fatigue due to anemia. Leukemia can be classified as being acute myeloid leukemia (AML), Chronic myeloid leukemia (CML), Acute lymphocytic leukemia (ALL), and Chronic lymphocytic leukemia (CLL). Examples of leukemia include, but are not limited to, Myelogenous or granulocytic leukemia (malignancy of the myeloid and granulocytic white blood cell series), Lymphatic, lymphocytic, or lymphoblastic leukemia (malignancy of the lymphoid and lymphocytic blood cell series), and Polycythemia vera or erythremia (malignancy of various blood cell products, but with red cells predominating).

Lymphomas develop in the glands or nodes of the lymphatic system (e.g., the spleen, tonsils, and thymus), which purifies bodily fluids and produces white blood cells, or lymphocytes. Unlike leukemia, lymphomas form solid tumors. Lymphoma can also occur in specific organs, for example the stomach, breast, or brain; this is referred to as extranodal lymphomas). Lymphomas are subclassified into two categories: Hodgkin lymphoma and Non-Hodgkin lymphoma. The presence of Reed-Sternberg cells in Hodgkin lymphoma diagnostically distinguishes Hodgkin lymphoma from Non-Hodgkin lymphoma. Non-limiting examples of lymphoma include Diffuse large B-cell lymphoma (DLBCL), Follicular lymphoma, Chronic lymphocytic leukemia (CLL), Small lymphocytic lymphoma (SLL), Mantle cell lymphoma (MCL), Marginal zone lymphomas, Burkitt lymphoma, hairy cell leukemia (HCL). In one embodiment, the cancer is DLBCL or Follicular lymphoma.

In one embodiment, the cancer is metastatic.

Where the improvements described herein address one of the key problems in adapting CAR-T immunotherapy to solid tumors, i.e., the immunosuppressive tumor microenvironment, it is reasonable to expect the described approaches to improve the treatment of essentially any solid tumor (e.g., glioblastoma) to which a CAR-T can be targeted. Where, for example, one might anticipate reduced efficiency of getting CAR-T cells to the site of a tumor, e.g., for glioblastoma or other brain tumors, for which the blood-brain-barrier poses potential issues, it is contemplated that direct introduction of the modified CAR-T cells as described herein to the site of the tumor, e.g., by intratumoral injection, can provide therapeutic benefit relative to CAR-T cells lacking modifications as described herein.

In one embodiment, the T cells administered are autologous to the individual having cancer or a solid tumor. In one embodiment, the T cells administered are allogeneic to the individual having cancer or a solid tumor.

Another aspect of the technology described herein provides a method of reducing the number of immunosuppressive cells in or associated with a solid tumor comprising administering any of the CAR T cells described herein to an individual in need thereof. In one embodiment, the number of immunosuppressive cells in or associated with the solid tumor is reduced, e.g., via programmed cell death or other mechanism mediated by the CAR T cells. In one embodiment, the number of immunosuppressive cells in or associated with the solid tumor is reduced by at least 10% compared to the number of immunosuppressive cells prior to administration. In one embodiment, the number of immunosuppressive cells in or associated with the solid tumor is reduced by at least 15%, at least 20%, at least 25%, at least 30%, at least 35%, at least 40%, at least 45%, at least 50%, at least 55%, at least 60%, by at least 65%, at least 70%, at least 75%, at least 80%, at least 85%, at least 90%, at least 95%, at least 99%, or more compared to the number of immunosuppressive cells prior to administration. One skilled in the art can identify the number of immunosuppressive cells by e.g., histological staining of a tumor sample obtained from a subject prior to, concurrent with, or after administration.

In another embodiment, the activity of the immunosuppressive cells in or associated with the solid tumor is reduced, e.g., the activity is inhibited via binding of the PD-1 receptor. As used herein, "activity" refers to the capacity for the immunosuppressive cell to inhibit an immune response and confer protection of, e.g., a tumor. In one embodiment, the activity of the immunosuppressive cells in or associated with the solid tumor is reduced by at least 10% compared to the number of immunosuppressive cells prior to administration. In one embodiment, the activity of the immunosuppressive cells in or associated with the solid tumor is reduced by at least 15%, at least 20%, at least 25%, at least 30%, at least 35%, at least 40%, at least 45%, at least 50%, at least 55%, at least 60%, by at least 65%, at least 70%, at least 75%, at least 80%, at least 85%, at least 90%, at least 95%, at least 99%, or more compared to the number of immunosuppressive cells prior to administration. One skilled in the art can determine if the activity of the immunosuppressive cells is reduced by e.g., Treg killing assays.

Combination Therapies

In one embodiment, the T cells described herein are administered in combination with an anti-cancer therapy, e.g., a therapeutic for the intended use of treating an individual having cancer. An anti-cancer therapy can be, e.g., chemotherapy, radiation therapy, chemo-radiation therapy, immunotherapy (e.g., immune checkpoint inhibitors), hormone therapy, surgery or stem cell therapy.

In accordance with one embodiment, the subject is administered a checkpoint inhibitor in combination with the T cells described herein. In one embodiment, the checkpoint inhibitor is a small molecule, an inhibitory nucleic acid, an inhibitory polypeptide, antibody or antigen-binding domain thereof, or antibody reagent. In one embodiment, the checkpoint inhibitor is an antibody or antigen-binding domain thereof, or antibody reagent binds an immune checkpoint polypeptide and inhibits its activity. Common checkpoints that are targeted for therapeutics include, but are not limited to PD-L1, PD-L2, PD-1, CTLA-4, TIM-3, LAG-3, VISTA, or TIGIT. In one embodiment, the checkpoint inhibitor is an antibody or antigen-binding domain thereof, or antibody reagent binds a PD-L1, PD-L2, PD-1, CTLA-4, TIM-3, LAG-3, VISTA, or TIGIT polypeptide and inhibits its activity.

Inhibitors of known checkpoint regulators (e.g., PD-L1, PD-L2, PD-1, CTLA-4, TIM-3, LAG-3, VISTA, or TIGIT) are known in the art. Non-limiting examples of checkpoint inhibitors (with checkpoint targets and manufacturers noted in parentheses) can include: MGA271 (B7-H3: MacroGenics); ipilimumab (CTLA-4; Bristol Meyers Squibb); pembrolizumab (PD-1; Merck); nivolumab (PD-1; Bristol Meyers Squibb); atezolizumab (PD-L1; Genentech); IMP321 (LAG3: Immuntep); BMS-986016 (LAG3; Bristol Meyers Squibb); IPH2101 (KIR; Innate Pharma); tremelimumab (CTLA-4; Medimmune); pidilizumab (PD-1; Medivation); MPDL3280A (PD-L1; Roche); MEDI4736 (PD-L1; Astra- Zeneca); MSB0010718C (PD-L1; EMD Serono); AUNP12 (PD-1; Aurigene); avelumab (PD-L1; Merck); durvalumab (PD-L1; Medimmune); TSR-022 (TIM3; Tesaro). PD-1 inhibitors include, but are not limited to Pembrolizumab (Keytruda™), Nivolumab, AUNP-12, or Pidilizumab. In another embodiment, the checkpoint inhibitor inhibits PD-L1. PD-L1 inhibitors include, but are not limited to Atezolizumab, MPDL3280A, Avelumab, or Durvalumab. Examples of PD-1 and PD-L1 blockers are described in U.S. Pat. Nos. 7,488,802; 7,943,743; 8,008,449; 8,168,757; 8,217,149, and PCT Published Patent Application Nos: WO03042402, WO2008156712, WO2010089411, WO2010036959, WO2011066342, WO2011159877, WO2011082400, and WO2011161699; which are incorporated by reference herein in their entireties. In certain embodiments, the PD-1 inhibitors include anti-PD-L1 antibodies. PD-1 inhibitors include anti-PD-1 antibodies and similar binding proteins such as nivolumab (MDX 1106, BMS 936558, ONO 4538), a fully human IgG4 antibody that binds to and blocks the activation of PD-1 by its ligands PD-L1 and PD-L2; lambrolizumab (MK-3475 or SCH 900475), a humanized monoclonal IgG4 antibody against PD-1; CT-011 a humanized antibody that binds PD-1; AMP-224, a fusion protein of B7-DC; an antibody Fc portion; BMS-936559 (MDX-1105-01) for PD-L1 (B7-H1) blockade.

In accordance with one embodiment, the subject is administered a chemotherapeutic agent in combination with the T cells described herein. Exemplary chemotherapeutic agents include, but are not limited to, a platinum chemotherapeutic agent, an anthracyclin therapeutic agent, or an alkylating chemotherapeutic agent. Non-limiting examples of chemotherapeutic agents include an anthracycline (e.g., doxorubicin (e.g., liposomal doxorubicin)), a vinca alkaloid (e.g., vinblastine, vincristine, vindesine, vinorelbine), an alkylating agent (e.g., cyclophosphamide, decarbazine, melphalan, ifosfamide, temozolomide), an immune cell antibody (e.g., alemtuzamab, gemtuzumab, rituximab, tositumomab), an antimetabolite (including, e.g., folic acid antagonists, pyrimidine analogs, purine analogs and adenosine deaminase inhibitors (e.g., fludarabine)), an mTOR inhibitor, a TNFR glucocorticoid induced TNFR related protein (GITR) agonist, a proteasome inhibitor (e.g., aclacinomycin A, gliotoxin or bortezomib), an immunomodulator such as thalidomide or a thalidomide derivative (e.g., lenalidomide). General chemotherapeutic agents considered for use in combination therapies include anastrozole (Arimidex®), bicalutamide (Casodex®), bleomycin sulfate (Blenoxane®), busulfan (Myleran®), busulfan injection (Busulfex®), capecitabine (Xeloda®), N4-pentoxycarbonyl-5-deoxy-5-fluorocytidine, carboplatin (Paraplatin®), carmustine (BiCNU®), chlorambucil (Leukeran®), cisplatin (Platinol®), cladribine (Leustatin®), cyclophosphamide (Cytoxan® or Neosar®), cytarabine, cytosine arabinoside (Cytosar-U®), cytarabine liposome injection (DepoCyt®), dacarbazine (DTIC-Dome®), dactinomycin (Actinomycin D, Cosmegan), daunorubicin hydrochloride (Cerubidine®), daunorubicin citrate liposome injection (DaunoXome®), dexamethasone, docetaxel (Taxotere®), doxorubicin hydrochloride (Adriamycin®, Rubex®), etoposide (Vepesid®), fludarabine phosphate (Fludara®), 5-fluorouracil (Adrucil®, Efudex®), flutamide (Eulexin®), tezacitibine, Gemcitabine (difluorodeoxycitidine), hydroxyurea (Hydrea®), Idarubicin (Idamycin®), ifosfamide (IFEX®), irinotecan (Camptosar®), L-asparaginase (ELSPAR®), leucovorin calcium, melphalan (Alkeran®), 6-mercaptopurine (Purinethol®), methotrexate (Folex®), mitoxantrone (Novantrone®), mylotarg, paclitaxel (Taxol®), phoenix (Yttrium90/MX-DTPA), pentostatin, polifeprosan 20 with carmustine implant (Gliadel®), tamoxifen citrate (Nolvadex®), teniposide (Vumon®), 6-thioguanine, thiotepa, tirapazamine (Tirazone®), topotecan hydrochloride for injection (Hycamtin®), vinblastine (Velban®), vincristine (Oncovin®), and vinorelbine (Navelbine®). Exemplary alkylating agents include, without limitation, nitrogen mustards, ethylenimine derivatives, alkyl sulfonates, nitrosoureas and triazenes): uracil mustard (Aminouracil Mustard®, Chlorethaminacilt®, Demethyldopant®, Desmethyldopant®, Haemanthaminet®, Nordopant®, Uracil nitrogen Mustard®, Uracillost®, Uracilmostaza®, Uramustint®, Uramustine®), chlormethine (Mustargen®), cyclophosphamide (Cytoxan®, Neosar®, Clafent®, Endoxant®, Procytoxt®, Revimmune™), ifosfamide (Mitoxanat®), melphalan (Alkeran®), Chlorambucil (Leukeran®), pipobroman (Amedel®, Vercyte®), triethylenemelamine (Hemel®, Hexalen®, Hexastat®), triethylenethiophosphoramine, Temozolomide (Temodart®), thiotepa (Thioplext®), busulfan (Busilvext®, Myleran®), carmustine (BiCNU®), lomustine (CeeNU®), streptozocin (Zanosar®), and Dacarbazine (DTIC-Dome®). Additional exemplary alkylating agents include, without limitation, Oxaliplatin (Eloxatint®); Temozolomide (Temodar® and Temodalt®); Dactinomycin (also known as actinomycin-D, Cosmegen®); Melphalan (also known as L-PAM, L-sarcolysin, and phenylalanine mustard, Alkeran®); Altretamine (also known as hexamethylmelamine (HMM), Hexalen®); Carmustine (BiCNU®); Bendamustine (Treanda®); Busulfan (Busulfex® and Myleran®); Carboplatin (Paraplatin®); Lomustine (also known as CCNU, CeeNU®); Cisplatin (also known as CDDP, Platinol® and Platinol®-AQ); Chlorambucil (Leukeran®); Cyclophosphamide (Cytoxan® and Neosar®); Dacarbazine (also known as DTIC, DIC and imidazole carboxamide, DTIC-Dome®); Altretamine (also known as hexamethylmelamine (HMM), Hexalen®); Ifosfamide (Ifex®); Prednumustine; Procarbazine (Matulane®); Mechlorethamine (also known as nitrogen mustard, mustine and mechloroethamine hydrochloride, Mustargen®); Streptozocin (Zanosar®); Thiotepa (also known as thiophosphoamide, TESPA and TSPA, Thioplex®); Cyclophosphamide (Endoxant®, Cytoxan®, Neosar®, Procytoxt®, Revimmune®); and Bendamustine HCl (Treanda®). Exemplary mTOR inhibitors include, e.g., temsirolimus; ridaforolimus (formally known as deferolimus, (1R,2R,45)-4-[(2R)-2 [(1R,95,125,15R,16E, 18R,19R,21R,235,24E,26E,28Z,305,325,35R)-1,18-dihydroxy-19,30-dimethoxy-15,17,21,23, 29,35-hexamethyl-2, 3,10,14,20-pentaoxo-11,36-dioxa-4-azatricyclo[30.3.1.04'9] hexatriaconta-16,24,26,28-tetraen-12-yl]propyl]-2-methoxycyclohexyl dimethylphosphinate, also known as AP23573 and MK8669, and described in PCT Publication No. WO 03/064383); everolimus (Afinitor® or RADOOl); rapamycin (AY22989, Sirolimus®); simapimod (CAS 164301-51-3); emsirolimus, (5-{2,4-Bis[(35,)-3-methyl-morpholin-4-yl]pyrido[2,3-(i]pyrimidin-7-yl}-2-methoxy-phenyl)methanol (AZD8055); 2-Amino-8-[iraw5,-4-(2-hy-droxyethoxy)cyclohexyl]-6-(6-methoxy-3-pyridinyl)-4-methyl-pyrido[2,3-JJpyrimidin-7(8H)-one (PF04691502, CAS 1013101-36-4); and N2-[1,4-dioxo-4-[[4-(4-oxo-8-phenyl-4H-1-benzopyran-2-yl)morpholinium-4-yl] methoxy]butyl]-L-arginylglycyl-L-a-aspartylL-serine-, inner salt (SF1126, CAS 936487-67-1), and XL765. Exemplary immunomodulators include, e.g., afutuzumab (available from Roche®); pegfilgrastim (Neulastat); lenalidomide (CC-5013, Revlimidt); thalidomide (Thalomidt), actimid (CC4047); and IRX-2 (mixture of human cytokines including interleukin 1, interleukin 2, and interferon γ, CAS 951209-71-5, available from IRX Therapeutics). Exemplary anthracyclines include, e.g., doxorubicin (Adriamycin® and Rubex®); bleomycin (Lenoxane®); daunorubicin (dauorubicin hydrochloride, daunomycin, and rubidomycin hydrochloride, Cerubidine®); daunorubicin liposomal (daunorubicin citrate liposome, DaunoXome®); mitoxantrone (DHAD, Novantrone®); epirubicin (Ellence™); idarubicin (Idamycin®, Idamycin PFS®); mitomycin C (Mutamycin®); geldanamycin; herbimycin; ravidomycin; and desacetylravidomycin. Exemplary vinca alkaloids include, e.g., vinorelbine tartrate (Navelbine®), Vincristine (Oncovin®), and Vindesine (Eldisine®)); vinblastine (also known as vinblastine sulfate, vincaleukoblastine and VLB, Alkaban-AQ® and Velban®); and vinorelbine (Navelbine®). Exemplary proteosome inhibitors include bortezomib (Velcade®); carfilzomib (PX-171-007, (5)-4-Methyl-N-((5)-1-(((5)-4-methyl-1-((R)-2-methyloxiran-2-yl)-1-oxopentan-2-yl)amino)-1-oxo-3-phenylpropan-2-yl)-2-((5,)-2-(2-morpholinoacetamido)-4-phenylbutanamido)-pentanamide); marizomib (NPT0052); ixazomib citrate (MLN-9708); delanzomib (CEP-18770); and O-Methyl-N-[(2-methyl-5-thiazolyl)carbonyl]-L-seryl-O-methyl-N-[(llS')-2-[(2R)-2-methyl-2-oxiranyl]-2-oxo-1-(phenylmethyl)ethyl]-L-serinamide (ONX-0912).

One of skill in the art can readily identify a chemotherapeutic agent of use with methods and compositions describe herein (e.g. see Physicians' Cancer Chemotherapy Drug Manual 2014, Edward Chu, Vincent T. DeVita Jr., Jones & Bartlett Learning; Principles of Cancer Therapy, Chapter 85 in Harrison's Principles of Internal Medicine, 18th edition; Therapeutic Targeting of Cancer Cells: Era of Molecularly Targeted Agents and Cancer Pharmacology, Chs. 28-29 in Abeloff's Clinical Oncology, 2013 Elsevier; and Fischer D S (ed): The Cancer Chemotherapy Handbook, 4th ed. St. Louis, Mosby-Year Book, 2003).

In accordance with one embodiment, the subject is administered a radiation therapy in combination with the T cells described herein. Radiation therapy, according to the invention disclosed herein, encompasses both non-invasive (external) and invasive (internal) radiation therapies. In an external radiation therapy, treatment is affected by radiation sources outside the body, whereas in an invasive radiation therapy treatment is affected by radiation sources planted inside the body. The representative diseases treated by non-invasive or invasive radiation therapy include, for example, cancer, rheumatoid arthritis, angioplasty, or restenosis.

In accordance with one embodiment, the subject is administered a chemo-radiation therapy, e.g., a combination of a chemotherapy and radiation therapy, in combination with the T cells described herein.

In accordance with one embodiment, the subject is administered a molecule that decreases the activity and/or level of a molecule targeting GITR and/or modulating GITR functions, a molecule that decreases the Treg cell population, an mTOR inhibitor, a GITR agonist, a kinase inhibitor, a non-receptor tyrosine kinase inhibitor, a CDK4 inhibitor, and/or a BTK inhibitor, in combination with the T cells described herein.

In accordance with one embodiment, the subject is administered a hormone therapy in combination with the T cells described herein. Hormone therapies are known in the art and the appropriate hormone therapy can be determined by a skilled clinician.

In accordance with one embodiment, the subject is administered a stem cell therapy in combination with the T cells described herein. Stem therapies are known in the art and the appropriate stem cell therapy can be determined by a skilled clinician.

Administration

In some embodiments, the methods described herein relate to treating a subject having or diagnosed as having cancer comprising administering any of the CAR polypeptides, nucleic acids, vectors, or CAR T cells described herein. As used herein, a "CAR T cell as described herein" refers to a mammalian cell comprising any of the CAR polypeptides, nucleic acids, or vectors described herein. Subjects having cancer can be identified by a physician using current methods of diagnosing the condition. Symptoms and/or complications of a cancer (e.g., a solid tumor), which characterize these cancers and aid in diagnosis are well known in the art and include but are not limited to, nausea or loss of appetite, and vision impairment. Symptoms and/or complications specific to a given cancer are known in the art and can be determined by a physician. Tests that may aid in a diagnosis of, e.g. cancer, but are not limited to, non-invasive imaging, biopsy, blood screening and bone marrow testing, and are known in the art for a given cancer. A family history for cancer, or exposure to risk factors for a given cancer can also aid in determining if a subject is likely to have the condition or in making a diagnosis of a given cancer.

The compositions described herein can be administered to a subject having or diagnosed as having cancer. In some embodiments, the methods described herein comprise administering an effective amount of activated CART cells described herein to a subject in order to alleviate a symptom of a given cancer. As used herein, "alleviating a symptom of the cancer" is ameliorating any condition or symptom associated with the cancer (e.g., a solid tumor). As compared with an equivalent untreated control, such reduction is by at least 5%, 10%, 20%, 40%, 50%, 60%, 80%, 90%, 95%, 99% or more as measured by any standard technique (e.g., a reduction in tumor size). A variety of means for administering the compositions described herein to subjects are known to those of skill in the art. In one embodiment, the compositions described herein are administered systemically or locally. In a preferred embodiment, the compositions described herein are administered intravenously. In another embodiment, the compositions described herein are administered at the site of the tumor (e.g., a solid tumor).

The term "effective amount" as used herein refers to the amount of activated CART cells needed to alleviate at least one or more symptom of the disease (e.g., solid tumor or other cancer), and relates to a sufficient amount of the cell preparation or composition to provide the desired effect. The term "therapeutically effective amount" therefore refers to an amount of activated CAR T cells that is sufficient to provide a particular anti-condition effect when administered to a typical subject. An effective amount as used herein, in various contexts, would also include an amount sufficient to delay the development of a symptom of the disease (e.g., cancer), alter the course of a symptom disease (for example but not limited to, slowing the progression of a tumor growth), or reverse a symptom of the disease. Thus, it is not generally practicable to specify an exact "effective amount". However, for any given case, an appropriate "effective amount" can be determined by one of ordinary skill in the art using only routine experimentation.

Effective amounts, toxicity, and therapeutic efficacy can be evaluated by standard pharmaceutical procedures in cell cultures or experimental animals. The dosage can vary depending upon the dosage form employed and the route of administration utilized. The dose ratio between toxic and therapeutic effects is the therapeutic index and can be expressed as the ratio LD50/ED50. Compositions and methods that exhibit large therapeutic indices are preferred. A therapeutically effective dose can be estimated initially from cell culture assays. Also, a dose can be formulated in animal models to achieve a circulating plasma concentration range that includes the IC50 (i.e., the concentration of activated CAR T cells, which achieves a half-maximal inhibition of symptoms) as determined in cell culture, or in an appropriate animal model. Levels in plasma can be measured, for example, by high performance liquid chromatography. The effects of any particular dosage can be monitored by a suitable bioassay, e.g., non-invasive imaging, among others. The dosage can be determined by a physician and adjusted, as necessary, to suit observed effects of the treatment.

In one embodiment, the activated CAR T cells described herein are comprised in a pharmaceutical composition, optionally comprising a pharmaceutically acceptable carrier. The active ingredients of the pharmaceutical composition at a minimum comprise activated CAR T cells as described herein. In some embodiments, the active ingredients of the pharmaceutical composition consist essentially of activated CART cells as described herein. In some embodiments, the active ingredients of the pharmaceutical composition consist of activated CART cells as described herein. Pharmaceutically acceptable carriers for cell-based therapeutic formulation include saline and aqueous buffer solutions, Ringer's solution, and serum component, such as serum albumin, HDL and LDL. The terms such as "excipient", "carrier", "pharmaceutically acceptable carrier" or the like are used interchangeably herein.

In some embodiments, the pharmaceutical composition comprising activated CAR T cells as described herein can be a parenteral dose form. Since administration of parenteral dosage forms typically bypasses the patient's natural defenses against contaminants, the components apart from the CAR T cells themselves are preferably sterile or capable of being sterilized prior to administration to a patient. Examples of parenteral dosage forms include, but are not limited to, solutions ready for injection, dry products ready to be dissolved or suspended in a pharmaceutically acceptable vehicle for injection, suspensions ready for injection, and emulsions. Any of these can be added to the activated CAR T cells preparation prior to administration.

Suitable vehicles that can be used to provide parenteral dosage forms of activated CAR T cells as disclosed within are well known to those skilled in the art. Examples include, without limitation: saline solution; glucose solution; aqueous vehicles including but not limited to, sodium chloride injection, Ringer's injection, dextrose Injection, dextrose and sodium chloride injection, and lactated Ringer's injection; water-miscible vehicles such as, but not limited to, ethyl alcohol, polyethylene glycol, and propylene glycol; and non-aqueous vehicles such as, but not limited to, corn oil, cottonseed oil, peanut oil, sesame oil, ethyl oleate, isopropyl myristate, and benzyl benzoate.

Dosage

"Unit dosage form" as the term is used herein refers to a dosage for suitable one administration. By way of example a unit dosage form can be an amount of therapeutic disposed in a delivery device, e.g., a syringe or intravenous drip bag. In one embodiment, a unit dosage form is administered in a single administration. In another, embodiment more than one unit dosage form can be administered simultaneously.

In some embodiments, the activated CAR T cells described herein are administered as a monotherapy, i.e., another treatment for the condition is not concurrently administered to the subject.

A pharmaceutical composition comprising the CAR T cells described herein (e.g., engineered cells) can generally be administered at a dosage of $10^4$ to $10^5$ cells/kg body weight, $10^4$ to $10^6$ cells/kg body weight, $10^4$ to $10^7$ cells/kg body weight, $10^4$ to $10^8$ cells/kg body weight, $10^4$ to $10^9$ cells/kg body weight, $10^8$ to $10^9$ cells/kg body weight, $10^7$ to $10^9$ cells/kg body weight, $10^6$ to $10^9$ cells/kg body weight, $10^5$ to $10^9$ cells/kg body weight, $10^4$ to $10^9$ cells/kg body weight, $10^4$ to $10^6$ cells/kg body weight, $10^5$ to $10^7$ cells/kg body weight, $10^7$ to $10^9$ cells/kg body weight, $10^5$ to $10^8$ cells/kg body weight, or $10^6$ to $10^7$ cells/kg body weight, including all integer values within those ranges. If necessary, engineered cell compositions can also be administered multiple times at these dosages. The cells can be administered by using infusion techniques that are commonly known in immunotherapy (see, e.g., Rosenberg et al., New Eng. J. of Med. 319:1676, 1988).

In certain aspects, it may be desired to administer activated CAR T cells to a subject and then subsequently redraw blood (or have an apheresis performed), activate T cells therefrom as described herein, and reinfuse the patient with these activated and expanded T cells. This process can be carried out multiple times every few weeks. In certain aspects, T cells can be activated from blood draws of from 10 cc to 400 cc. In certain aspects, T cells are activated from blood draws of 20 cc, 30 cc, 40 cc, 50 cc, 60 cc, 70 cc, 80 cc, 90 cc, or 100 cc.

Modes of administration can include, for example intravenous (i.v.) injection or infusion. The compositions described herein can be administered to a patient transarterially, intratumorally, intranodally, or intramedullary. In some embodiments, the compositions of T cells may be injected directly into a tumor, lymph node, or site of infection. In one embodiment, the compositions described herein are administered into a body cavity or body fluid (e.g., ascites, pleural fluid, peritoneal fluid, or cerebrospinal fluid).

In some embodiments, the activated CAR T cells described herein are administered with a second therapeutic, e.g., an anti-cancer therapy. The dosage ranges for a second therapeutic depends upon the potency, and includes amounts large enough to produce the desired effect, e.g., a decrease in tumor size. Generally, the dosage will vary with the type of agent (e.g., checkpoint inhibitor, or anti-cancer treatment (e.g., chemotherapeutic), and with the age, sex, and condition of the patient. Typically, the dosage will range from 0.001 mg/kg body weight to 5 g/kg body weight. In some embodiments, the dosage range is from 0.001 mg/kg body weight to 1 g/kg body weight, from 0.001 mg/kg body weight to 0.5 g/kg body weight, from 0.001 mg/kg body weight to 0.1 g/kg body weight, from 0.001 mg/kg body weight to 50 mg/kg body weight, from 0.001 mg/kg body weight to 25 mg/kg body weight, from 0.001 mg/kg body weight to 10 mg/kg body weight, from 0.001 mg/kg body weight to 5 mg/kg body weight, from 0.001 mg/kg body weight to 1 mg/kg body weight, from 0.001 mg/kg body weight to 0.1 mg/kg body weight, from 0.001 mg/kg body weight to 0.005 mg/kg body weight. Alternatively, in some embodiments the dosage range is from 0.1 g/kg body weight to 5 g/kg body weight, from 0.5 g/kg body weight to 5 g/kg body weight, from 1 g/kg body weight to 5 g/kg body weight, from 1.5 g/kg body weight to 5 g/kg body weight, from 2 g/kg body weight to 5 g/kg body weight, from 2.5 g/kg body weight to 5 g/kg body weight, from 3 g/kg body weight to 5 g/kg body weight, from 3.5 g/kg body weight to 5 g/kg body weight, from 4 g/kg body weight to 5 g/kg body weight, from 4.5 g/kg body weight to 5 g/kg body weight, from 4.8 g/kg body weight to 5 g/kg body weight. In some embodiments of any of the aspects, the dose range is from 1 µg/kg body weight to 20 µg/kg body weight. Alternatively, the dose range will be titrated to maintain serum levels between 1 µg/mL and 20 µg/mL. In some embodiments, the dosage range is from 1 µg/mL to 15 µg/mL, from 1 µg/mL to 10 µg/mL, from 1 µg/mL to 5 µg/mL, from 1 µg/mL to 2.5 µg/mL, from 2.5 µg/mL to 20 µg/mL, from 5 µg/mL to 20 µg/mL, from 10 µg/mL to 20 µg/mL, from 15 µg/mL to 20 µg/mL, from 10 µg/mL to 5 µg/mL, from 5 µg/mL to 15 µg/mL, from 5 µg/mL to 10 µg/mL, from 2.5 µg/mL to 10 µg/mL, or from 2.5 µg/mL to 15 µg/mL.

The dosage of the above treatments (e.g., the activated CAR T cells, and second therapeutic) to be administered to a patient will vary with the precise nature of the condition being treated and the recipient of the treatment. The scaling of dosages for human administration can be performed according to art-accepted practices.

In some embodiments, a single treatment regimen is required. In others, administration of one or more subsequent doses or treatment regimens can be performed. For example, after treatment biweekly for three months, treatment can be repeated once per month, for six months or a year or longer. In some embodiments, no additional treatments are administered following the initial treatment.

The dosage of a composition as described herein can be determined by a physician and adjusted, as necessary, to suit observed effects of the treatment. With respect to duration and frequency of treatment, it is typical for skilled clinicians to monitor subjects in order to determine when the treatment is providing therapeutic benefit (e.g., a reduction in tumor size), and to determine whether to administer further cells, discontinue treatment, resume treatment, or make other alterations to the treatment regimen. The dosage should not be so large as to cause adverse side effects, e.g., cytokine release syndrome. Generally, the dosage will vary with the age, condition, and sex of the patient and can be determined by one of skill in the art. The dosage can also be adjusted by the individual physician in the event of any complication.

In one embodiment, the activated CAR T cells described herein are administered with at least one additional therapeutic. In one embodiment, the activated CAR T cells as described herein are administered with at least 2 or more therapeutics (e.g., a chemotherapeutics and a checkpoint inhibitor).

Administered "in combination", as used herein, means that two (or more) different treatments are delivered to the subject during the course of the subject's affliction with the disease (e.g., cancer), e.g., the two or more treatments are delivered after the subject has been diagnosed with cancer and before the cancer has been cured or eliminated or treatment has ceased for other reasons. In some embodiments, the delivery of one treatment is still occurring when the delivery of the second begins, so that there is overlap in terms of administration. This is sometimes referred to herein as "simultaneous" or "concurrent delivery". In other embodiments, the delivery of one treatment ends before the delivery of the other treatment begins. In some embodiments of either case, the treatment is more effective because of combined administration. For example, the second treatment is more effective, e.g., an equivalent effect is seen with less of the second treatment, or the second treatment reduces symptoms to a greater extent, than would be seen if the second treatment were administered in the absence of the first treatment, or the analogous situation is seen with the first treatment. In some embodiments, delivery is such that the reduction in a symptom, or other parameter related to the disorder is greater than what would be observed with one treatment delivered in the absence of the other. The effect of the two treatments can be partially additive, wholly additive, or greater than additive. The delivery can be such that an effect of the first treatment delivered is still detectable when the second is delivered. The activated CAR T cells described herein and the at least one additional therapeutic can be administered simultaneously, in the same or in separate compositions, or sequentially. For sequential administration, the CAR T cell described herein can be administered first, and the at least one additional therapeutic can be administered second, or the order of administration can be reversed. The CAR T therapy and/or the at least one additional therapeutic, procedures or modalities can be administered during periods of active disorder, or during a period of remission or less active disease. The CAR T therapy can be administered before another treatment, concurrently with the treatment, post-treatment, or during remission of the cancer.

When administered in combination, the activated CAR T cells and the at least one additional therapeutic (e.g., an anti-cancer therapy), or all, can be administered in an amount or dose that is higher, lower or the same as the amount or dosage of each agent used individually, e.g., as a monotherapy. In certain embodiments, the administered amount or dosage of the activated CAR T cells, the at least one additional therapeutic, or all, is lower (e.g., at least 20%, at least 30%, at least 40%, or at least 50%) than the amount or dosage of each agent used individually. In other embodiments, the amount or dosage of the activated CAR T cells, the at least one additional therapeutic, or all, that results in a desired effect (e.g., treatment of cancer) is lower (e.g., at least 20%, at least 30%, at least 40%, or at least 50% lower) than the amount or dosage of each agent individually required to achieve the same therapeutic effect.

In some embodiments, a single treatment regimen is required for both the CAR T cells and the at least one additional therapeutic. In other embodiments, administration of one or more subsequent doses or treatment regimens can be performed for both the CAR T cells and the at least one additional therapeutic. In other embodiments, administration of one or more subsequent doses or treatment regimens can be performed for only one treatment (e.g., the CAR T cells, or the at least one additional therapeutic). For example, after treatment biweekly for three months, treatment can be repeated once per month, for six months or a year or longer. In some embodiments, no additional treatments are administered following the initial treatment of both the CAR T cells and the at least one additional therapeutic.

Parenteral Dosage Forms

Parenteral dosage forms of a composition or T cells described herein can be administered to a subject by various routes, including, but not limited to, epidural, intracerebral, intracerebroventricular, epicutaneous, intraarterial, intraarticular, intracardiac, intracavernous injection, intradermal, intralesional, intramuscular, intraocular, intraosseous infusion, intraperitoneal, intrathecal, intravenous, intravesical, intravitreal, subcutaneous, perivascular administration, or transmucosal. Since administration of parenteral dosage forms typically bypasses the patient's natural defenses against contaminants, carriers or excipients for parenteral dosage forms are preferably sterile or capable of being sterilized prior to administration to a patient. Examples of parenteral dosage forms include, but are not limited to, solutions ready for injection, dry products ready to be dissolved or suspended in a pharmaceutically acceptable vehicle for injection, suspensions ready for injection, controlled-release parenteral dosage forms, and emulsions.

Suitable vehicles that can be used to provide parenteral dosage forms of the disclosure are well known to those skilled in the art. Examples include, without limitation: sterile water; water for injection USP; saline solution; glucose solution; aqueous vehicles such as but not limited to, sodium chloride injection, Ringer's injection, dextrose Injection, dextrose and sodium chloride injection, and lactated Ringer's injection; water-miscible vehicles such as, but not limited to, ethyl alcohol, polyethylene glycol, and propylene glycol; and non-aqueous vehicles such as, but not limited to, corn oil, cottonseed oil, peanut oil, sesame oil, ethyl oleate, isopropyl myristate, and benzyl benzoate.

Efficacy

The efficacy of activated CART cells in, e.g. the treatment of a given cancer (e.g., a solid tumor) described herein, or to induce a response as described herein (e.g. a reduction in immunosuppressive cells) can be determined by the skilled clinician. However, a treatment is considered "effective treatment," as the term is used herein, if one or more of the signs or symptoms of a condition described herein is altered in a beneficial manner, other clinically accepted symptoms are improved, or even ameliorated, or a desired response is induced e.g., by at least 10% following treatment according to the methods described herein. Efficacy can be assessed, for example, by measuring a marker (e.g., amount of immunosuppressive cells in the tumor microenvironment), indicator (e.g., a reduction in tumor size), symptom, and/or the incidence of the cancer treated according to the methods described herein or any other measurable parameter appropriate. Treatment according to the methods described herein can reduce levels of a marker, indicator, symptom, or incidence of a cancer (e.g., a solid tumor), e.g. by at least 10%, at least 15%, at least 20%, at least 25%, at least 30%, at least 40%, at least 50%, at least 60%, at least 70%, at least 80% or at least 90% or more.

Efficacy can also be measured by a failure of an individual to worsen as assessed by hospitalization, or need for medical interventions (i.e., progression of the cancer is halted). Methods of measuring these indicators are known to those of skill in the art and/or are described herein.

Treatment includes any treatment of a cancer (e.g., a solid tumor) in an individual or an animal (some non-limiting examples include a human or an animal) and includes: (1) inhibiting the cancer, e.g., preventing a worsening of symptoms (e.g. fatigue, or loss of vision); or (2) relieving the severity of the cancer (e.g., causing regression of symptoms, or reducing the tumor size). An effective amount for the treatment of a cancer means that amount which, when administered to a subject in need thereof, is sufficient to result in effective treatment as that term is defined herein, for that cancer. Efficacy of an treatment can be determined by assessing physical indicators of a cancer (e.g., tumor size) or desired response (e.g., a reduction in tumor size). It is well within the ability of one skilled in the art to monitor efficacy of administration and/or treatment by measuring any one of such parameters, or any combination of parameters. Efficacy of a given approach can be assessed in animal models of a condition described herein, e.g., treatment of a solid tumor. When using an experimental animal model, efficacy of treatment is evidenced when a statistically significant change in a marker is observed.

All patents and other publications; including literature references, issued patents, published patent applications, and co-pending patent applications; cited throughout this application are expressly incorporated herein by reference for the purpose of describing and disclosing, for example, the methodologies described in such publications that might be used in connection with the technology described herein. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

The description of embodiments of the disclosure is not intended to be exhaustive or to limit the disclosure to the precise form disclosed. While specific embodiments of, and examples for, the disclosure are described herein for illustrative purposes, various equivalent modifications are possible within the scope of the disclosure, as those skilled in the relevant art will recognize. For example, while method steps or functions are presented in a given order, alternative embodiments may perform functions in a different order, or functions may be performed substantially concurrently. The teachings of the disclosure provided herein can be applied to other procedures or methods as appropriate. The various embodiments described herein can be combined to provide further embodiments. Aspects of the disclosure can be modified, if necessary, to employ the compositions, functions and concepts of the above references and application to provide yet further embodiments of the disclosure. Moreover, due to biological functional equivalency considerations, some changes can be made in protein structure without affecting the biological or chemical action in kind or amount. These and other changes can be made to the disclosure in light of the detailed description. All such modifications are intended to be included within the scope of the appended claims.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

The technology described herein is further illustrated by the following examples which in no way should be construed as being further limiting.

Some embodiments of the technology described herein can be defined according to any of the following numbered paragraphs:

1. A human cell comprising: (a) a first heterologous construct encoding a first chimeric T cell antigen receptor, the chimeric T cell antigen receptor comprising an extracellular antigen binding domain that specifically binds a target tumor antigen; and (b) a second heterologous construct encoding a polypeptide comprising an antigen-binding domain of a first antibody that specifically binds an extracellular polypeptide expressed on an immunosuppressive cell in a tumor environment.
2. The human cell of paragraph 1, which is a T cell.
3. The human cell of paragraph 1 or paragraph 2, wherein the polypeptide encoded by the second heterologous construct includes a signal sequence peptide.

4. The human cell of any one of paragraphs 1-3, wherein the polypeptide encoded by the second heterologous construct further includes an antigen-binding domain of a second antibody, that specifically binds a polypeptide expressed on the extracellular surface of the human cell.

5. The human cell of any one of paragraphs 1-4, wherein the polypeptide encoded by the second heterologous construct comprises a linker between the first and second antigen-binding domains.

6. The human cell of any one of paragraphs 1-5, wherein the antigen-binding domain or domains encoded by the first or second heterologous construct comprises an scFv fragment of an antibody.

7. The human cell of any one of paragraphs 1-6, wherein expression from the second heterologous construct is constitutive.

8. The human cell of any one of paragraphs 1-7, wherein expression from the second heterologous construct is under the control of a promoter which is induced upon activation of a T cell.

9. The human cell of paragraph 8, wherein the promoter is responsive to Nuclear Factor of Activated T cells (NFAT) or Notch Intracellular Domain (NICD).

10. The cell of any one of paragraphs 1-9, wherein the first and second heterologous constructs are encoded on a single nucleic acid.

11. The cell of any one of paragraphs 1-10, wherein the immunosuppressive cell is a Treg cell or an immunosuppressive macrophage.

12. The cell of any one of paragraphs 1-11, wherein the polypeptide expressed on the extracellular surface of an immunosuppressive cell is an immune checkpoint polypeptide.

13. The cell of any one of paragraphs 1-11, wherein the polypeptide expressed on the extracellular surface of an immunosuppressive cell is CTLA4, PD-L1, GARP or LAP.

14. A human cell comprising: (a) a heterologous construct encoding a first chimeric T cell antigen receptor, the chimeric T cell antigen receptor comprising an extracellular antigen binding domain that specifically binds a target tumor antigen; and (b) a heterologous construct encoding a second chimeric T cell antigen receptor, the chimeric T cell antigen receptor comprising an extracellular antigen binding domain that specifically binds a polypeptide expressed on the surface of an immunosuppressive cell in a tumor environment.

15. The cell of paragraph 14, which is a T cell.

16. The cell of paragraph 14 or 15, wherein the second chimeric T cell antigen receptor is constitutively expressed.

17. The cell of paragraph 14 or 15, wherein the expression of the second chimeric T cell antigen receptor is under the control of a promoter which is induced upon activation of the T cell.

18. The cell of paragraph 17, wherein the promoter is responsive to Nuclear Factor of Activated T cells (NFAT) or Notch Intracellular Domain (NICD).

19. The cell of any one of paragraphs 14-18, wherein the immunosuppressive cell is a Treg cell or an immunosuppressive macrophage.

20. The cell of any one of paragraphs 14-19, wherein the polypeptide expressed on the surface of an immunosuppressive cell is an immune checkpoint polypeptide.

21. The cell of any one of paragraphs 14-19, wherein the polypeptide expressed on the surface of an immunosuppressive cell is cytotoxic T-lymphocyte associated protein 4 (CTLA4), programmed death ligand 1 (PD-L1), glycoprotein A repetitions predominant (GARP), or latency associated peptide (LAP).

22. The cell of any one of paragraphs 14-21, wherein the extracellular antigen binding domain of the first or second chimeric T cell antigen receptors comprises an scFV fragment of an antibody.

23. The cell of any one of paragraphs 14-22, wherein the first or second chimeric T cell antigen receptor comprises a hinge and/or transmembrane domain from CD8 or 4-1BB.

24. The cell of any one of paragraphs 14-23, wherein the first and second chimeric T cell antigen receptors each comprise an intracellular signaling domain selected from the group consisting of CD3ζ, CD3ε, or CD3θ.

25. The cell of any one of paragraphs 14-24, wherein the first and second chimeric T cell antigen receptors each comprise an intracellular signaling domain comprising a co-stimulatory domain.

26. The cell of paragraph 25, wherein the co-stimulatory domain on either chimeric T cell antigen receptor is selected from the group consisting of 4-1BB, CD28, CD27, ICOS, and OX40.

27. The cell of any one of paragraphs 14-26, wherein the first and second chimeric T cell antigen receptors are encoded on one nucleic acid construct.

28. The cell of any one of paragraphs 14-27, which kills an activated Treg or inhibitory macrophage in a tumor environment.

29. A nucleic acid construct encoding: (a) a first chimeric T cell antigen receptor, the chimeric T cell antigen receptor comprising an extracellular antigen binding domain that specifically binds a target tumor antigen; and (b) a construct encoding a polypeptide comprising an antigen-binding domain of a first antibody that specifically binds an extracellular polypeptide expressed on an immunosuppressive cell in a tumor environment.

30. The nucleic acid construct of paragraph 29, wherein the polypeptide encoded by the construct of (b) comprises a signal peptide fused to a polypeptide comprising the first antibody or antigen-binding domain thereof that specifically binds an extracellular polypeptide expressed on an immunosuppressive cell in a tumor environment.

31. The nucleic acid construct of paragraph 30, wherein the polypeptide encoded by the construct of (b) further comprises a second antibody or antigen-binding domain thereof that specifically binds a polypeptide expressed on the surface of an effector T cell.

32. The nucleic acid construct of paragraph 31, wherein the polypeptide encoded by the construct of (b) further comprises a linker peptide between the first and second antibodies or antigen-binding domains thereof 33. The nucleic acid construct of paragraph 29, wherein the polypeptide encoded by the construct of (b) comprises a second chimeric T cell antigen receptor, the second T cell antigen receptor comprising an antigen-binding domain that specifically binds an extracellular polypeptide expressed on an immunosuppressive cell in a tumor environment.

34. The nucleic acid construct of any one of paragraphs 29-33, wherein expression from the construct of (b) is under the control of a promoter which is induced upon activation of a T cell.

35. The nucleic acid construct of paragraph 34, wherein the promoter is responsive to Nuclear Factor of Activated T cells (NFAT) or Notch Intracellular Domain (NICD).
36. The construct of any one of paragraphs 29-35, wherein the immunosuppressive cell is a Treg cell or a macrophage.
37. The construct of any one of paragraphs 29-36, wherein the extracellular polypeptide expressed on an immunosuppressive cell is CTLA4, PD-L1, GARP or LAP.
38. The construct of any one of paragraphs 29-37, wherein the antigen-binding domains of (a) and/or (b) comprise an scFV fragment of an antibody.
39. A vector comprising the nucleic acid construct of any one of paragraphs 29-38.
40. A viral vector comprising the nucleic acid construct of any one of paragraphs 29-38.
41. The viral vector of paragraph 40 which is a lentiviral vector.
42. A chimeric antigen receptor T cell (CAR-T) made by introducing a construct of any one of paragraphs 29-38 or a vector of any one of 39-41 to a T cell.
43. A method of treating cancer in an individual in need thereof, the method comprising administering a cell of any one of paragraphs 1-28 or 42 to the individual.
44. The method of paragraph 43, wherein the cancer comprises a solid tumor.
45. The method of either of paragraphs 43 or 44, wherein the cancer is selected from glioblastoma, melanoma, breast cancer and ovarian cancer.
46. A method of reducing the number of immunosuppressive cells in or associated with a solid tumor, the method comprising administering a cell of any one of paragraphs 1-28 or 42 to an individual having such a tumor.
47. The method of any one of paragraphs 43-46, wherein the cell is autologous to the individual having cancer or a solid tumor.
48. The method of any one of paragraphs 43-47, further comprising administering an anti-cancer therapeutic.
49. The method of paragraph 48, wherein the anti-cancer therapeutic comprises an immune checkpoint inhibitor or a chemotherapeutic agent.

EXAMPLES

The following examples illustrate some embodiments and aspects of the technology. It will be apparent to those skilled in the relevant art that various modifications, additions, substitutions, and the like can be performed without altering the spirit or scope of the invention, and such modifications and variations are encompassed within the scope of the invention as defined in the claims which follow. The technology described herein is further illustrated by the following examples which in no way should be construed as being further limiting.

Example 1

Although T cells expressing a chimeric antigen receptor (CAR T cell) have been shown to be a highly effective for the treatment of certain types of non-solid tumor cancers, such as certain leukemias, cancer, CAR-T cell therapies are largely ineffective against solid tumors due, at least in part, to the presence of immunosuppressive cells in the tumor and tumor microenvironment (e.g., tumor infiltrating Tregs or immunosuppressive macrophages.) Described herein are CAR T cells designed to target a tumor antigen and an immunosuppressive cell or cells in the tumor microenvironment. By targeting the cells that inhibit the effectiveness of tumor immunotherapy, such CAR T cells can reduce the protection of the tumor, and increasing the efficacy of the CAR T cells in treating a solid tumor.

Chimeric antigen receptors that comprise (1) an anti-LAP scFV (L-H) fused to 4-1BB transmembrane domain, a CD3ζ intracellular signaling domain, and a T2A linker domain (referred to herein as pMGH 100); (2) an anti-LAP scFV (H-L) fused to 4-1BB transmembrane domain, a CD3ζ intracellular signaling domain, and a T2A linker domain (referred to herein as pMGH 99; and (3) an anti-GARP scFV (camelid-HIS tag e.g., derived from a llama) fused to 4-1BB transmembrane domain, a CD3ζ intracellular signaling domain, and a T2A linker domain (referred to herein as pMGH 97) are described herein. A CAR that comprises an anti-EGFR scFV (an anti-tumor antigen) fused to 4-1BB transmembrane domain, a CD3ζ intracellular signaling domain, a T2a link domain, an anti-GARP scFV (camelid-HIS tag e.g., derived from a llama), and a P2A link domain (referred to herein as pMGH 105) is further contemplated herein. For monitoring purposes, each of these exemplary CARS further comprises an mCherry tag—CARs used for therapy need not, and preferably do not, have such a tag. See FIG. 1. These CARs are designed to target and kill immunosuppressive regulatory T cells (Tregs).

The CARs described herein were transduced into T cells derived from donors (donor indicated by ND#) using a lentivirus transduction system (FIG. 2). The transduction efficiency (e.g., the percentage of cells that express the CAR following transduction) was highest in cells derived from ND48; 81% for pMGH97 (anti-GARP), 79.5% for pMGH99 (anti-Lap, H-L), and 88.2% for pMGH100 (anti-LAP, L-H). These data indicate that the CARS described herein can be efficiently expressed in T cells.

Figure 3A:
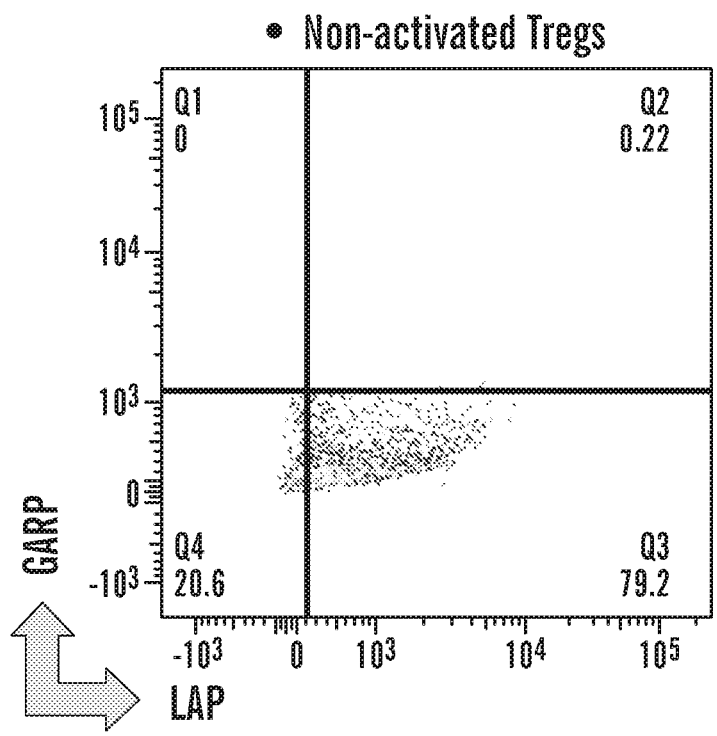
FIGS. 3A and 3B present exemplary experimental data showing LAP and GARP expression on non-activated Tregs (FIG. 3A), and activated Tregs (FIG. 3B).
Figure 3B:
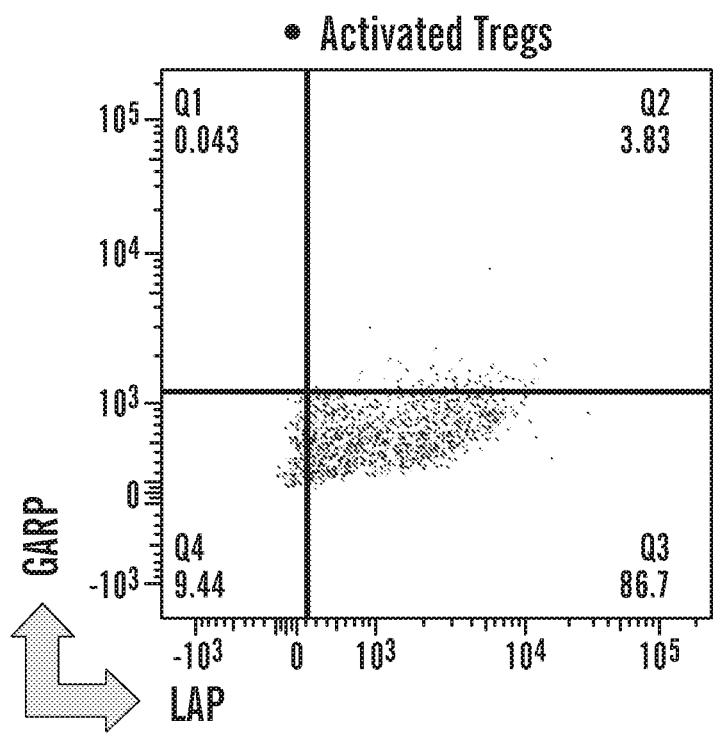

To assess if the activation status of a Treg altered the expression of the Treg markers GARP and LAP, non-activated Tregs and activated Tregs were analyzed by flow cytometry for the expression level of each marker. To activate the Tregs, the cells were stimulated with anti-CD3 and anti-CD28 for 24 hours prior to this assay. In a non-activated state, the majority of Tregs did not express GARP and/or LAP (FIG. 3A). In contrast, the levels of GARP and LAP significantly increased in Tregs following activation (FIG. 3B). GARP and LAP provide strong targets for killing or inactivating tumor-associated Tregs.

Example 2

Non-Activated Treg Killing Assay

Figure 4C:
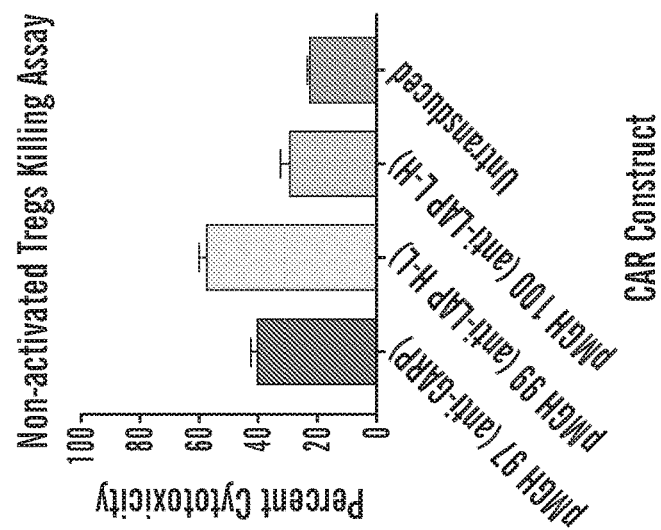
FIGS. 4A-4C present exemplary experimental data showing non-activated Treg killing assays. The number of Tregs (FIG. 4A), the percent of Tregs (e.g., percent of alive cells) (FIG. 4B), and percent cytotoxicity (FIG. 4C) observed 24 hours after the indicated CAR construct were transduced is shown herein.
Figure 4B:
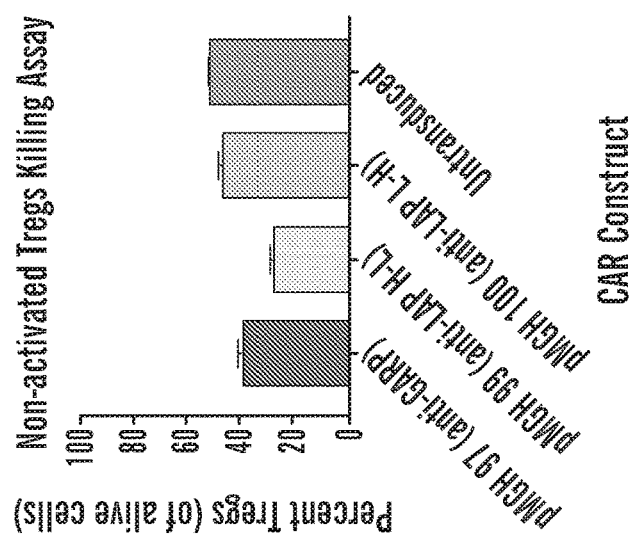
Figure 4A:
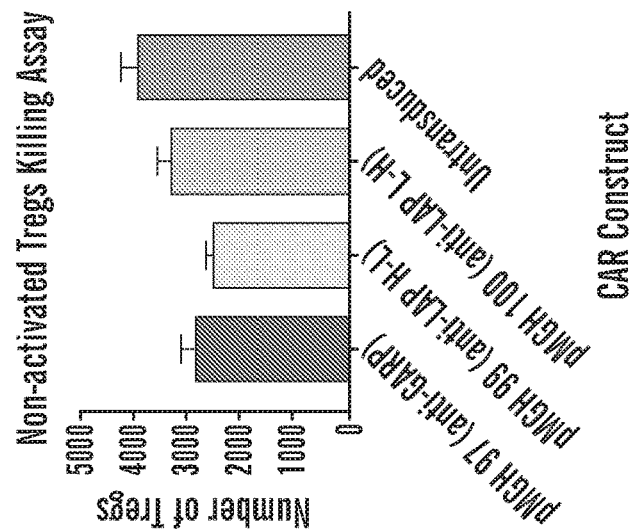

To assess the anti-Treg capacity of CAR T cells described above, the CAR T cells were co-cultured with non-activated Tregs at a 1:1 ratio for 24 hours. Flow cytometry was used to identify the Treg population in the co-culture and the number of Tregs, the percent of live Tregs, and the percent of cytotoxicity was assessed (FIGS. 4A-4C). Data presented herein show that pMGH99 (anti-LAP, H-L) comprised the highest level of Treg killing capacity as compared to the other anti-Treg CAR T cells and the untransduced T cells (used herein as a control). Notably, co-culture with pMGH99 and non-activated Tregs nearly doubled the cytotoxicity (FIG. 4C).

Activated Treg Killing Assay

Next, the killing capacity of the anti-Treg T cells was assessed with activated Tregs, which express an elevated level of GARP and LAP (FIGS. 3A and 3B). Treg cells used in this assay were obtained from the same donor as the cells used to make the anti-Treg CAR T cells, and were transduced to express GFP. To activate the Tregs, the cells were stimulated with anti-CD3 and anti-CD28 for 24 hours prior to co-culturing. In this assay, the anti-Treg CAR T cells were co-cultured with activated Tregs at a 1:1 ratio (100,000 cells each population) for 4 days. 300 U/mL of Interleukin 2 (IL-2) was added to the co-cultures after the first 24 hours. Flow cytometry was used to identify the Treg population in the co-culture.

Figure 5C:
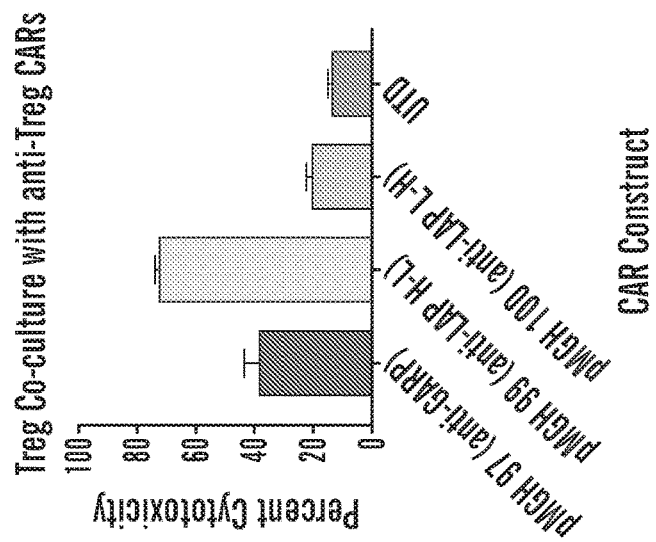
FIGS. 5A-5C present exemplary experimental data showing activated Treg killing assays. For activated Treg killing assays, CAR T cells were co-cultured with isolated Tregs expanded from the same donor and transduced to express GFP. Tregs were activated overnight with anti-CD3 and anti-CD28 prior to the killing assay. Cells were cultured at a 1:1 ratio of 100,000 cells each for 4 days in the presence of 300 U/mL of IL-2. Flow ran on Day 4. The number of Tregs (FIG. 5A), the percent of Tregs (e.g, percent of alive cells) (FIG. 5B), and percent cytotoxicity (FIG. 5C) observed after 4 days of incubation are shown herein. Percent cytotoxicity calculated as the percent of GFP+ cells missing compared to Tregs alone.
Figure 5B:
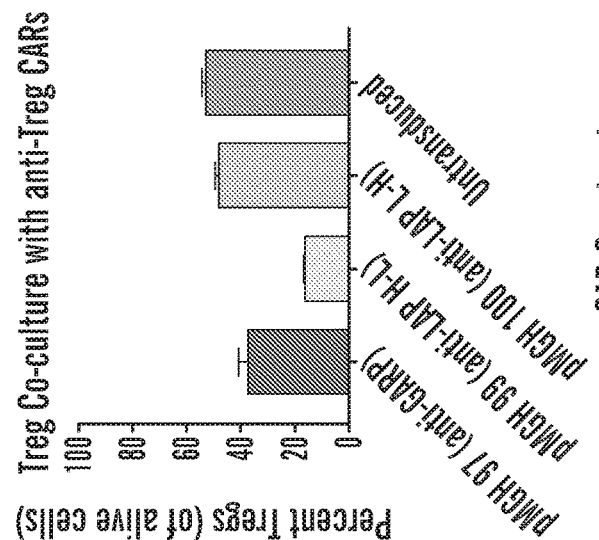
Figure 5A:
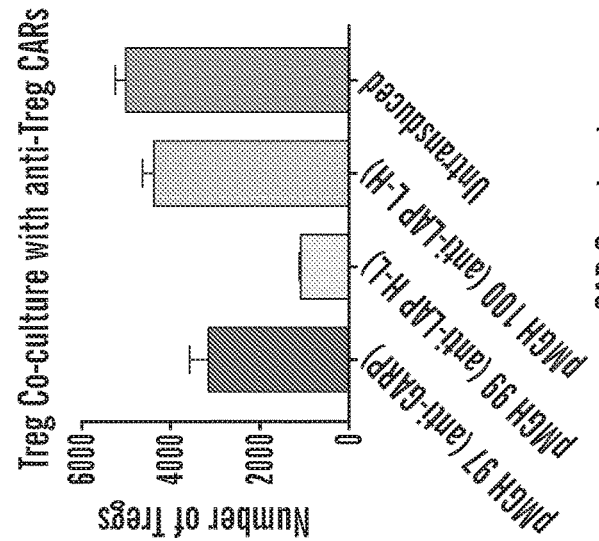

Data present herein shows that pMGH99 (anti-LAP, H-L) comprised the highest level of Treg killing capacity as compared to the other anti-Treg CAR T cells and the untransduced T cells (FIGS. 5A-5C).

The killing capacity of pMGH99 CART cells was more pronounced in the activated Treg killing assay, as compared to the non-activated Treg killing assay (FIGS. 4 and 5). To assess percent cytotoxicity, the percent of GFP+ Tregs cells were measured and compared to Tregs alone (FIG. 5C). These data indicate that the pMGH99 CAR T cell can efficiently target and kill suppressive Treg cell.

Example 3

Provided in Example 3 are sequences of exemplary CARs described herein.

```
Anti-GARP CAR
                                    (SEQ ID NO: 9)
MALPVTALLLPLALLLHAARPDIQMTQSPSSLSASLGDRVTITCQASQSI

SSYLAWYQQKPGQAPNILIYGASRLKTGVPSRFSGSGSGTSFTLTISGLE

AEDAGTYYCQQYASVPVTFGQGTKVELKTTTPAPRPPTPAPTIASQPLSL

RPEACRPAAGGAVHTRGLDFACDIYIWAPLAGTCGVLLLSLVITLYCKR

GRKKLLYIFKQPFMRPVQTTQEEDGCSCRFPEEEEGGCELRVKFSRSADA

PAYQQGQNQLYNELNLGRREEYDVLDKRRGRDPEMGGKPRRKNPQEGLYN

ELQKDKMAEAYSEIGMKGERRRGKGHDGLYQGLSTATKDTYDALHMQALP

PR
```

In SEQ ID NO: 9, the underlined sequence represents the CD8 leader sequence; the bolded sequence represents the anti-GARP antibody reagent; the italic sequence represents the CD8 hinge/transmembrane domain; the double-underlined sequence represents the 4-BB intracellular so-stimulatory domain; the bold, underlined sequence represents the CD3ζ intracellular signaling domain.

```
Anti-LAP (H-L) CAR
                                    (SEQ ID NO: 10)
MALPVTALLLPLALLLHAARPMKLWLNWIFLVTLLNDIQCEVKLVESGGGLVQPGGSLSL

SCAASGFTFTDYYMSWVRQPPGKALEWLGFIRNKPNGYTTEYSASVKGRFTISRDNSQSI

LYLQMNVLRAEDSATYYCARYTGGGYFDYWGQGTTLTVSSGGGGSGGGGSGGGGSGGGGS

MMSSAQFLGLLLLCFQGTRCDIQMTQTTSSLSASLGDRLTISCRASQDISNYLNWYQQKP

DGTVKLLIYYTSRLHSGVPSRFSGSGSGTDYSLTISNLEQADIATYFCQQGDTLPWTFGG

GTKLEIKTTTPAPRPPTPAPTIASQPLSLRPEACRPAAGGAVHTRGLDFACDIYIWAPLA

GTCGVLLLSLVITLYCKRGRKKLLYIFKQPFMRPVQTTQEEDGCSCRFPEEEEGGCELRV

KFSRSADAPAYQQGQNQLYNELNLGRREEYDVLDKRRGRDPEMGGKPRRKNPQEGLYNEL

QKDKMAEAYSEIGMKGERRRGKGHDGLYQGLSTATKDTYDALHMQALPPR
```

In SEQ ID NO: 10, the underlined sequence represents the CD8 leader sequence; the bolded sequence represents the anti-LAP (H-L) antibody reagent; the italic sequence represents the CD8 hinge/transmembrane domain; the double-underlined sequence represents the 4-BB intracellular so-stimulatory domain; and the bold, underlined sequence represents the CD3ζ intracellular signaling domain.

```
Anti-LAP (L-H) CAR
                                    (SEQ ID NO: 11)
MALPVTALLLPLALLLHAARPMMSSAQFLGLLLLCFQGTRCDIQMTQTTSSLSASLGDRL

TISCRASQDISNYLNWYQQKPDGTVKLLIYYTSRLHSGVPSRFSGSGSGTDYSLTISNLE

QADIATYFCQQGDTLPWTFGGGTKLEIKGGGGSGGGGSGGGGSGGGGSMKLWLNWIFLVT

LLNDIQCEVKLVESGGGLVQPGGSLSLSCAASGFTFTDYYMSWVRQPPGKALEWLGFIRN

KPNGYTTEYSASVKGRFTISRDNSQSILYLQMNVLRAEDSATYYCARYTGGGYFDYWGQG

TTLTVSSTTTPAPRPPTPAPTIASQPLSLRPEACRPAAGGAVHTRGLDFACDIYIWAPLA

GTCGVLLLSLVITLYCKRGRKKLLYIFKQPFMRPVQTTQEEDGCSCRFPEEEEGGCELRV

KFSRSADAPAYQQGQNQLYNELNLGRREEYDVLDKRRGRDPEMGGKPRRKNPQEGLYNEL

QKDKMAEAYSEIGMKGERRRGKGHDGLYQGLSTATKDTYDALHMQALPPR
```

In SEQ ID NO: 11, the underlined sequence represents the CD8 leader sequence; the bolded sequence represents the anti-LAP (L-H) antibody reagent; the italic sequence represents the CD8 hinge/transmembrane domain; the double-underlined sequence represents the 4-BB intracellular so-stimulatory domain; and the bold, underlined sequence represents the CD3ζ intracellular signaling domain.

Anti-EGFR CAR and secreted anti-GARP (Camelid) product
(SEQ ID NO: 12)

MALPVTALLLPLALLLHAARPMALPVTALLLPLALLLHAARPQVQLKQSGPGLVQPSQSL

SITCTVSGFSLTNYGVHWVRQSPGKGLEWLGVIWSGGNTDYNTPFTSRLSINKDNSKSQV

FFKMNSLQSNDTAIYYCARATTYYDYEFAYWGQGTLVTVSAGGGGSGGGGSGGGGSGGGG

SDILLTQSPVILSVSPGERVSFSCRASQSIGTNIHWYQQRTNGSPRLLIKYASESISGIP

SRFSGSGSGTDFTLSINSVESEDIADYYCQQNNNWPTTFGAGTKLELKTTTPAPRPPTPA

PTIASQPLSLRPEACRPAAGGAVHTRGLDFACDIYIWAPLAGTCGVLLLSLVITLYCKRG

RKKLLYIFKQPFMRPVQTTQEEDGCSCRFPEEEEGGCELRVKFSRSADAPAYQQGQNQLY

NELNLGRREEYDVLDKRRGRDPEMGGKPRRKNPQEGLYNELQKDKMAEAYSEIGMKGERR

RGKGHDGLYQGLSTATKDTYDALHMQALPPRPGSGSGATNFSLLKQAGDVEENPGPRTAM

ETDTLLLWVLLLWVPGSTGDDIQMTQSPSSLSASLGDRVTITCQASQSISSYLAWYQQKP

GQAPNILIYGASRLKTGVPSRFSGSGSGTSFTLTISGLEAEDAGTYYCQQYASVPVTFGQ

GTKVELKHHHHHSG

In SEQ ID NO: 12, the underlined sequence represents the CD8 leader sequence; the bolded sequence represents the anti-EGFR antibody reagent; the italic sequence represents the CD8 hinge/transmembrane domain; the double-underlined sequence represents the 4-BB intracellular so-stimulatory domain; the bold, underlined sequence represents the CD3ζ intracellular signaling domain; and the bold, italic sequence represents the anti-GARP (Camelid) secreted product.

What is claimed is:

1. A human cell comprising:
   a) a first heterologous construct encoding a first chimeric T cell antigen receptor comprising:
      (i) an anti-epidermal growth factor receptor (EGFR) antibody reagent of SEQ ID NO: 12;
      (ii) a hinge and/or transmembrane domain; and
      (iii) an intracellular signaling domain; and
   b) a second heterologous construct encoding a second chimeric T cell antigen receptor comprising:
      i) an anti-GARP antibody reagent of SEQ ID NO: 9;
      ii) an anti-LAP antibody reagent of SEQ ID NO: 10; or
      iii) an anti-LAP antibody reagent of SEQ ID NO: 11; and
      (iv) a hinge and/or transmembrane domain; and
      (v) an intracellular signaling domain,
   wherein the first and second heterologous constructs are encoded on a single polynucleotide.

2. The cell of claim 1, which is a T cell.

3. The cell of claim 1, wherein the antigen-binding domain or domains encoded by the first or second heterologous construct comprises an scFv fragment of an antibody.

4. The cell of claim 1, wherein expression of the second heterologous construct is constitutive or under the control of a promoter which is induced upon activation of a T cell.

5. The cell of claim 4, wherein the promoter is responsive to Nuclear Factor of Activated T cells (NF AT) or Notch Intracellular Domain (NICD).

6. The cell of claim 1, wherein, for the first or second chimeric T cell antigen receptor:
   (a) the hinge and/or transmembrane domain is from CD8 or 4-1BB;
   (b) the intracellular signaling domain is selected from the group consisting of CD3ς, CD3δ, or CD3δ; and/or
   (c) the intracellular signaling domain comprises a co-stimulatory domain, wherein the co-stimulatory domain on either chimeric T cell antigen receptor is selected from the group consisting of 4-1BB, CD28, CD27, ICOS, and OX40.

7. A method of treating cancer in an individual in need thereof, the method comprising administering a cell of claim 1 to the individual, wherein the cancer is selected from glioblastoma, melanoma, breast cancer and ovarian cancer.

8. The method of claim 7, wherein the cell is autologous to the individual having cancer or a solid tumor.

9. The method of claim 7, further comprising administering an anti-cancer therapeutic.

10. The method of claim 7, wherein the cell was obtained from the subject prior to being introduced to the first and second heterologous construct.

* * * * *

SEQUENCE LISTING

```
<160> NUMBER OF SEQ ID NOS: 13

<210> SEQ ID NO 1
<211> LENGTH: 321
<212> TYPE: DNA
<213> ORGANISM: Artificial Sequence
<220> FEATURE:
<223> OTHER INFORMATION: Description of Artificial Sequence: Synthetic
      polynucleotide

<400> SEQUENCE: 1
gacatccaga tgacccagag ccccagcagc ctgagcgcca gcctgggcga cagggtgacc         60
atcacctgcc aggccagcca gagcatcagc agctacctgg cctggtacca gcagaagccc        120
ggccaggccc ccaacatcct gatctacggc gccagcaggc tgaagaccgg cgtgcccagc        180
aggttcagcg gcagcggcag cggcaccagc ttcaccctga ccatcagcgg cctggaggcc        240
gaggacgccg gcacctacta ctgccagcag tacgccagcg tgcccgtgac cttcggccag        300
ggcaccaagg tggagctgaa g                                                  321

<210> SEQ ID NO 2
<211> LENGTH: 417
<212> TYPE: DNA
<213> ORGANISM: Artificial Sequence
<220> FEATURE:
<223> OTHER INFORMATION: Description of Artificial Sequence: Synthetic
      polynucleotide
```

<400> SEQUENCE: 2

```
atgaagttgt ggctgaactg gattttcctt gtaacacttt taaatgatat ccagtgtgag      60
gtgaagctgg tggagtctgg aggaggcttg gtacagcctg ggggttctct gagtctctcc     120
tgtgcagctt ctggattcac cttcactgat tactacatga gctgggtccg ccagcctcca     180
gggaaggcac ttgagtggtt gggttttatt agaaacaaac ctaatggtta cacaacagag     240
tacagtgcat ctgtgaaggg tcggttcacc atctccagag ataattccca aagcatcctc     300
tatcttcaaa tgaatgtcct gagagctgag gacagtgcca cttattactg tgcaagatat     360
acggggggg gttactttga ctactggggc caaggcacca ctctcacagt ctcctca        417
```

<210> SEQ ID NO 3
<211> LENGTH: 381
<212> TYPE: DNA
<213> ORGANISM: Artificial Sequence
<220> FEATURE:
<223> OTHER INFORMATION: Description of Artificial Sequence: Synthetic polynucleotide

<400> SEQUENCE: 3

```
atgatgtcct ctgctcagtt ccttggtctc ctgttgctct gttttcaagg taccagatgt      60
gatatccaga tgacacagac tacatcctcc ctgtctgcct ctctgggaga cagactcacc     120
atcagttgca gggcaagtca ggacattagc aattatttaa actggtatca gcagaaacca     180
gatggaactg ttaaactcct gatctactac acatcaagat tacactcagg agtcccatca     240
aggttcagtg gcagtgggtc tggaacagat tattctctca ccattagcaa cctggagcaa     300
gcagatattg ccacttactt ttgccaacag ggtgatacac ttccgtggac gttcggtgga     360
ggcaccaagc tggaaatcaa a                                              381
```

<210> SEQ ID NO 4
<211> LENGTH: 60
<212> TYPE: DNA
<213> ORGANISM: Artificial Sequence
<220> FEATURE:
<223> OTHER INFORMATION: Description of Artificial Sequence: Synthetic oligonucleotide

<400> SEQUENCE: 4

```
ggaggcggag gatctggcgg cggaggaagt ggcggcggag gatctggcgg cggaggaagc      60
```

<210> SEQ ID NO 5
<211> LENGTH: 18
<212> TYPE: PRT
<213> ORGANISM: Homo sapiens

<400> SEQUENCE: 5

```
Met Ala Thr Gly Ser Arg Thr Pro Trp Leu Gln Glu Gly Ser Ala Phe
1               5                   10                  15

Pro Thr
```

<210> SEQ ID NO 6
<211> LENGTH: 16
<212> TYPE: PRT
<213> ORGANISM: Homo sapiens

<400> SEQUENCE: 6

```
Met Ala Leu Trp Met Arg Gly Pro Asp Pro Ala Ala Phe Val Asn
1               5                   10                  15
```

<210> SEQ ID NO 7
<211> LENGTH: 14
<212> TYPE: PRT
<213> ORGANISM: Zea mays

<400> SEQUENCE: 7

Met Ala Ala Lys Ser Ala Ser Ala Ala Thr Ala Ser Ile Phe
1               5                   10

<210> SEQ ID NO 8
<211> LENGTH: 8
<212> TYPE: PRT
<213> ORGANISM: Influenza virus

<400> SEQUENCE: 8

Met Lys Ala Lys Gly Asp Gln Ile
1               5

<210> SEQ ID NO 9
<211> LENGTH: 351
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 9

Met Ala Leu Pro Val Thr Ala Leu Leu Leu Pro Leu Ala Leu Leu Leu
1               5                   10                  15

His Ala Ala Arg Pro Asp Ile Gln Met Thr Gln Ser Pro Ser Ser Leu
            20                  25                  30

Ser Ala Ser Leu Gly Asp Arg Val Thr Ile Thr Cys Gln Ala Ser Gln
        35                  40                  45

Ser Ile Ser Ser Tyr Leu Ala Trp Tyr Gln Gln Lys Pro Gly Gln Ala
    50                  55                  60

Pro Asn Ile Leu Ile Tyr Gly Ala Ser Arg Leu Lys Thr Gly Val Pro
65                  70                  75                  80

Ser Arg Phe Ser Gly Ser Gly Ser Gly Thr Ser Phe Thr Leu Thr Ile
                85                  90                  95

Ser Gly Leu Glu Ala Glu Asp Ala Gly Thr Tyr Tyr Cys Gln Gln Tyr
            100                 105                 110

Ala Ser Val Pro Val Thr Phe Gly Gln Gly Thr Lys Val Glu Leu Lys
        115                 120                 125

Thr Thr Thr Pro Ala Pro Arg Pro Pro Thr Pro Ala Pro Thr Ile Ala
    130                 135                 140

Ser Gln Pro Leu Ser Leu Arg Pro Glu Ala Cys Arg Pro Ala Ala Gly
145                 150                 155                 160

Gly Ala Val His Thr Arg Gly Leu Asp Phe Ala Cys Asp Ile Tyr Ile
                165                 170                 175

Trp Ala Pro Leu Ala Gly Thr Cys Gly Val Leu Leu Leu Ser Leu Val
            180                 185                 190

Ile Thr Leu Tyr Cys Lys Arg Gly Arg Lys Lys Leu Leu Tyr Ile Phe
        195                 200                 205

Lys Gln Pro Phe Met Arg Pro Val Gln Thr Thr Gln Glu Glu Asp Gly
    210                 215                 220

Cys Ser Cys Arg Phe Pro Glu Glu Glu Glu Gly Gly Cys Glu Leu Arg
225                 230                 235                 240

Val Lys Phe Ser Arg Ser Ala Asp Ala Pro Ala Tyr Gln Gln Gly Gln

```
                        245                 250                 255
Asn Gln Leu Tyr Asn Glu Leu Asn Leu Gly Arg Arg Glu Glu Tyr Asp
                260                 265                 270
Val Leu Asp Lys Arg Gly Arg Asp Pro Glu Met Gly Gly Lys Pro
            275                 280                 285
Arg Arg Lys Asn Pro Gln Glu Gly Leu Tyr Asn Glu Leu Gln Lys Asp
            290                 295                 300
Lys Met Ala Glu Ala Tyr Ser Glu Ile Gly Met Lys Gly Glu Arg Arg
305                 310                 315                 320
Arg Gly Lys Gly His Asp Gly Leu Tyr Gln Gly Leu Ser Thr Ala Thr
                325                 330                 335
Lys Asp Thr Tyr Asp Ala Leu His Met Gln Ala Leu Pro Pro Arg
            340                 345                 350

<210> SEQ ID NO 10
<211> LENGTH: 530
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 10

Met Ala Leu Pro Val Thr Ala Leu Leu Leu Pro Leu Ala Leu Leu Leu
1               5                   10                  15
His Ala Ala Arg Pro Met Lys Leu Trp Leu Asn Trp Ile Phe Leu Val
            20                  25                  30
Thr Leu Leu Asn Asp Ile Gln Cys Glu Val Lys Leu Val Glu Ser Gly
        35                  40                  45
Gly Gly Leu Val Gln Pro Gly Gly Ser Leu Ser Leu Ser Cys Ala Ala
    50                  55                  60
Ser Gly Phe Thr Phe Thr Asp Tyr Tyr Met Ser Trp Val Arg Gln Pro
65                  70                  75                  80
Pro Gly Lys Ala Leu Glu Trp Leu Gly Phe Ile Arg Asn Lys Pro Asn
                85                  90                  95
Gly Tyr Thr Thr Glu Tyr Ser Ala Ser Val Lys Gly Arg Phe Thr Ile
            100                 105                 110
Ser Arg Asp Asn Ser Gln Ser Ile Leu Tyr Leu Gln Met Asn Val Leu
        115                 120                 125
Arg Ala Glu Asp Ser Ala Thr Tyr Tyr Cys Ala Arg Tyr Thr Gly Gly
    130                 135                 140
Gly Tyr Phe Asp Tyr Trp Gly Gln Gly Thr Thr Leu Thr Val Ser Ser
145                 150                 155                 160
Gly Gly Gly Gly Ser Gly Gly Gly Ser Gly Gly Gly Gly Ser Gly
                165                 170                 175
Gly Gly Gly Ser Met Met Ser Ser Ala Gln Phe Leu Gly Leu Leu Leu
            180                 185                 190
Leu Cys Phe Gln Gly Thr Arg Cys Asp Ile Gln Met Thr Gln Thr Thr
        195                 200                 205
Ser Ser Leu Ser Ala Ser Leu Gly Asp Arg Leu Thr Ile Ser Cys Arg
    210                 215                 220
Ala Ser Gln Asp Ile Ser Asn Tyr Leu Asn Trp Tyr Gln Gln Lys Pro
225                 230                 235                 240
Asp Gly Thr Val Lys Leu Leu Ile Tyr Tyr Thr Ser Arg Leu His Ser
                245                 250                 255
```

Gly Val Pro Ser Arg Phe Ser Gly Ser Gly Ser Gly Thr Asp Tyr Ser
                260                 265                 270

Leu Thr Ile Ser Asn Leu Glu Gln Ala Asp Ile Ala Thr Tyr Phe Cys
            275                 280                 285

Gln Gln Gly Asp Thr Leu Pro Trp Thr Phe Gly Gly Gly Thr Lys Leu
        290                 295                 300

Glu Ile Lys Thr Thr Thr Pro Ala Pro Arg Pro Pro Thr Pro Ala Pro
305                 310                 315                 320

Thr Ile Ala Ser Gln Pro Leu Ser Leu Arg Pro Glu Ala Cys Arg Pro
                325                 330                 335

Ala Ala Gly Gly Ala Val His Thr Arg Gly Leu Asp Phe Ala Cys Asp
            340                 345                 350

Ile Tyr Ile Trp Ala Pro Leu Ala Gly Thr Cys Gly Val Leu Leu Leu
        355                 360                 365

Ser Leu Val Ile Thr Leu Tyr Cys Lys Arg Gly Arg Lys Lys Leu Leu
370                 375                 380

Tyr Ile Phe Lys Gln Pro Phe Met Arg Pro Val Gln Thr Thr Gln Glu
385                 390                 395                 400

Glu Asp Gly Cys Ser Cys Arg Phe Pro Glu Glu Glu Glu Gly Gly Cys
                405                 410                 415

Glu Leu Arg Val Lys Phe Ser Arg Ser Ala Asp Ala Pro Ala Tyr Gln
            420                 425                 430

Gln Gly Gln Asn Gln Leu Tyr Asn Glu Leu Asn Leu Gly Arg Arg Glu
        435                 440                 445

Glu Tyr Asp Val Leu Asp Lys Arg Arg Gly Arg Asp Pro Glu Met Gly
450                 455                 460

Gly Lys Pro Arg Arg Lys Asn Pro Gln Glu Gly Leu Tyr Asn Glu Leu
465                 470                 475                 480

Gln Lys Asp Lys Met Ala Glu Ala Tyr Ser Glu Ile Gly Met Lys Gly
                485                 490                 495

Glu Arg Arg Arg Gly Lys Gly His Asp Gly Leu Tyr Gln Gly Leu Ser
            500                 505                 510

Thr Ala Thr Lys Asp Thr Tyr Asp Ala Leu His Met Gln Ala Leu Pro
        515                 520                 525

Pro Arg
    530

<210> SEQ ID NO 11
<211> LENGTH: 530
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 11

Met Ala Leu Pro Val Thr Ala Leu Leu Leu Pro Leu Ala Leu Leu Leu
1               5                   10                  15

His Ala Ala Arg Pro Met Met Ser Ser Ala Gln Phe Leu Gly Leu Leu
            20                  25                  30

Leu Leu Cys Phe Gln Gly Thr Arg Cys Asp Ile Gln Met Thr Gln Thr
        35                  40                  45

Thr Ser Ser Leu Ser Ala Ser Leu Gly Asp Arg Leu Thr Ile Ser Cys
    50                  55                  60

Arg Ala Ser Gln Asp Ile Ser Asn Tyr Leu Asn Trp Tyr Gln Gln Lys
65                  70                  75                  80

```
Pro Asp Gly Thr Val Lys Leu Leu Ile Tyr Tyr Thr Ser Arg Leu His
                    85                  90                  95

Ser Gly Val Pro Ser Arg Phe Ser Gly Ser Gly Ser Gly Thr Asp Tyr
                100                 105                 110

Ser Leu Thr Ile Ser Asn Leu Glu Gln Ala Asp Ile Ala Thr Tyr Phe
            115                 120                 125

Cys Gln Gln Gly Asp Thr Leu Pro Trp Thr Phe Gly Gly Gly Thr Lys
130                 135                 140

Leu Glu Ile Lys Gly Gly Gly Ser Gly Gly Gly Ser Gly Gly
145                 150                 155                 160

Gly Gly Ser Gly Gly Gly Ser Met Lys Trp Leu Asn Trp Ile
                165                 170                 175

Phe Leu Val Thr Leu Leu Asn Asp Ile Gln Cys Glu Val Lys Leu Val
                180                 185                 190

Glu Ser Gly Gly Gly Leu Val Gln Pro Gly Gly Ser Leu Ser Leu Ser
            195                 200                 205

Cys Ala Ala Ser Gly Phe Thr Phe Thr Asp Tyr Tyr Met Ser Trp Val
210                 215                 220

Arg Gln Pro Pro Gly Lys Ala Leu Glu Trp Leu Gly Phe Ile Arg Asn
225                 230                 235                 240

Lys Pro Asn Gly Tyr Thr Thr Glu Tyr Ser Ala Ser Val Lys Gly Arg
                245                 250                 255

Phe Thr Ile Ser Arg Asp Asn Ser Gln Ser Ile Leu Tyr Leu Gln Met
                260                 265                 270

Asn Val Leu Arg Ala Glu Asp Ser Ala Thr Tyr Tyr Cys Ala Arg Tyr
            275                 280                 285

Thr Gly Gly Gly Tyr Phe Asp Tyr Trp Gly Gln Gly Thr Thr Leu Thr
290                 295                 300

Val Ser Ser Thr Thr Thr Pro Ala Pro Arg Pro Thr Pro Ala Pro
305                 310                 315                 320

Thr Ile Ala Ser Gln Pro Leu Ser Leu Arg Pro Glu Ala Cys Arg Pro
                325                 330                 335

Ala Ala Gly Gly Ala Val His Thr Arg Gly Leu Asp Phe Ala Cys Asp
            340                 345                 350

Ile Tyr Ile Trp Ala Pro Leu Ala Gly Thr Cys Gly Val Leu Leu Leu
            355                 360                 365

Ser Leu Val Ile Thr Leu Tyr Cys Lys Arg Gly Arg Lys Lys Leu Leu
370                 375                 380

Tyr Ile Phe Lys Gln Pro Phe Met Arg Pro Val Gln Thr Thr Gln Glu
385                 390                 395                 400

Glu Asp Gly Cys Ser Cys Arg Phe Pro Glu Glu Glu Glu Gly Gly Cys
                405                 410                 415

Glu Leu Arg Val Lys Phe Ser Arg Ser Ala Asp Ala Pro Ala Tyr Gln
                420                 425                 430

Gln Gly Gln Asn Gln Leu Tyr Asn Glu Leu Asn Leu Gly Arg Arg Glu
            435                 440                 445

Glu Tyr Asp Val Leu Asp Lys Arg Arg Gly Arg Asp Pro Glu Met Gly
            450                 455                 460

Gly Lys Pro Arg Arg Lys Asn Pro Gln Glu Gly Leu Tyr Asn Glu Leu
465                 470                 475                 480

Gln Lys Asp Lys Met Ala Glu Ala Tyr Ser Glu Ile Gly Met Lys Gly
                485                 490                 495
```

-continued

Glu Arg Arg Arg Gly Lys Gly His Asp Gly Leu Tyr Gln Gly Leu Ser
            500                 505                 510

Thr Ala Thr Lys Asp Thr Tyr Asp Ala Leu His Met Gln Ala Leu Pro
        515                 520                 525

Pro Arg
    530

<210> SEQ ID NO 12
<211> LENGTH: 675
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 12

Met Ala Leu Pro Val Thr Ala Leu Leu Leu Pro Leu Ala Leu Leu Leu
1               5                   10                  15

His Ala Ala Arg Pro Met Ala Leu Pro Val Thr Ala Leu Leu Leu Pro
            20                  25                  30

Leu Ala Leu Leu Leu His Ala Ala Arg Pro Gln Val Gln Leu Lys Gln
        35                  40                  45

Ser Gly Pro Gly Leu Val Gln Pro Ser Gln Ser Leu Ser Ile Thr Cys
    50                  55                  60

Thr Val Ser Gly Phe Ser Leu Thr Asn Tyr Gly Val His Trp Val Arg
65                  70                  75                  80

Gln Ser Pro Gly Lys Gly Leu Glu Trp Leu Gly Val Ile Trp Ser Gly
                85                  90                  95

Gly Asn Thr Asp Tyr Asn Thr Pro Phe Thr Ser Arg Leu Ser Ile Asn
            100                 105                 110

Lys Asp Asn Ser Lys Ser Gln Val Phe Phe Lys Met Asn Ser Leu Gln
        115                 120                 125

Ser Asn Asp Thr Ala Ile Tyr Tyr Cys Ala Arg Ala Leu Thr Tyr Tyr
    130                 135                 140

Asp Tyr Glu Phe Ala Tyr Trp Gly Gln Gly Thr Leu Val Thr Val Ser
145                 150                 155                 160

Ala Gly Gly Gly Gly Ser Gly Gly Gly Gly Ser Gly Gly Gly Gly Ser
                165                 170                 175

Gly Gly Gly Gly Ser Asp Ile Leu Leu Thr Gln Ser Pro Val Ile Leu
            180                 185                 190

Ser Val Ser Pro Gly Glu Arg Val Ser Phe Ser Cys Arg Ala Ser Gln
        195                 200                 205

Ser Ile Gly Thr Asn Ile His Trp Tyr Gln Gln Arg Thr Asn Gly Ser
    210                 215                 220

Pro Arg Leu Leu Ile Lys Tyr Ala Ser Glu Ser Ile Ser Gly Ile Pro
225                 230                 235                 240

Ser Arg Phe Ser Gly Ser Gly Ser Gly Thr Asp Phe Thr Leu Ser Ile
                245                 250                 255

Asn Ser Val Glu Ser Glu Asp Ile Ala Asp Tyr Tyr Cys Gln Gln Asn
            260                 265                 270

Asn Asn Trp Pro Thr Thr Phe Gly Ala Gly Thr Lys Leu Glu Leu Lys
        275                 280                 285

Thr Thr Thr Pro Ala Pro Arg Pro Pro Thr Pro Ala Pro Thr Ile Ala
    290                 295                 300

Ser Gln Pro Leu Ser Leu Arg Pro Glu Ala Cys Arg Pro Ala Ala Gly
305                 310                 315                 320

```
Gly Ala Val His Thr Arg Gly Leu Asp Phe Ala Cys Asp Ile Tyr Ile
            325                 330                 335

Trp Ala Pro Leu Ala Gly Thr Cys Gly Val Leu Leu Ser Leu Val
            340                 345                 350

Ile Thr Leu Tyr Cys Lys Arg Gly Arg Lys Leu Leu Tyr Ile Phe
        355                 360                 365

Lys Gln Pro Phe Met Arg Pro Val Gln Thr Thr Gln Glu Glu Asp Gly
    370                 375                 380

Cys Ser Cys Arg Phe Pro Glu Glu Glu Glu Gly Gly Cys Glu Leu Arg
385                 390                 395                 400

Val Lys Phe Ser Arg Ser Ala Asp Ala Pro Ala Tyr Gln Gln Gly Gln
            405                 410                 415

Asn Gln Leu Tyr Asn Glu Leu Asn Leu Gly Arg Arg Glu Glu Tyr Asp
            420                 425                 430

Val Leu Asp Lys Arg Arg Gly Arg Asp Pro Glu Met Gly Gly Lys Pro
        435                 440                 445

Arg Arg Lys Asn Pro Gln Glu Gly Leu Tyr Asn Glu Leu Gln Lys Asp
    450                 455                 460

Lys Met Ala Glu Ala Tyr Ser Glu Ile Gly Met Lys Gly Glu Arg Arg
465                 470                 475                 480

Arg Gly Lys Gly His Asp Gly Leu Tyr Gln Gly Leu Ser Thr Ala Thr
            485                 490                 495

Lys Asp Thr Tyr Asp Ala Leu His Met Gln Ala Leu Pro Pro Arg Pro
            500                 505                 510

Gly Ser Gly Ser Gly Ala Thr Asn Phe Ser Leu Leu Lys Gln Ala Gly
        515                 520                 525

Asp Val Glu Glu Asn Pro Gly Pro Arg Thr Ala Met Glu Thr Asp Thr
    530                 535                 540

Leu Leu Leu Trp Val Leu Leu Leu Trp Val Pro Gly Ser Thr Gly Asp
545                 550                 555                 560

Asp Ile Gln Met Thr Gln Ser Pro Ser Ser Leu Ser Ala Ser Leu Gly
            565                 570                 575

Asp Arg Val Thr Ile Thr Cys Gln Ala Ser Gln Ser Ile Ser Ser Tyr
            580                 585                 590

Leu Ala Trp Tyr Gln Gln Lys Pro Gly Gln Ala Pro Asn Ile Leu Ile
        595                 600                 605

Tyr Gly Ala Ser Arg Leu Lys Thr Gly Val Pro Ser Arg Phe Ser Gly
    610                 615                 620

Ser Gly Ser Gly Thr Ser Phe Thr Leu Thr Ile Ser Gly Leu Glu Ala
625                 630                 635                 640

Glu Asp Ala Gly Thr Tyr Tyr Cys Gln Gln Tyr Ala Ser Val Pro Val
            645                 650                 655

Thr Phe Gly Gln Gly Thr Lys Val Glu Leu Lys His His His His His
            660                 665                 670

His Ser Gly
        675
```

<210> SEQ ID NO 13
<211> LENGTH: 4
<212> TYPE: PRT
<213> ORGANISM: Artificial Sequence
<220> FEATURE:
<223> OTHER INFORMATION: Description of Artificial Sequence: Synthetic
      peptide

```
<400> SEQUENCE: 13

Arg Gly Asp Ser
1
```